(12) United States Patent
Christian et al.

(10) Patent No.: US 9,811,575 B2
(45) Date of Patent: Nov. 7, 2017

(54) DYNAMIC DISTRIBUTED GENERATION OF DATA REPRESENTATIONS FROM HIGHLY CONDENSED DATA

(71) Applicant: SAS Institute Inc., Cary, NC (US)

(72) Inventors: Stacey Michelle Christian, Pittsboro, NC (US); Michael Stephen Whitcher, Apex, NC (US); Donald Kent McAlister, Apex, NC (US); Phillip Elliot Hanna, Raleigh, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 15/474,832

(22) Filed: Mar. 30, 2017

(65) Prior Publication Data

US 2017/0286509 A1 Oct. 5, 2017

Related U.S. Application Data

(63) Continuation of application No. 15/474,636, filed on Mar. 30, 2017.

(60) Provisional application No. 62/315,235, filed on Mar. 30, 2016, provisional application No. 62/328,248, filed on Apr. 27, 2016.

(51) Int. Cl.
*G06F 17/30* (2006.01)

(52) U.S. Cl.
CPC .. *G06F 17/30569* (2013.01); *G06F 17/30333* (2013.01); *G06F 17/30592* (2013.01)

(58) Field of Classification Search
CPC .................................. G06F 17/30569
USPC ............ 707/791, 802, 803, 809, 812, 999.1
See application file for complete search history.

(56) References Cited

U.S. PATENT DOCUMENTS

| | | | |
|---|---|---|---|
| 2015/0074151 A1* | 3/2015 | Chaiken | G06F 17/30569 707/803 |
| 2015/0106382 A1* | 4/2015 | Liu | G06F 17/30315 707/744 |
| 2016/0057226 A1* | 2/2016 | Bestler | G06F 11/1076 709/217 |

* cited by examiner

*Primary Examiner* — Syling Yen

(57) ABSTRACT

An apparatus includes a processor and storage storing instructions causing the processor to store, at a node device of a grid of node devices, a data block of a data blob, receive data blob metadata indicative of an organization of data items within the data blob, receive a command to generate, from the data block, at least one row of a representation portion of a plurality of representation portions from which a 2D representation of the data blob is to be generated, use the data blob metadata and a node block map indicative of which data items of the data block are required to generate the representation portion to derive one or more transforms to be performed with the data block to generate the at least one row of the representation portion, and perform the one or more transforms with the data block to generate the at least one row.

30 Claims, 25 Drawing Sheets

```
┌─────────────────────────────────────────────────────────────┐
│  RECEIVE GRID STATUS INFORMATION INCLUDING A PROJECT STATUS OF A │
│    PORTION OF A PROJECT BEING EXECUTED BY A NODE IN THE         │
│                    COMMUNICATIONS GRID                          │
│                            502                                  │
└─────────────────────────────────────────────────────────────┘
                              │
                              ▼
┌─────────────────────────────────────────────────────────────┐
│              STORE THE GRID STATUS INFORMATION                  │
│                            504                                  │
└─────────────────────────────────────────────────────────────┘
                              │
                              ▼
┌─────────────────────────────────────────────────────────────┐
│  RECEIVE A FAILURE COMMUNICATION CORRESPONDING TO A NODE IN THE │
│                    COMMUNICATIONS GRID                          │
│                            506                                  │
└─────────────────────────────────────────────────────────────┘
                              │
                              ▼
┌─────────────────────────────────────────────────────────────┐
│  REASSIGN A NODE OR A PORTION OF THE PROJECT BEING EXECUTED BY  │
│                      THE FAILED NODE                            │
│                            508                                  │
└─────────────────────────────────────────────────────────────┘
                              │
                              ▼
┌─────────────────────────────────────────────────────────────┐
│    RECEIVE UPDATED GRID STATUS INFORMATION BASED ON THE         │
│                      REASSIGNMENT                               │
│                            510                                  │
└─────────────────────────────────────────────────────────────┘
                              │
                              ▼
┌─────────────────────────────────────────────────────────────┐
│  TRANSMIT A SET OF INSTRUCTIONS BASED ON THE UPDATED GRID STATUS│
│   INFORMATION TO ONE OR MORE NODES IN THE COMMUNICATIONS GRID   │
│                            512                                  │
└─────────────────────────────────────────────────────────────┘
```

FIG. 5

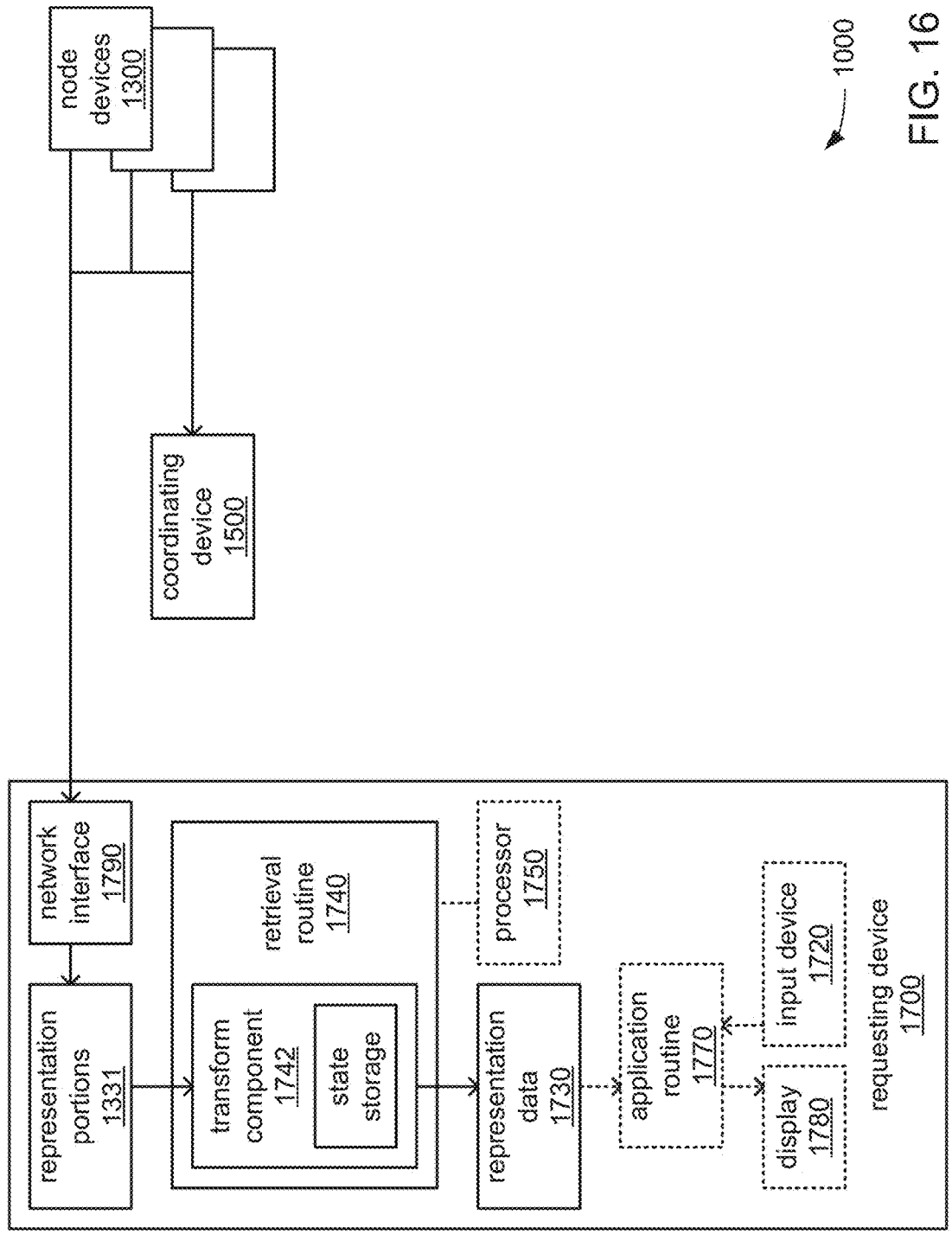

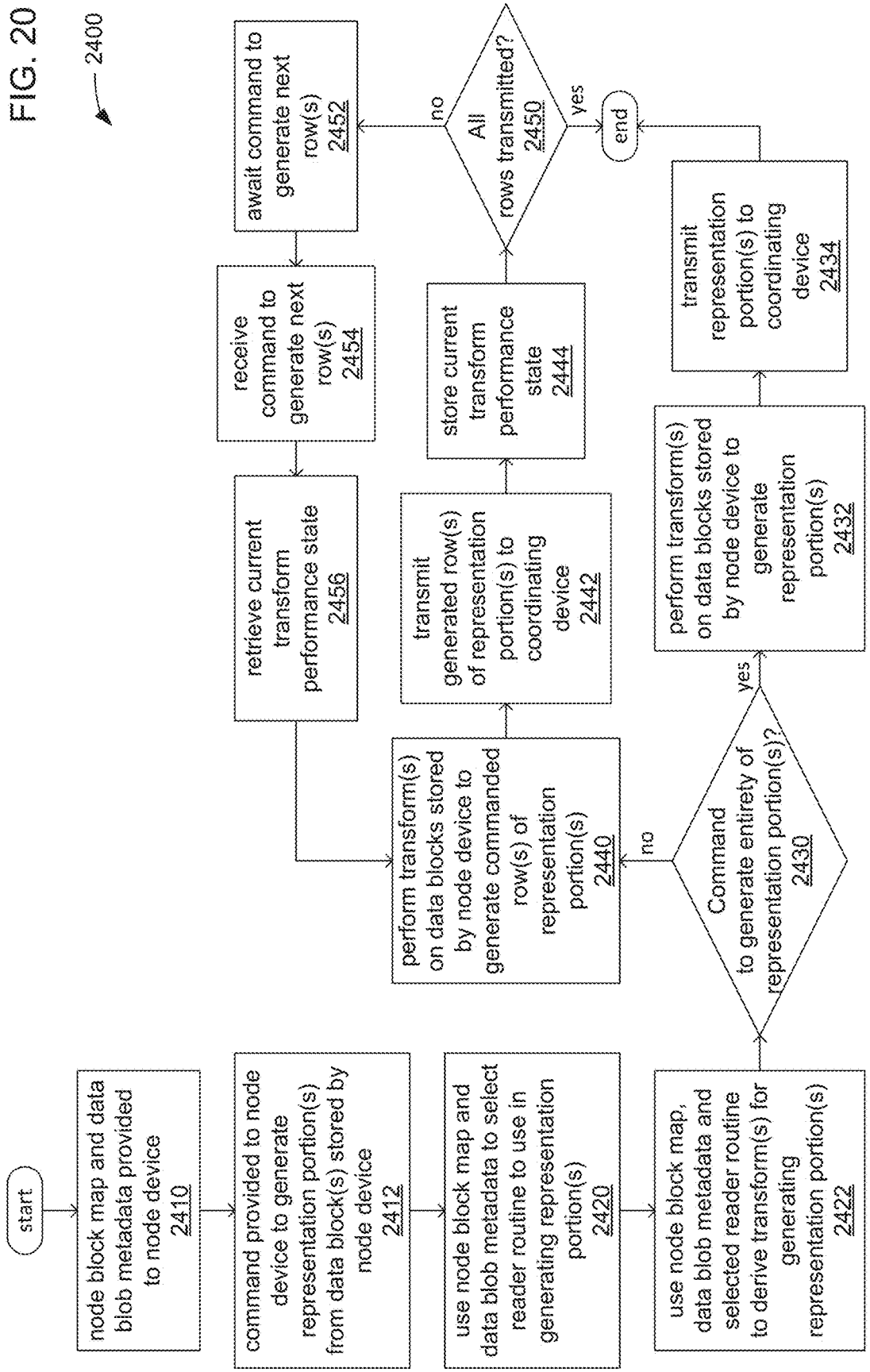

DYNAMIC DISTRIBUTED GENERATION OF DATA REPRESENTATIONS FROM HIGHLY CONDENSED DATA

CROSS-REFERENCE TO RELATED APPLICATIONS

This application claims the benefit of priority under 35 U.S.C. §119(e) to U.S. Provisional Application Ser. No. 62/315,235 filed Mar. 30, 2016, and U.S. Provisional Application Ser. No. 62/328,248 filed Apr. 27, 2016, the entirety of each of which is incorporated herein by reference. This application is a continuation of, and claims the benefit of priority under 35 U.S.C. §120 to, U.S. patent application Ser. No. 15/474,636 filed concurrently herewith on Mar. 30, 2017, the entirety of which is incorporated herein by reference.

BACKGROUND

As the size and organizational complexity of large data sets (e.g., what is commonly referred to as "big data") continue to increase, it has become commonplace to use grids of multiple node devices to store large data sets. The use of grids of node devices enables the provision of improved speed of access to data sets and/or redundancy of storage as a protection against loss of data due to device failures. Over time, different approaches to organizing large data sets for storage among grids of node devices have arisen, each of which are directed to achieving somewhat different goals.

In answer to sheer size of some large data sets, an approach sometimes referred to as "normalization" may be adopted in which various techniques may be used to reduce overall size by identifying and taking advantage of opportunities to combine otherwise separate data structures to eliminate redundant entries thereamong and/or instances of null values. Data compression may also be used to further reduce overall size. Unfortunately, to retrieve data, such an approach has the disadvantage of typically requiring various "denormalization" techniques and/or decompression to be performed in a centralized manner, thereby requiring exchanges of relatively large portions of the data set among devices, which slows the speed of data retrieval.

In an opposing approach, a large data set may be stored in denormalized form with the intention of having the redundant entries that would otherwise be eliminated by normalization, as well as tolerating what may be a considerable degree of sparsity in which many entries may be filled with null values. Such an approach may greatly improve the speed of retrieval. Unfortunately, the degree of denormalization that may be required to achieve desired speeds of retrieval may increase the overall size to an extent that requires a prohibitively large, complex and costly grid of node devices to provide storage.

SUMMARY

This summary is not intended to identify only key or essential features of the described subject matter, nor is it intended to be used in isolation to determine the scope of the described subject matter. The subject matter should be understood by reference to appropriate portions of the entire specification of this patent, any or all drawings, and each claim.

An apparatus may include a processor and a storage to store instructions that, when executed by the processor, cause the processor to perform operations including transmit, from a coordinating device to a plurality of node devices of a grid of node devices, a command to store a plurality of data blocks of a data blob, wherein the plurality of data blocks of the data blob are distributed among the plurality of node devices to be stored by the plurality of node devices, the data blob includes multiple data items, and each data block of the plurality of data blocks includes a subset of the multiple data items. The operations may further include receive, at the coordinating device, representation metadata including an indication of features of representation data, wherein the representation data provides a two-dimensional (2D) representation of data items of the data blob, and the representation data is to be assembled from a plurality of representation portions to be derived by the plurality of node devices from the plurality of data blocks. The operations may further include receive, at the coordinating device, a command from a requesting device to generate at least one row of the representation data. The operations may further include use the representation metadata, a data blob metadata and a master block map to determine a subset of data blocks of the plurality of data blocks that are required to generate the at least one row of the 2D representation, and a subset of node devices of the plurality of node devices that store the subset of the plurality of data blocks, wherein the data blob metadata includes an indication of organization of the multiple data items within the data blob and an indication of at least one rule that limits distribution of the multiple data items of the data blob among the plurality of data blocks, and the master block map includes an indication of the distribution of the multiple data items within the data blob among the plurality of data blocks, and an indication of the distribution of the plurality of data blocks among the plurality of node devices. The operations may further include use the representation metadata and the master block map to derive a node block map of a plurality of node block maps for each node device of the subset of node devices, wherein each node block map identifies at least one data item of the subset of data items of a data block from which to generate at least one row of a representation portion of the plurality of representation portions, and each node block map indicates a selection of a reader routine to use to derive a transform to use with the data block to generate the at least one row of the representation portion. The operations may further include transmit, from the coordinating device, each node block map of the plurality of node block maps to one of the node devices of the subset of node devices; and transmit, from the coordinating device, a command to each node device of the subset of node devices to generate at least one row of one of the representation portions of the plurality of representation portions.

The processor may be caused to perform operations including receive, at the coordinating device, the data blob metadata from at least one source device; determine a size of the data blob from the data blob metadata; receive, at the coordinating device, instances of node data from each node device of the plurality of node devices; and determine a quantity of the node devices of the plurality of node devices that are currently available to store the plurality of data blocks. The processor may be caused to perform operations including use the at least one rule of the data blob metadata and indications in the instances of the node data of available storage resources of each node of the plurality of nodes to derive the distribution of the multiple data items of the data blob among the plurality of data blocks.

The processor may be caused to perform operations including: receive, at the coordinating device and from a node device of the subset of node devices, an indication of failure in generating at least one row of a representation portion from a data block of the plurality of data blocks; select another node device of the plurality of node devices that also stores the data block of the plurality of data blocks to generate the at least one row of the representation portion from the data block; and transmit, from the coordinating device, a node block map of the plurality of node block maps that corresponds to the at least one row of the representation portion to the another node device. The processor may be caused to perform operations including: receive, at the coordinating device, indications from the plurality of node devices of successful generation of the at least one row of at least one representation portion of the plurality of representation portions; receive, at the coordinating device, another command from the requesting device to generate at least one more row of the representation data; and in response to the receipt of the indications of successful generation of the at least one row of the at least one representation portion, and in response to the receipt of the other command, transmit, from the coordinating device, a command to generate at least one more row of the plurality of representation portions to the subset of node devices. The processor may be caused to perform operations including: use the representation metadata and an identifier of the requesting device or a entity associated with the requesting device to determine whether the requesting device or the entity is authorized to access data items of the data blob that are required to generate the at least one row of the representation data; and in response to a determination that either the requesting device or the entity is not authorized to access any of the data items of the data blob that are required to generate the at least one row of the representation data, transmit an indication of failure from the coordinating device to the requesting device.

The processor may be caused to perform operations including use at least the representation metadata and the data blob metadata to derive at least one operation to perform with at least one row of at least one representation portion of the plurality of representation portions to generate the at least one row of the representation data. The processor is caused to perform operations including: receive, at the coordinating device, the at least one representation portion; perform the at least one operation with the at least one row of the at least one representation portion to generate the at least one row of the representation data; and transmit, from the coordinating device, the at least one row of the representation data to the requesting device. The processor may be caused to perform operations including: receive, at the coordinating device, another command from the requesting device to generate at least one more row of the representation data; retrieve first state data indicative of a state of the coordinating device after the performance of at least one operations to generate the at least one row of the representation data; use the first state data to prepare the coordinating device for another performance of the one or more operations with at least one more row of the at least one representation portion to generate the at least one more row of the representation data; store second state data indicative of a state of the coordinating device after the another performance of the one or more operations to generate the at least one more row of the representation data; and transmit, from the coordinating device, the at least one more row of the representation data to the requesting device. The at least one operation may be selected from a group consisting of aggregation of values of the at least one representation portion, averaging of data items of the at least one representation portion, sorting data items of the at least one representation portion, calculating a value of at least one column of the at least one row from a value of at least one other column of the at least one row, and transmitting the at least one row of the representation data to the plurality of node devices for storage.

A computer-program product tangibly embodied in a non-transitory machine-readable storage medium, the computer-program product including instructions operable to cause a processor to perform operations including transmit, from a coordinating device to a plurality of node devices of a grid of node devices, a command to store a plurality of data blocks of a data blob, wherein the plurality of data blocks of the data blob are distributed among the plurality of node devices to be stored by the plurality of node devices; the data blob includes multiple data items; and each data block of the plurality of data blocks includes a subset of the multiple data items. The operations may further include receive, at the coordinating device, representation metadata including an indication of features of representation data, wherein the representation data provides a two-dimensional (2D) representation of data items of the data blob, and the representation data is to be assembled from a plurality of representation portions to be derived by the plurality of node devices from the plurality of data blocks. The operations may further include receive, at the coordinating device, a command from a requesting device to generate at least one row of the representation data. The operations may further include use the representation metadata, a data blob metadata and a master block map to determine a subset of data blocks of the plurality of data blocks that are required to generate the at least one row of the 2D representation, and a subset of node devices of the plurality of node devices that store the subset of the plurality of data blocks, wherein the data blob metadata includes an indication of organization of the multiple data items within the data blob and an indication of at least one rule that limits distribution of the multiple data items of the data blob among the plurality of data blocks, and the master block map includes an indication of the distribution of the multiple data items within the data blob among the plurality of data blocks, and an indication of the distribution of the plurality of data blocks among the plurality of node devices. The operations may further include use the representation metadata and the master block map to derive a node block map of a plurality of node block maps for each node device of the subset of node devices, wherein each node block map identifies at least one data item of the subset of data items of a data block from which to generate at least one row of a representation portion of the plurality of representation portions, and each node block map indicates a selection of a reader routine to use to derive a transform to use with the data block to generate the at least one row of the representation portion. The operations may further include transmit, from the coordinating device, each node block map of the plurality of node block maps to one of the node devices of the subset of node devices, and transmit, from the coordinating device, a command to each node device of the subset of node devices to generate at least one row of one of the representation portions of the plurality of representation portions.

The processor may be caused to perform operations including: receive, at the coordinating device, the data blob metadata from at least one source device; determine a size of the data blob from the data blob metadata; receive, at the coordinating device, instances of node data from each node device of the plurality of node devices; and determine a quantity of the node devices of the plurality of node devices that are currently available to store the plurality of data blocks. The processor may be caused to perform operations including use the at least one rule of the data blob metadata and indications in the instances of the node data of available storage resources of each node of the plurality of nodes to derive the distribution of the multiple data items of the data blob among the plurality of data blocks.

The processor may be caused to perform operations including: receive, at the coordinating device and from a node device of the subset of node devices, an indication of failure in generating at least one row of a representation portion from a data block of the plurality of data blocks; select another node device of the plurality of node devices that also stores the data block of the plurality of data blocks to generate the at least one row of the representation portion from the data block; and transmit, from the coordinating device, a node block map of the plurality of node block maps that corresponds to the at least one row of the representation portion to the another node device. The processor is caused to perform operations including: receive, at the coordinating device, indications from the plurality of node devices of successful generation of the at least one row of at least one representation portion of the plurality of representation portions; receive, at the coordinating device, another command from the requesting device to generate at least one more row of the representation data; and in response to the receipt of the indications of successful generation of the at least one row of the at least one representation portion, and in response to the receipt of the other command, transmit, from the coordinating device, a command to generate at least one more row of the plurality of representation portions to the subset of node devices. The processor may be caused to perform operations including use the representation metadata and an identifier of the requesting device or a entity associated with the requesting device to determine whether the requesting device or the entity is authorized to access data items of the data blob that are required to generate the at least one row of the representation data, and in response to a determination that either the requesting device or the entity is not authorized to access any of the data items of the data blob that are required to generate the at least one row of the representation data, transmit an indication of failure from the coordinating device to the requesting device.

The processor may be caused to perform operations including use at least the representation metadata and the data blob metadata to derive at least one operation to perform with at least one row of at least one representation portion of the plurality of representation portions to generate the at least one row of the representation data. The processor may be caused to perform operations including: receive, at the coordinating device, the at least one representation portion; perform the at least one operation with the at least one row of the at least one representation portion to generate the at least one row of the representation data; and transmit, from the coordinating device, the at least one row of the representation data to the requesting device. The processor may be caused to perform operations including: receive, at the coordinating device, another command from the requesting device to generate at least one more row of the representation data; retrieve first state data indicative of a state of the coordinating device after the performance of at least one operations to generate the at least one row of the representation data; use the first state data to prepare the coordinating device for another performance of the one or more operations with at least one more row of the at least one representation portion to generate the at least one more row of the representation data; store second state data indicative of a state of the coordinating device after the another performance of the one or more operations to generate the at least one more row of the representation data; and transmit, from the coordinating device, the at least one more row of the representation data to the requesting device.

The at least one rule may be selected from a group consisting of a rule specifying at least one atomic unit of data that is not to be divided between two data blocks.

A computer-implemented method may include transmitting, from a coordinating device to a plurality of node devices of a grid of node devices, a command to store a plurality of data blocks of a data blob, wherein the plurality of data blocks of the data blob are distributed among the plurality of node devices to be stored by the plurality of node devices, the data blob includes multiple data items, and each data block of the plurality of data blocks includes a subset of the multiple data items. The method may further include receiving, at the coordinating device, representation metadata including an indication of features of representation data, wherein the representation data provides a two-dimensional (2D) representation of data items of the data blob, and the representation data is to be assembled from a plurality of representation portions to be derived by the plurality of node devices from the plurality of data blocks. The method may further include receiving, at the coordinating device, a command from a requesting device to generate at least one row of the representation data. The method may further include using the representation metadata, a data blob metadata and a master block map to determine a subset of data blocks of the plurality of data blocks that are required to generate the at least one row of the 2D representation, and a subset of node devices of the plurality of node devices that store the subset of the plurality of data blocks, wherein: the data blob metadata includes an indication of organization of the multiple data items within the data blob and an indication of at least one rule that limits distribution of the multiple data items of the data blob among the plurality of data blocks; and the master block map includes an indication of the distribution of the multiple data items within the data blob among the plurality of data blocks, and an indication of the distribution of the plurality of data blocks among the plurality of node devices. The method may further include using the representation metadata and the master block map to derive a node block map of a plurality of node block maps for each node device of the subset of node devices, wherein each node block map identifies at least one data item of the subset of data items of a data block from which to generate at least one row of a representation portion of the plurality of representation portions; and each node block map indicates a selection of a reader routine to use to derive a transform to use with the data block to generate the at least one row of the representation portion. The method may further include transmitting, from the coordinating device, each node block map of the plurality of node block maps to one of the node devices of the subset of node devices, and transmitting, from the coordinating device, a command to each node device of the subset of node devices to generate at least one row of one of the representation portions of the plurality of representation portions.

The method may further include: receiving, at the coordinating device, the data blob metadata from at least one source device; determining, at the coordinating device, a size of the data blob from the data blob metadata; receiving, at the coordinating device, instances of node data from each node device of the plurality of node devices; and determining, at the coordinating device, a quantity of the node devices of the plurality of node devices that are currently available to store the plurality of data blocks. The method may further include using the at least one rule of the data blob metadata and indications in the instances of the node data of available storage resources of each node of the plurality of nodes to derive the distribution of the multiple data items of the data blob among the plurality of data blocks.

The method may further include: receiving, at the coordinating device and from a node device of the subset of node devices, an indication of failure in generating at least one row of a representation portion from a data block of the plurality of data blocks; selecting, at the coordinating device, another node device of the plurality of node devices that also stores the data block of the plurality of data blocks to generate the at least one row of the representation portion from the data block; and transmitting, from the coordinating device, a node block map of the plurality of node block maps that corresponds to the at least one row of the representation portion to the another node device. The method may further include: receiving, at the coordinating device, indications from the plurality of node devices of successful generation of the at least one row of at least one representation portion of the plurality of representation portions; receiving, at the coordinating device, another command from the requesting device to generate at least one more row of the representation data; and in response to the receipt of the indications of successful generation of the at least one row of the at least one representation portion, and in response to the receipt of the other command, transmitting, from the coordinating device, a command to generate at least one more row of the plurality of representation portions to the subset of node devices. The method may further include using the representation metadata and an identifier of the requesting device or a entity associated with the requesting device to determine whether the requesting device or the entity is authorized to access data items of the data blob that are required to generate the at least one row of the representation data, and in response to a determination that either the requesting device or the entity is not authorized to access any of the data items of the data blob that are required to generate the at least one row of the representation data, transmitting an indication of failure from the coordinating device to the requesting device.

The method may further include using at least the representation metadata and the data blob metadata to derive at least one operation to perform with at least one row of at least one representation portion of the plurality of representation portions to generate the at least one row of the representation data. The method may further include receiving, at the coordinating device, the at least one representation portion; performing the at least one operation with the at least one row of the at least one representation portion to generate the at least one row of the representation data; and transmitting, from the coordinating device, the at least one row of the representation data to the requesting device. The method may further include receiving, at the coordinating device, another command from the requesting device to generate at least one more row of the representation data; retrieving first state data indicative of a state of the coordinating device after the performance of at least one operations to generate the at least one row of the representation data; using the first state data to prepare the coordinating device for another performance of the one or more operations with at least one more row of the at least one representation portion to generate the at least one more row of the representation data; storing second state data indicative of a state of the coordinating device after the another performance of the one or more operations to generate the at least one more row of the representation data; and transmitting, from the coordinating device, the at least one more row of the representation data to the requesting device.

The data blob may include a hypercube that employs an indexing scheme of at least 3 dimensions, and the data blob may not include the 2D representation of data provided by the representation data as a slice of the hypercube.

An apparatus may include a processor and a storage to store instructions that, when executed by the processor, cause the processor to perform operations including store, at a node device of a grid of node devices, a data block of a plurality of data blocks of a data blob, wherein the plurality of data blocks of the data blob are distributed among the grid of node devices to be stored by the grid of node devices; the data blob includes multiple data items; and each data block of the plurality of data blocks includes a subset of the multiple data items. The operations may further include receive, at the node device, data blob metadata that includes an indication of organization of the multiple data items within the data blob. The operations may further include receive, at the node device, a command that originates from a requesting device to generate at least one row of a representation portion of a plurality of representation portions from the data block, wherein a representation data that provides a two-dimensional (2D) representation of data items of the data blob is to be assembled from the plurality of representation portions, the plurality of representation portions is to be generated from a subset of data blocks of the plurality of data blocks by a subset of node devices of the grid of node devices that store the subset of data blocks, and the subset of node devices includes the node device. The operations may include use the data blob metadata and a node block map of a plurality of node block maps to derive one or more transforms to be performed at the node device with the data block to generate the at least one row of the representation portion, wherein: the plurality of node block maps is provided to the subset of node devices to generate the plurality of representation portions from the subset of data blocks; and the node block map includes an indication of which data items of the data block are required to generate the representation portion, what data values are to be generated from the required data items, and an organization of the generated data values within the representation portion. The operations may include perform, at the node device, the one or more transforms with the data block to generate the at least one row of the representation portion.

The processor may be caused to perform operations including: store, at the node device, multiple reader routines, wherein each reader routine includes other instructions executable by the processor to perform a different type of transform from others of the multiple reader routines; select one of the multiple reader routines to use in deriving and performing the one or more transforms based on the node block map; and use the selected reader routine to derive and perform the one or more transforms with the data block to generate the at least one row of the representation portion.

The processor may be caused to perform operations including: transmit, from the node device to a coordinating device, node data including an indication of availability of at least storage resources of the node device to enable the coordinating device to coordinate provision of the plurality of data blocks by at least one source device to the grid of node devices, and to coordinate storage of the plurality of data blocks by the grid of node devices; receive, at the node device, a command to store the data block from the coordinating device; and receive, at the node device, the data block from the at least one source device. The processor may be caused to perform operations including: receive, at the node device, the command to generate at least one row of the representation portion from the coordinating device; and transmit, from the node device, the at least one row of the representation portion to the coordinating device to enable generation, at the coordinating device, of at least one row of the representation data from at least one row of each representation portion of the plurality of representation portions. The processor may be caused to perform operations including: receive, at the node device, at least a portion of the representation data from the coordinating device; receive, at the node device, a command from the coordinating device to store the portion of the representation data; and store, at the node device, the received portion of the representation data. The processor may be caused to perform operations including: receive, at the node device, another command to generate at least one more row of the representation portion from the data block; retrieve first state data indicative of a state of the node device after the performance of the one or more transforms to generate the at least one row of the representation portion; use the first state data to prepare the node device for another performance of the one or more transforms with the data block to generate the at least one more row of the representation portion; store, at the node device, second state data indicative of a state of the node device after the another performance of the one or more transforms to generate the at least one more row of the representation portion; and transmit, from the node device, the at least one more row of the representation portion to the coordinating device to enable generation, at the coordinating device, of at least one more row of the representation data from at least one more row of each representation portion of the plurality of representation portions. The processor may be caused to perform operations including: use the node bock map and an identifier of the requesting device or an entity associated with the requesting device to determine whether the requesting device or the entity is authorized to access data items of the data block that are required to generate the at least one row of the representation portion; and in response to a determination that either the requesting device or the entity is not authorized to access a portion of the data items of the data block that are required to generate the at least one row of the representation portion, refrain from using the portion of the data items to generate the at least one row of the representation portion.

The node device may include a coordinating device of the grid of node devices to coordinate the generation of at least one row of each representation portion by the subset of node devices; and the processor may be caused to perform operations including receive, at the coordinating device, the command from the requesting device. In response to the receipt of the command from the requesting device, the processor may be caused to further perform operations including: generate the plurality of node block maps from a master block map that includes an indication of distribution of the multiple data items within the data blob among the plurality of data blocks, and an indication of the distribution of the plurality of data blocks among the grid of node devices; and distribute, from the coordinating device, the plurality of node block maps among the subset of node devices. The processor may be caused to perform operations including use representation metadata including an indication of features of the representation data and the data blob metadata to derive at least one operation to perform with at least one row of at least one representation portion of the plurality of representation portions to generate the at least one row of the representation data.

A transform of the one or more transforms may be selected from a group consisting of aggregation of data items of the data blob, averaging of data items of the data blob, sorting data items of the data blob, calculating a value of at least one column of the at least one row from a value of at least one other column of the at least one row, decompressing data items of the data blob, and decrypting data items of the data blob.

A computer-program product tangibly embodied in a non-transitory machine-readable storage medium, the computer-program product including instructions operable to cause a processor to perform operations including store, at a node device of a grid of node devices, a data block of a plurality of data blocks of a data blob, wherein the plurality of data blocks of the data blob are distributed among the grid of node devices to be stored by the grid of node devices, the data blob includes multiple data items, and each data block of the plurality of data blocks includes a subset of the multiple data items. The operations may further include receive, at the node device, data blob metadata that includes an indication of organization of the multiple data items within the data blob. The operations may further include receive, at the node device, a command that originates from a requesting device to generate at least one row of a representation portion of a plurality of representation portions from the data block, wherein a representation data that provides a two-dimensional (2D) representation of data items of the data blob is to be assembled from the plurality of representation portions, the plurality of representation portions is to be generated from a subset of data blocks of the plurality of data blocks by a subset of node devices of the grid of node devices that store the subset of data blocks, and the subset of node devices includes the node device. The operations may further include use the data blob metadata and a node block map of a plurality of node block maps to derive one or more transforms to be performed at the node device with the data block to generate the at least one row of the representation portion, wherein: the plurality of node block maps is provided to the subset of node devices to generate the plurality of representation portions from the subset of data blocks; and the node block map includes an indication of which data items of the data block are required to generate the representation portion, what data values are to be generated from the required data items, and an organization of the generated data values within the representation portion. The operations may further include perform, at the node device, the one or more transforms with the data block to generate the at least one row of the representation portion.

The processor may be caused to perform operations including: store, at the node device, multiple reader routines, wherein each reader routine includes other instructions executable by the processor to perform a different type of transform from others of the multiple reader routines; select one of the multiple reader routines to use in deriving and performing the one or more transforms based on the node block map; and use the selected reader routine to derive and perform the one or more transforms with the data block to generate the at least one row of the representation portion.

The processor may be caused to perform operations including: transmit, from the node device to a coordinating device, node data including an indication of availability of at least storage resources of the node device to enable the coordinating device to coordinate provision of the plurality of data blocks by at least one source device to the grid of node devices, and to coordinate storage of the plurality of data blocks by the grid of node devices; receive, at the node device, a command to store the data block from the coordinating device; and receive, at the node device, the data block from the at least one source device. The processor may be caused to perform operations including: receive, at the node device, the command to generate at least one row of the representation portion from the coordinating device; and transmit, from the node device, the at least one row of the representation portion to the coordinating device to enable generation, at the coordinating device, of at least one row of the representation data from at least one row of each representation portion of the plurality of representation portions. The processor may be caused to perform operations including: receive, at the node device, at least a portion of the representation data from the coordinating device; receive, at the node device, a command from the coordinating device to store the portion of the representation data; and store, at the node device, the received portion of the representation data. The processor may be caused to perform operations including: receive, at the node device, another command to generate at least one more row of the representation portion from the data block; retrieve first state data indicative of a state of the node device after the performance of the one or more transforms to generate the at least one row of the representation portion; use the first state data to prepare the node device for another performance of the one or more transforms with the data block to generate the at least one more row of the representation portion; store, at the node device, second state data indicative of a state of the node device after the another performance of the one or more transforms to generate the at least one more row of the representation portion; and transmit, from the node device, the at least one more row of the representation portion to the coordinating device to enable generation, at the coordinating device, of at least one more row of the representation data from at least one more row of each representation portion of the plurality of representation portions. The processor may be caused to perform operations including: use the node bock map and an identifier of the requesting device or a entity associated with the requesting device to determine whether the requesting device or the entity is authorized to access data items of the data block that are required to generate the at least one row of the representation portion; and in response to a determination that either the requesting device or the entity is not authorized to access a portion of the data items of the data block that are required to generate the at least one row of the representation portion, refrain from using the portion of the data items to generate the at least one row of the representation portion.

The node device may include a coordinating device of the grid of node devices to coordinate the generation of at least one row of each representation portion by the subset of node devices; and the processor is caused to perform operations including receive, at the coordinating device, the command from the requesting device. In response to the receipt of the command from the requesting device, the processor may be caused to perform operations including: generate the plurality of node block maps from a master block map that includes an indication of distribution of the multiple data items within the data blob among the plurality of data blocks, and an indication of the distribution of the plurality of data blocks among the grid of node devices; and distribute, from the coordinating device, the plurality of node block maps among the subset of node devices. The processor may be caused to perform operations including use representation metadata including an indication of features of the representation data and the data blob metadata to derive at least one operation to perform with at least one row of at least one representation portion of the plurality of representation portions to generate the at least one row of the representation data. The at least one operation may be selected from a group consisting of aggregation of values of the at least one representation portion, averaging of data items of the at least one representation portion, sorting data items of the at least one representation portion, calculating a value of at least one column of the at least one row from a value of at least one other column of the at least one row, and transmitting the at least one row of the representation data to the grid of node devices for storage.

A computer-implemented method may include storing, at a node device of a grid of node devices, a data block of a plurality of data blocks of a data blob, wherein the plurality of data blocks of the data blob are distributed among the grid of node devices to be stored by the grid of node devices; the data blob includes multiple data items; and each data block of the plurality of data blocks includes a subset of the multiple data items. The method may further include receiving, at the node device, data blob metadata that includes an indication of organization of the multiple data items within the data blob. The method may further include receiving, at the node device, a command that originates from a requesting device to generate at least one row of a representation portion of a plurality of representation portions from the data block, wherein a representation data that provides a two-dimensional (2D) representation of data items of the data blob is to be assembled from the plurality of representation portions; the plurality of representation portions is to be generated from a subset of data blocks of the plurality of data blocks by a subset of node devices of the grid of node devices that store the subset of data blocks; and the subset of node devices includes the node device. The method may further include using the data blob metadata and a node block map of a plurality of node block maps to derive one or more transforms to be performed at the node device with the data block to generate the at least one row of the representation portion, wherein: the plurality of node block maps is provided to the subset of node devices to generate the plurality of representation portions from the subset of data blocks; and the node block map includes an indication of which data items of the data block are required to generate the representation portion, what data values are to be generated from the required data items, and an organization of the generated data values within the representation portion. The method may further include performing, at the node device, the one or more transforms with the data block to generate the at least one row of the representation portion.

The method may include: storing, at the node device, multiple reader routines, wherein each reader routine includes other instructions executable by a processor of the node device to perform a different type of transform from others of the multiple reader routines; selecting one of the multiple reader routines to use in deriving and performing the one or more transforms based on the node block map; and using the selected reader routine to derive and perform the one or more transforms with the data block to generate the at least one row of the representation portion.

The method may include: transmitting, from the node device to a coordinating device, node data including an indication of availability of at least storage resources of the node device to enable the coordinating device to coordinate provision of the plurality of data blocks by at least one source device to the grid of node devices, and to coordinate storage of the plurality of data blocks by the grid of node devices; receiving, at the node device, a command to store the data block from the coordinating device; and receiving, at the node device, the data block from the at least one source device. The method may include: receiving, at the node device, the command to generate at least one row of the representation portion from the coordinating device; and transmitting, from the node device, the at least one row of the representation portion to the coordinating device to enable generation, at the coordinating device, of at least one row of the representation data from at least one row of each representation portion of the plurality of representation portions. The method may include: receiving, at the node device, at least a portion of the representation data from the coordinating device; receiving, at the node device, a command from the coordinating device to store the portion of the representation data; and storing, at the node device, the received portion of the representation data. The method may include: receiving, at the node device, another command to generate at least one more row of the representation portion from the data block; retrieving first state data indicative of a state of the node device after the performance of the one or more transforms to generate the at least one row of the representation portion; using the first state data to prepare the node device for another performance of the one or more transforms with the data block to generate the at least one more row of the representation portion; storing, at the node device, second state data indicative of a state of the node device after the another performance of the one or more transforms to generate the at least one more row of the representation portion; and transmitting, from the node device, the at least one more row of the representation portion to the coordinating device to enable generation, at the coordinating device, of at least one more row of the representation data from at least one more row of each representation portion of the plurality of representation portions. The method may include: using the node bock map and an identifier of the requesting device or a entity associated with the requesting device to determine whether the requesting device or the entity is authorized to access data items of the data block that are required to generate the at least one row of the representation portion; and in response to a determination that either the requesting device or the entity is not authorized to access a portion of the data items of the data block that are required to generate the at least one row of the representation portion, refraining from using the portion of the data items to generate the at least one row of the representation portion.

The node device may include a coordinating device of the grid of node devices to coordinate the generation of at least one row of each representation portion by the subset of node devices; and the method may include receiving the command from the requesting device. In response to the receipt of the command from the requesting device, the method may include performing operations including: generating the plurality of node block maps from a master block map that includes an indication of distribution of the multiple data items within the data blob among the plurality of data blocks, and an indication of the distribution of the plurality of data blocks among the grid of node devices; and distributing, from the coordinating device, the plurality of node block maps among the subset of node devices. The method may include using representation metadata including an indication of features of the representation data and the data blob metadata to derive at least one operation to perform with at least one row of at least one representation portion of the plurality of representation portions to generate the at least one row of the representation data.

The data blob may include a hypercube that employs an indexing scheme of at least 3 dimensions, and the data blob may not include the 2D representation of data provided by the representation data as a slice of the hypercube.

The foregoing, together with other features and embodiments, will become more apparent upon referring to the following specification, claims, and accompanying drawings.

BRIEF DESCRIPTION OF THE DRAWINGS

The present disclosure is described in conjunction with the appended figures:

FIG. 5 illustrates a flow chart showing an example process for adjusting a communications grid or a work project in a communications grid after a failure of a node, according to some embodiments of the present technology.

FIG. 16 illustrates an alternate example of distributed generation of representation data providing a requested representation of data items of a data blob.

FIG. 20 illustrates another example embodiment of a logic flow of distributed generation of a representation of data items of a data blob.

DETAILED DESCRIPTION

Figure 1:
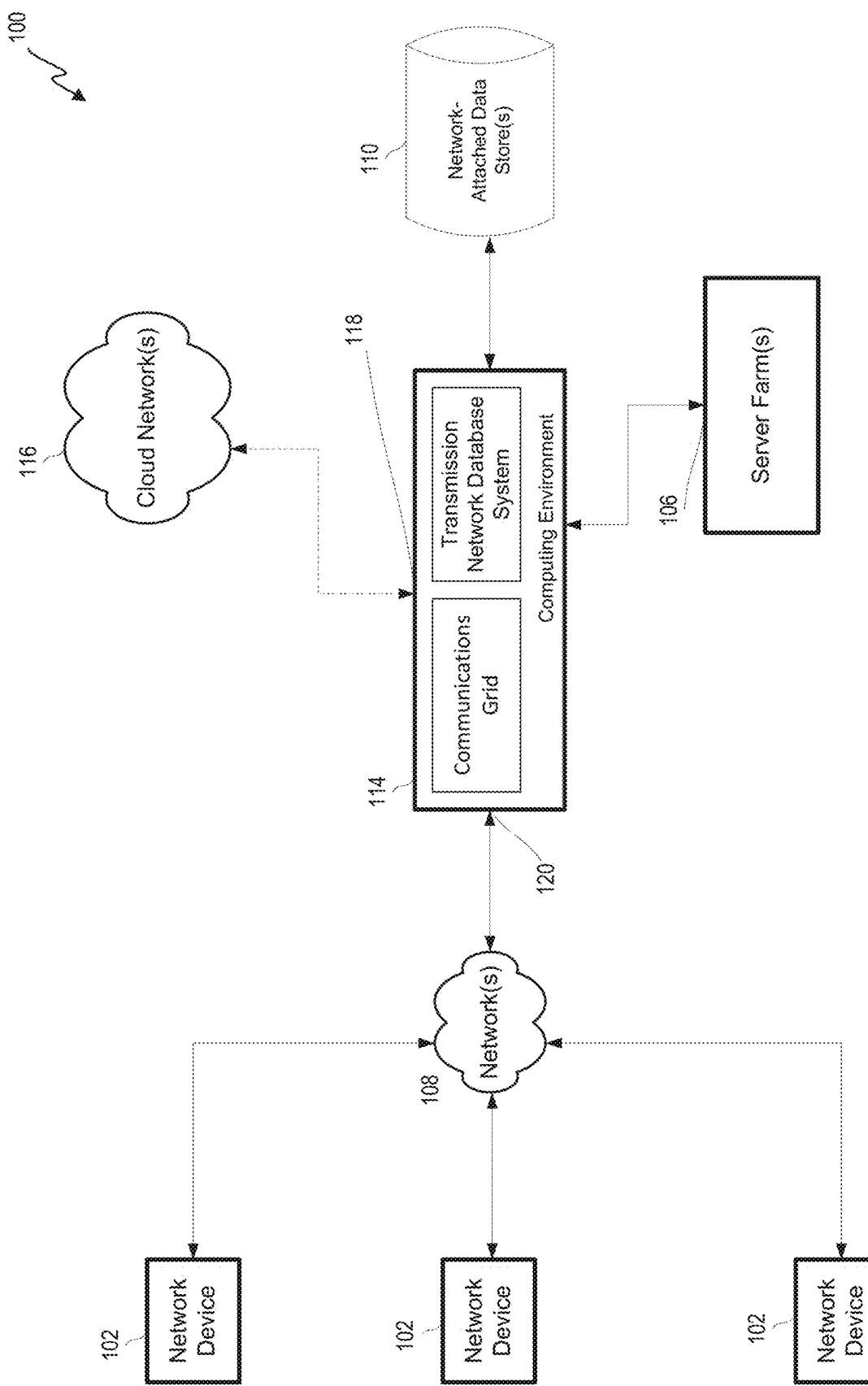
FIG. 1 illustrates a block diagram that provides an illustration of the hardware components of a computing system, according to some embodiments of the present technology.

Various embodiments described herein are generally directed to techniques for enabling one or more large data sets to be stored as a highly condensed data blob through use of dynamically distributed generation of data representations to speed data retrieval. A large data set may be stored as a highly condensed data blob that is distributed as multiple data blocks among multiple node devices of a node device grid. In an effort to reduce the quantity of node devices required to store the data blob, the generation thereof may entail the use of various normalization techniques and/or compression to the extent that data items of the data blob may cease to be byte-aligned. A data blob metadata may be generated along with the data blob to provide indications of the manner in which the data blob was generated to a coordinating device of the node device grid for use in denormalization and/or decompression of the data blob to retrieve desired data representations therefrom. The coordinating device may generate a master block map indicating the manner in which the data blob is divided into data blocks for storage among the node devices. In support of a request to retrieve a particular data representation from the data blob, the coordinating device may be provided with representation metadata specifying various aspects of the particular data representation. The coordinating device may use the data blob metadata, the representation metadata and/or the master block map to derive node block maps to be provided to at least some of the node devices that store a data block of the data blob, along with the data blob metadata. At least some of the node devices may each use the node block map it receives, along with the data blob metadata, to derive one or more transforms to perform with the data block it stores to derive a corresponding representation portion of the requested representation metadata. Each of the representation portions may then be transmitted, either directly to the requesting device or to the coordinating device to generate the particular data representation from the representation portions.

The grid of node devices may provide distributed storage for the data blocks of one or more data blobs to provide one or both of fault tolerance and/or faster access through the use of parallelism in the reception, storage, retrieval and/or transmission of the data blocks via network connections operated at least partially in parallel. The data items that make up each data blob may include any of a wide variety of types of data concerning any of a wide variety of subjects. By way of example, such data may include scientific observation data concerning geological and/or meteorological events, or from sensors laboratory experiments in areas such as particle physics. By way of another example, the such data may include indications of activities performed by a random sample of individuals of a population of people in a selected country or municipality, or of a population of a threatened species under study in the wild.

The manner in which the data blob is divided into the data blocks that are stored in among the node devices in a distributed manner may depend on numerous factors, including and not limited to, structural features of the manner in which data items are organized within the data blob, the various techniques that may be used to condense the data items to form the data blob, and/or whether the data blob is generated prior to being provided to the grid of node devices or is generated by the grid of node devices. More specifically, in some embodiments, the data blob may be provided to the node device grid after its formation. In such embodiments, the coordinating device may employ the data blob metadata, to determine the manner in which to divide the data blob into the data blocks that are to be stored by the node devices. The coordinating device may then coordinate the transfer of each data block from the source of the data blob to the one of the node devices to which the data block is assigned for storage. In other embodiments, the node device grid may receive the one or more data sets from which the data blob is to be generated. In such embodiments, the coordinating device may coordinate the performance of various normalization and/or compression techniques by the node devices to condense the data items of the one or more data sets into the data blob. In so doing, the coordinating device may also generate the data blob metadata. The coordinating device may then derive the division of the data blob into its data blocks, and the assignment of each of those data blocks to one of the node devices for storage. Regardless of the exact manner in which the data blob is formed and/or in which the data blocks thereof are distributed among the node devices for storage, the coordinating device may generate and maintain a master block map that indicates the manner in which the data blocks of the data blob are distributed among the node devices for storage.

The coordinating device may also be provided with one or more instances of representation metadata that are each descriptive of a representation of data items of the data blob that may be requested to be derived from the data blob. Such provision of each instance of representation metadata may be part of a "registration" process by which preparations are made for future requests for particular representations of particular subsets of data items of the data blob. In some embodiments, each of the representations described by one or more of the instances of representation metadata may be two-dimensional (2D) representations of various subsets of the data items of the data blob. As will be familiar to those skilled in the art, although the formation of large data sets with multiple dimensions (e.g., so-called "hypercubes") and/or other complex data structures has become increasingly commonplace, there still are numerous data analysis routines and/or other analytical tools that require input data items to be organized into some form of 2D data structure providing some form of row-and-column organization, such as tables, two-dimensional arrays, etc. Often, such a 2D representation cannot be created by simply taking a 2D slice from the multi-dimensional structure of a data set. Therefore, a large data sets with such a complex data structure may need to be subjected to one or more transforms to generate a desired 2D representation of a subset of its data items. Where one or more data sets have been condensed into a data blob, generating a 2D representation may require one or more additional transforms to reverse the normalization techniques and/or compression used to create the data blob from the one or more data sets.

Following the distribution of data blocks for storage to the node devices, and following the provision of one or more instances of representation metadata to the coordinating device, the coordinating device may receive a request from a requesting device for representation data that provides what may be a 2D representation of a subset of the data items of the data blob. In some embodiments, such a request may specify the desired representation data by specifying an identifier of the instance of representation metadata that provides a description of the desired representation data.

Upon receiving the request, the coordinating device may use a combination of the earlier received data blob metadata, the earlier derived master block map, and/or the instance of the representation metadata specified in the request to derive one or more node block maps to transmit to particular node devices of a subset of the node devices that store the particular data blocks needed to derive the requested representation data. Each node block map may convey to one of the node devices various pieces of information required to derive and/or perform one or more transforms with the data block stored by that node to generate a portion of the requested representation data. By way of example, each node block map may include an indication of what subset of the data items of the data blob are included within a data block stored by the node device to which the node block map is provided, one or more sets of data items to be retrieved from that data block, one or more types of values to derive from the one or more sets of data items within that data block, and/or a selection of a particular reader routine to be used in so doing. In various embodiments, each node device that is provided with such a node data block by the coordinating device may be additionally provided with the data blob metadata, if the data blob metadata was not already so provided, earlier.

Upon receipt of at least the node data block, each node device of the subset of node devices that is provided with one of the node data blocks may use the received node data block and/or the data blob metadata to derive one or more transforms to be performed with the data block stored by the node device to derive a corresponding one of the representation portions to be used to generate the requested representation data. Alternatively or additionally, the node device may select, based on an indication in the node block map, one of multiple reader routines stored within the node device to be executed as part of performing the one or more transforms. In some of such embodiments, each reader routines may be somewhat specialized to perform a different transform and/or a different combination of transforms, and the selection of a particular reader routine to be executed within the node device may serve to specify at least some aspects of the one or more transforms to be performed with the data block. Following such selection of reader routines and/or derivation of one or more transforms by each node device of the subset of node devices that receives the node block maps, the subset of node devices may execute their corresponding reader routines and/or perform their corresponding one or more transforms with their corresponding data blocks, at least partially in parallel, to derive their corresponding ones of the representation portions.

In some embodiments, following the performance of the one or more transforms with the data block stored by the node device, the node device may transmit the resulting representation portion to the coordinating device, along with others of the node devices that also generated representation portions from their corresponding data blocks. In such embodiments, the coordinating device, rather than the requesting device, may perform one or more further operations with the various representation portions to generate the requested representation data. Following the performance of the one or more further operations, the coordinating device may transmit the representation data to the requesting device to use as an input to an analysis requiring the representation data as an input, or to present aspects of on a display and/or through another output device.

In some embodiments, each of the node devices that generates one of the representation portions may refrain from transmitting its corresponding representation portion until completing its execution of one or more transforms to generate its corresponding representation portion. However, in other embodiments, at least one of the node devices that generates one of the representation portions may be caused to begin transmission of its corresponding representation portion as it continues to execute one or more transforms to generate more of its corresponding representation portion. Again, the representation data requested by the requesting device may be a 2D data structure with a row-and-column organization, and so one or more of the representation portions may also be such data structures. In such other embodiments, such a node device may perform just enough of the one or more transforms to generate each row of its corresponding representation portion, one row at a time, and in response to each of multiple instances of receiving a command from the coordinating device to so generate another row. As the node device completes the generation of each row, one row at a time, the node device may store indications of one or more aspects of its state in performing the one or more transformations to enable the node device to return to that state to generate the next row in response to the next instance of receipt of a command to generate the next row.

In other embodiments, following the performance of the one or more transforms with the data block stored by the node device, the node device may transmit the resulting representation portion directly to the requesting device, along with others of the node devices that also generated representation portions from their corresponding data blocks. In such embodiments, the requesting device may perform one or more further operations with the various representation portions transmitted to it by the node devices to generate the requested representation data. Thus, in such embodiments, it is the requesting device that performs the last one or more operations required to generate the representation data, and the request for the representation data is, in fact, a request to be provided with the representation portions required to enable generation the representation data. The requesting device may then use as an input to an analysis requiring the representation data as an input, or may present aspects of the representation data on a display and/or through another output device.

By distributing the derivation and/or performance of the one or more transforms required to denormalize and/or decompress various ones of the data blocks of a data blob among multiple node devices to be carried out at least partially in parallel, the amount of time required to perform such denormalization and/or decompression as part of retrieving a data representation is greatly reduced. As a result, the increased latency expected to result from the storage of one or more data sets in such a condensed form as a data blob may be sufficiently mitigated as to overcome that disadvantage. More specifically, the speed of retrieval of a data representation from such a data blob may be made comparable to the speed of retrieval typically expected in retrieving a data representation from one or more data sets stored in a more denormalized form (e.g., as a relatively sparse hypercube).

Importantly, through such distributed handling of denormalization and/or decompression, it becomes possible to achieve both a reduction in storage space and/or network bandwidth requirements by storing one or more large related data sets in such a condensed form as a data blob, and avoidance of the penalties of slower retrieval access that otherwise usually accompany such condensed storage. The storage and/or network bandwidth resources that are spared as a result of such condensed storage of one or more data sets may then be used to store additional redundant copies of the blocks of such a data blob, and/or be used to store the data block of another data blob.

With general reference to notations and nomenclature used herein, portions of the detailed description that follows may be presented in terms of program procedures executed by a processor of a machine or of multiple networked machines. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical communications capable of being stored, transferred, combined, compared, and otherwise manipulated. It proves convenient at times, principally for reasons of common usage, to refer to what is communicated as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include machines selectively activated or configured by a routine stored within that is written in accordance with the teachings herein, and/or include apparatus specially constructed for the required purpose. Various embodiments also relate to apparatus or systems for performing these operations. These apparatus may be specially constructed for the required purpose or may include a general purpose computer. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

Systems depicted in some of the figures may be provided in various configurations. In some embodiments, the systems may be configured as a distributed system where one or more components of the system are distributed across one or more networks in a cloud computing system and/or a fog computing system.

FIG. 1 is a block diagram that provides an illustration of the hardware components of a data transmission network 100, according to embodiments of the present technology. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. Data transmission network 100 also includes one or more network devices 102. Network devices 102 may include client devices that attempt to communicate with computing environment 114. For example, network devices 102 may send data to the computing environment 114 to be processed, may send signals to the computing environment 114 to control different aspects of the computing environment or the data it is processing, among other reasons. Network devices 102 may interact with the computing environment 114 through a number of ways, such as, for example, over one or more networks 108. As shown in FIG. 1, computing environment 114 may include one or more other systems. For example, computing environment 114 may include a database system 118 and/or a communications grid 120.

Figure 8:
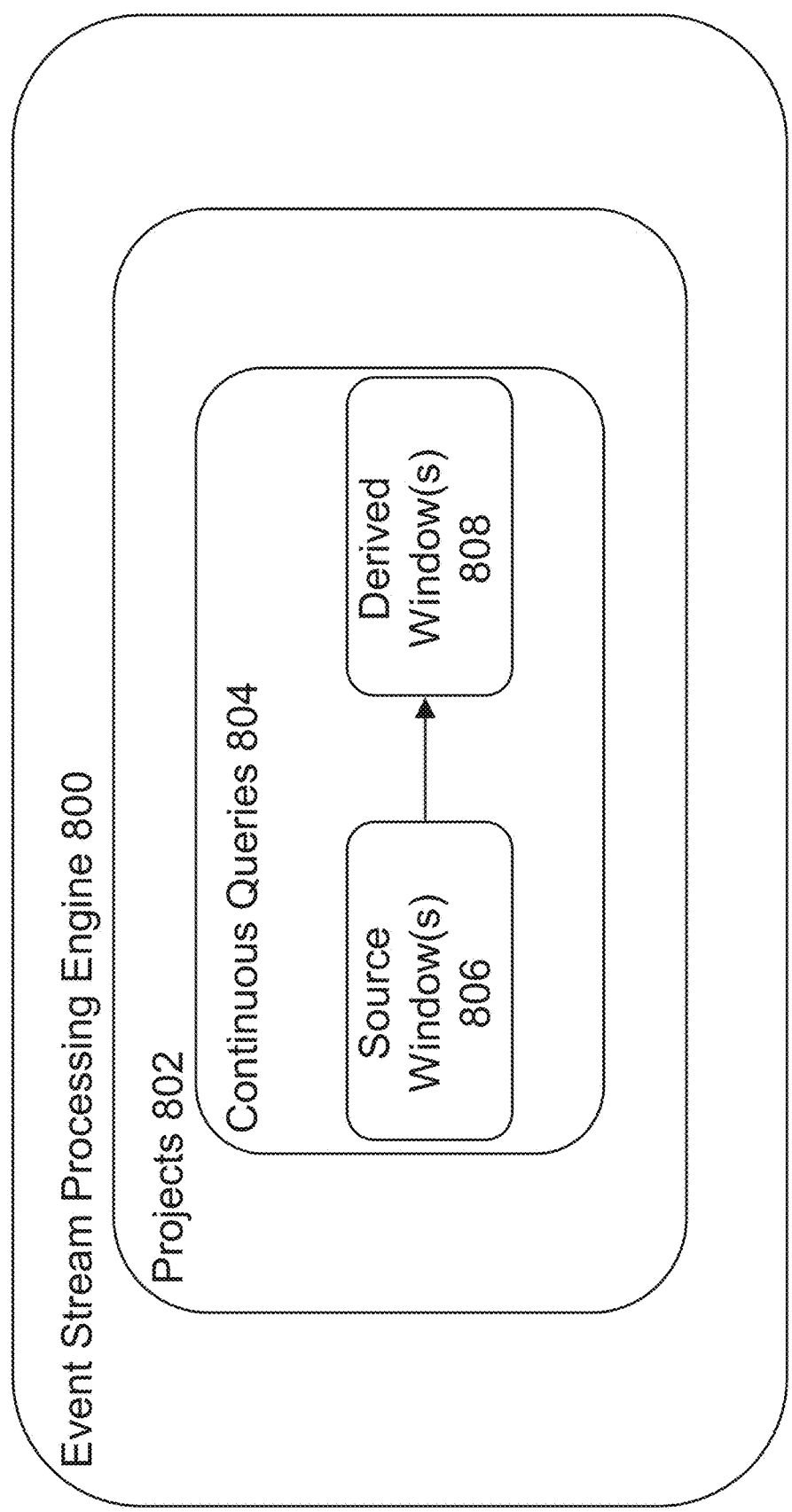
FIG. 8 illustrates a block diagram including components of an Event Stream Processing Engine (ESPE), according to embodiments of the present technology.
Figure 9:
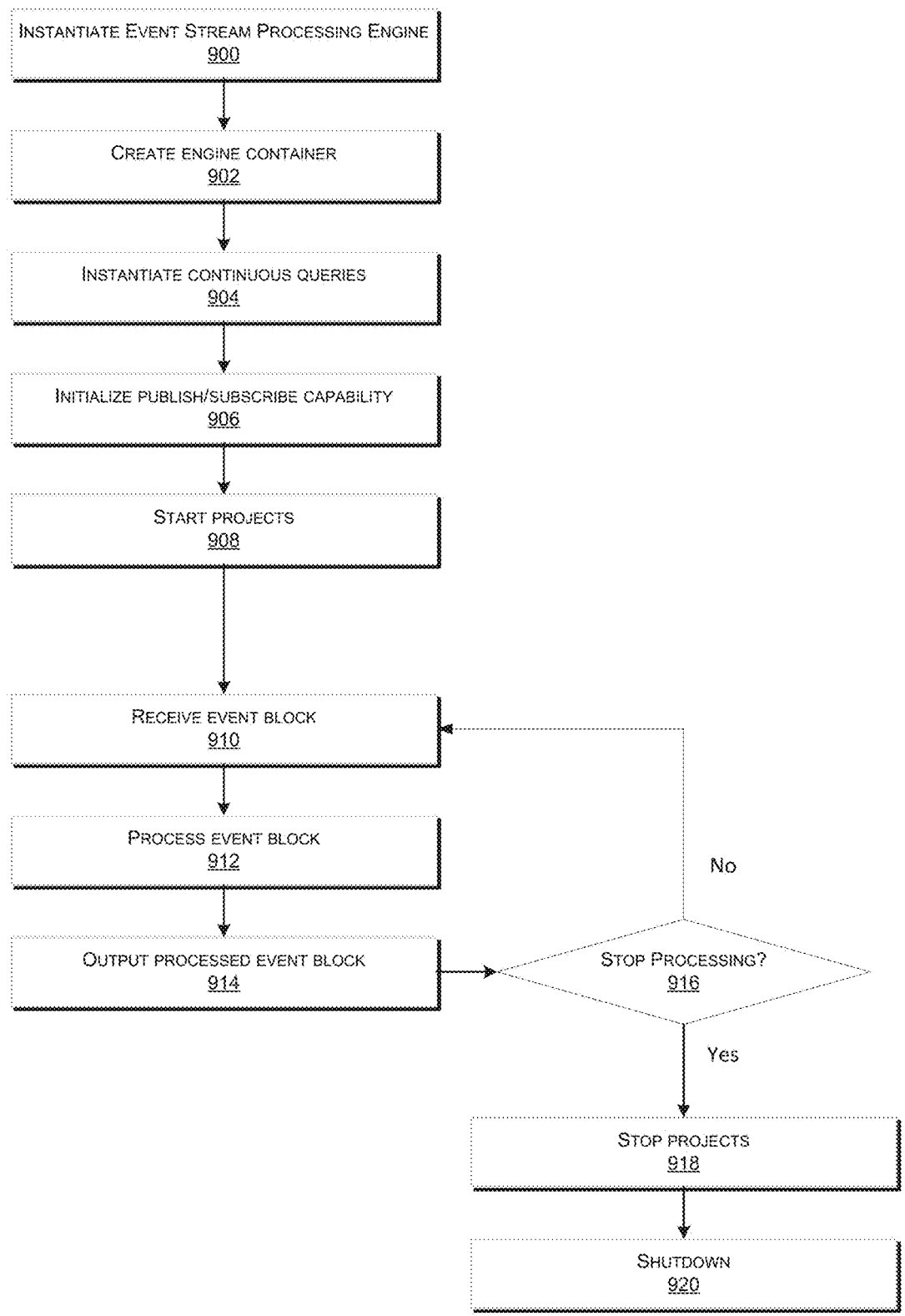
FIG. 9 illustrates a flow chart showing an example process including operations performed by an event stream processing engine, according to some embodiments of the present technology.
Figure 10:
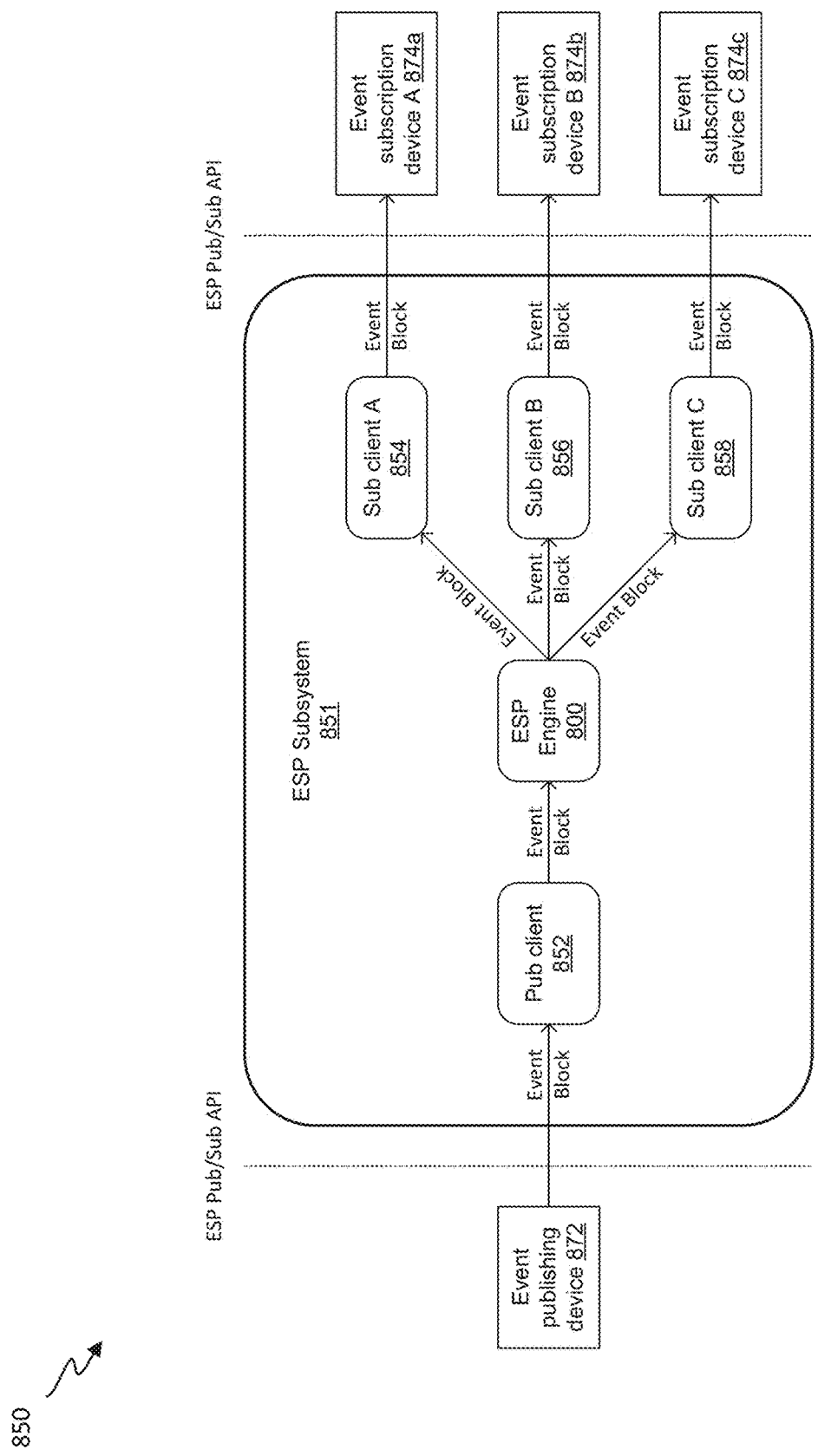
FIG. 10 illustrates an ESP system interfacing between a publishing device and multiple event subscribing devices, according to embodiments of the present technology.

In other embodiments, network devices may provide a large amount of data, either all at once or streaming over a period of time (e.g., using event stream processing (ESP), described further with respect to FIGS. 8-10), to the computing environment 114 via networks 108. For example, network devices 102 may include network computers, sensors, databases, or other devices that may transmit or otherwise provide data to computing environment 114. For example, network devices may include local area network devices, such as routers, hubs, switches, or other computer networking devices. These devices may provide a variety of stored or generated data, such as network data or data specific to the network devices themselves. Network devices may also include sensors that monitor their environment or other devices to collect data regarding that environment or those devices, and such network devices may provide data they collect over time. Network devices may also include devices within the internet of things, such as devices within a home automation network. Some of these devices may be referred to as edge devices, and may involve edge computing circuitry. Data may be transmitted by network devices directly to computing environment 114 or to network-attached data stores, such as network-attached data stores 110 for storage so that the data may be retrieved later by the computing environment 114 or other portions of data transmission network 100.

Data transmission network 100 may also include one or more network-attached data stores 110. Network-attached data stores 110 are used to store data to be processed by the computing environment 114 as well as any intermediate or final data generated by the computing system in non-volatile memory. However in certain embodiments, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated on-the-fly. In this non-limiting situation, the computing environment 114 may be configured to retain the processed information within memory so that responses can be generated for the user at different levels of detail as well as allow a user to interactively query against this information.

Network-attached data stores may store a variety of different types of data organized in a variety of different ways and from a variety of different sources. For example, network-attached data storage may include storage other than primary storage located within computing environment 114 that is directly accessible by processors located therein. Network-attached data storage may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves and/or transitory electronic signals. Examples of a non-transitory medium may include, for example, a magnetic disk or tape, optical storage media such as compact disk or digital versatile disk, flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data, such as manufacturing data (e.g., a database containing records identifying products being manufactured with parameter data for each product, such as colors and models) or product sales databases (e.g., a database containing individual data records identifying details of individual product sales).

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time stamped data may be aggregated by time (e.g., into daily time period units) to generate time series data and/or structured hierarchically according to one or more dimensions (e.g., parameters, attributes, and/or variables). For example, data may be stored in a hierarchical data structure, such as a ROLAP OR MOLAP database, or may be stored in another tabular form, such as in a flat-hierarchy form.

Data transmission network 100 may also include one or more server farms 106. Computing environment 114 may route select communications or data to the one or more sever farms 106 or one or more servers within the server farms. Server farms 106 can be configured to provide information in a predetermined manner. For example, server farms 106 may access data to transmit in response to a communication. Server farms 106 may be separately housed from each other device within data transmission network 100, such as computing environment 114, and/or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain embodiments, services provided by the cloud network 116 may include a host of services that are made available to users of the cloud infrastructure system on demand Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network can dynamically scale to meet the needs of its users. The cloud network 116 may comprise one or more computers, servers, and/or systems. In some embodiments, the computers, servers, and/or systems that make up the cloud network 116 are different from the user's own on-premises computers, servers, and/or systems. For example, the cloud network 116 may host an application, and a user may, via a communication network such as the Internet, on demand, order and use the application.

While each device, server and system in FIG. 1 is shown as a single device, it will be appreciated that multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between servers 106 and computing environment 114 or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a Bluetooth or a Bluetooth Low Energy channel. A wired network may include a wired interface. The wired and/or wireless networks may be implemented using routers, access points, bridges, gateways, or the like, to connect devices in the network 114, as will be further described with respect to FIG. 2. The one or more networks 108 can be incorporated entirely within or can include an intranet, an extranet, or a combination thereof. In one embodiment, communications between two or more systems and/or devices can be achieved by a secure communications protocol, such as secure sockets layer (SSL) or transport layer security (TLS). In addition, data and/or transactional details may be encrypted.

Some aspects may utilize the Internet of Things (IoT), where things (e.g., machines, devices, phones, sensors) can be connected to networks and the data from these things can be collected and processed within the things and/or external to the things. For example, the IoT can include sensors in many different devices, and high value analytics can be applied to identify hidden relationships and drive increased efficiencies. This can apply to both big data analytics and real-time (e.g., ESP) analytics. This will be described further below with respect to FIG. 2.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The compute nodes in the grid-based computing system 120 and the transmission network database system 118 may share the same processor hardware, such as processors that are located within computing environment 114.

Figure 2:
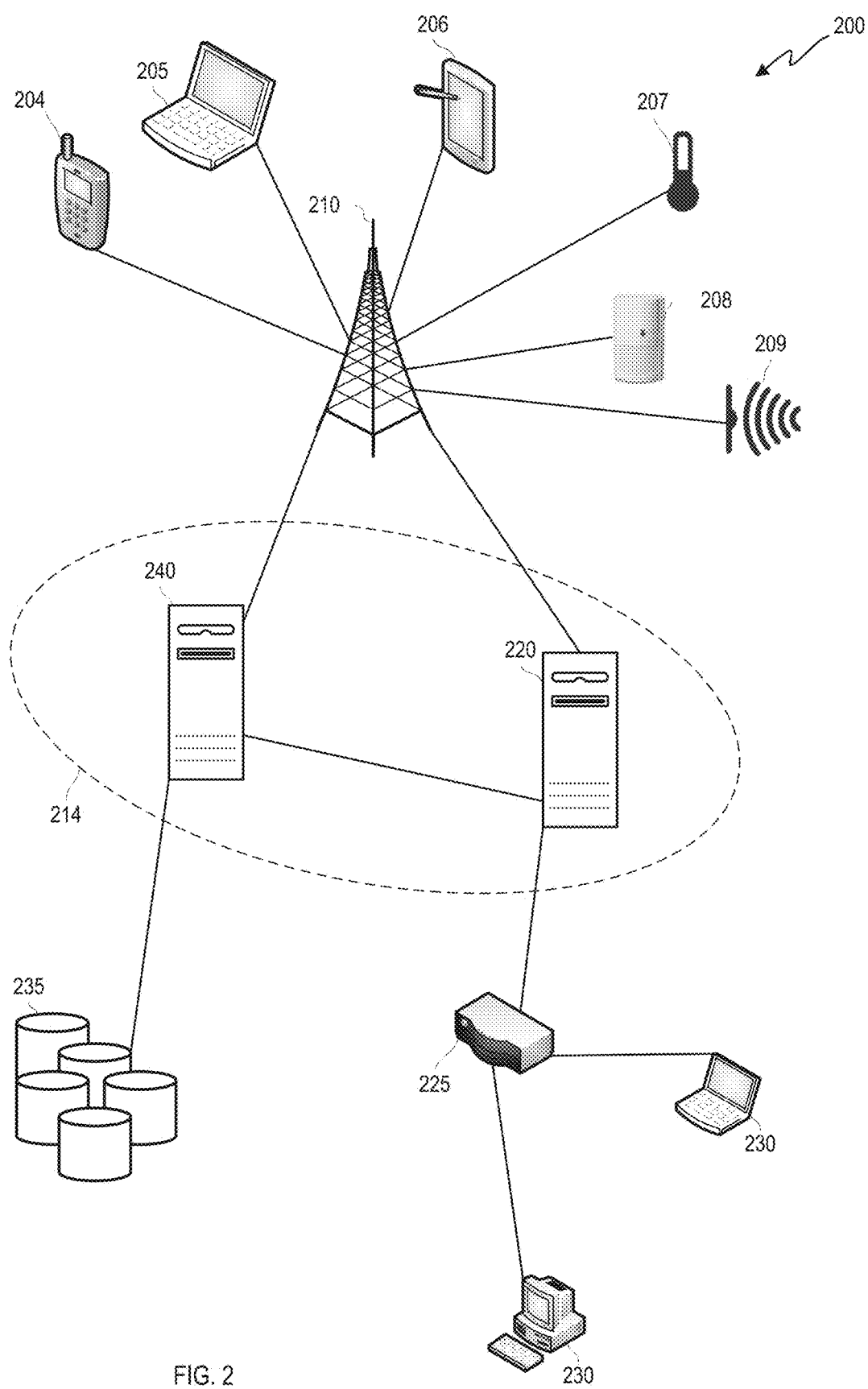
FIG. 2 illustrates an example network including an example set of devices communicating with each other over an exchange system and via a network, according to some embodiments of the present technology.

FIG. 2 illustrates an example network including an example set of devices communicating with each other over an exchange system and via a network, according to embodiments of the present technology. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). The communication can be routed to another network device, such as network devices 205-209, via base station 210. The communication can also be routed to computing environment 214 via base station 210. For example, network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, electrical current, among others. The sensors may be mounted to various components used as part of a variety of different types of systems (e.g., an oil drilling operation). The network devices may detect and record data related to the environment that it monitors, and transmit that data to computing environment 214.

As noted, one type of system that may include various sensors that collect data to be processed and/or transmitted to a computing environment according to certain embodiments includes an oil drilling system. For example, the one or more drilling operation sensors may include surface sensors that measure a hook load, a fluid rate, a temperature and a density in and out of the wellbore, a standpipe pressure, a surface torque, a rotation speed of a drill pipe, a rate of penetration, a mechanical specific energy, etc. and downhole sensors that measure a rotation speed of a bit, fluid densities, downhole torque, downhole vibration (axial, tangential, lateral), a weight applied at a drill bit, an annular pressure, a differential pressure, an azimuth, an inclination, a dog leg severity, a measured depth, a vertical depth, a downhole temperature, etc. Besides the raw data collected directly by the sensors, other data may include parameters either developed by the sensors or assigned to the system by a client or other controlling device. For example, one or more drilling operation control parameters may control settings such as a mud motor speed to flow ratio, a bit diameter, a predicted formation top, seismic data, weather data, etc. Other data may be generated using physical models such as an earth model, a weather model, a seismic model, a bottom hole assembly model, a well plan model, an annular friction model, etc. In addition to sensor and control settings, predicted outputs, of for example, the rate of penetration, mechanical specific energy, hook load, flow in fluid rate, flow out fluid rate, pump pressure, surface torque, rotation speed of the drill pipe, annular pressure, annular friction pressure, annular temperature, equivalent circulating density, etc. may also be stored in the data warehouse.

In another example, another type of system that may include various sensors that collect data to be processed and/or transmitted to a computing environment according to certain embodiments includes a home automation or similar automated network in a different environment, such as an office space, school, public space, sports venue, or a variety of other locations. Network devices in such an automated network may include network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In another embodiment, a network device can allow a user to access, control, and/or configure devices, such as office-related devices (e.g., copy machine, printer, or fax machine), audio and/or video related devices (e.g., a receiver, a speaker, a projector, a DVD player, or a television), media-playback devices (e.g., a compact disc player, a CD player, or the like), computing devices (e.g., a home computer, a laptop computer, a tablet, a personal digital assistant (PDA), a computing device, or a wearable device), lighting devices (e.g., a lamp or recessed lighting), devices associated with a security system, devices associated with an alarm system, devices that can be operated in an automobile (e.g., radio devices, navigation devices), and/or the like. Data may be collected from such various sensors in raw form, or data may be processed by the sensors to create parameters or other data either developed by the sensors based on the raw data or assigned to the system by a client or other controlling device.

In another example, another type of system that may include various sensors that collect data to be processed and/or transmitted to a computing environment according to certain embodiments includes a power or energy grid. A variety of different network devices may be included in an energy grid, such as various devices within one or more power plants, energy farms (e.g., wind farm, solar farm, among others) energy storage facilities, factories, homes and businesses of consumers, among others. One or more of such devices may include one or more sensors that detect energy gain or loss, electrical input or output or loss, and a variety of other efficiencies. These sensors may collect data to inform users of how the energy grid, and individual devices within the grid, may be functioning and how they may be made more efficient.

Network device sensors may also perform processing on data it collects before transmitting the data to the computing environment 114, or before deciding whether to transmit data to the computing environment 114. For example, network devices may determine whether data collected meets certain rules, for example by comparing data or values calculated from the data and comparing that data to one or more thresholds. The network device may use this data and/or comparisons to determine if the data should be transmitted to the computing environment 214 for further use or processing.

Computing environment 214 may include machines 220 and 240. Although computing environment 214 is shown in FIG. 2 as having two machines, 220 and 240, computing environment 214 may have only one machine or may have more than two machines. The machines that make up computing environment 214 may include specialized computers, servers, or other machines that are configured to individually and/or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other inter-network or intra-network connection components. For example, computing environment 214 may communicate with devices 230 via one or more routers 225. Computing environment 214 may collect, analyze and/or store data from or pertaining to communications, client device operations, client rules, and/or user-associated actions stored at one or more data stores 235. Such data may influence communication routing to the devices within computing environment 214, how data is stored or processed within computing environment 214, among other actions.

Notably, various other devices can further be used to influence communication routing and/or processing between devices within computing environment 214 and with devices outside of computing environment 214. For example, as shown in FIG. 2, computing environment 214 may include a web server 240. Thus, computing environment 214 can retrieve data of interest, such as client information (e.g., product information, client rules, etc.), technical product details, news, current or predicted weather, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices may receive data periodically from network device sensors as the sensors continuously sense, monitor and track changes in their environments. Devices within computing environment 214 may also perform pre-analysis on data it receives to determine if the data received should be processed as part of an ongoing project. The data received and collected by computing environment 214, no matter what the source or method or timing of receipt, may be processed over a period of time for a client to determine results data based on the client's needs and rules.

Figure 3:
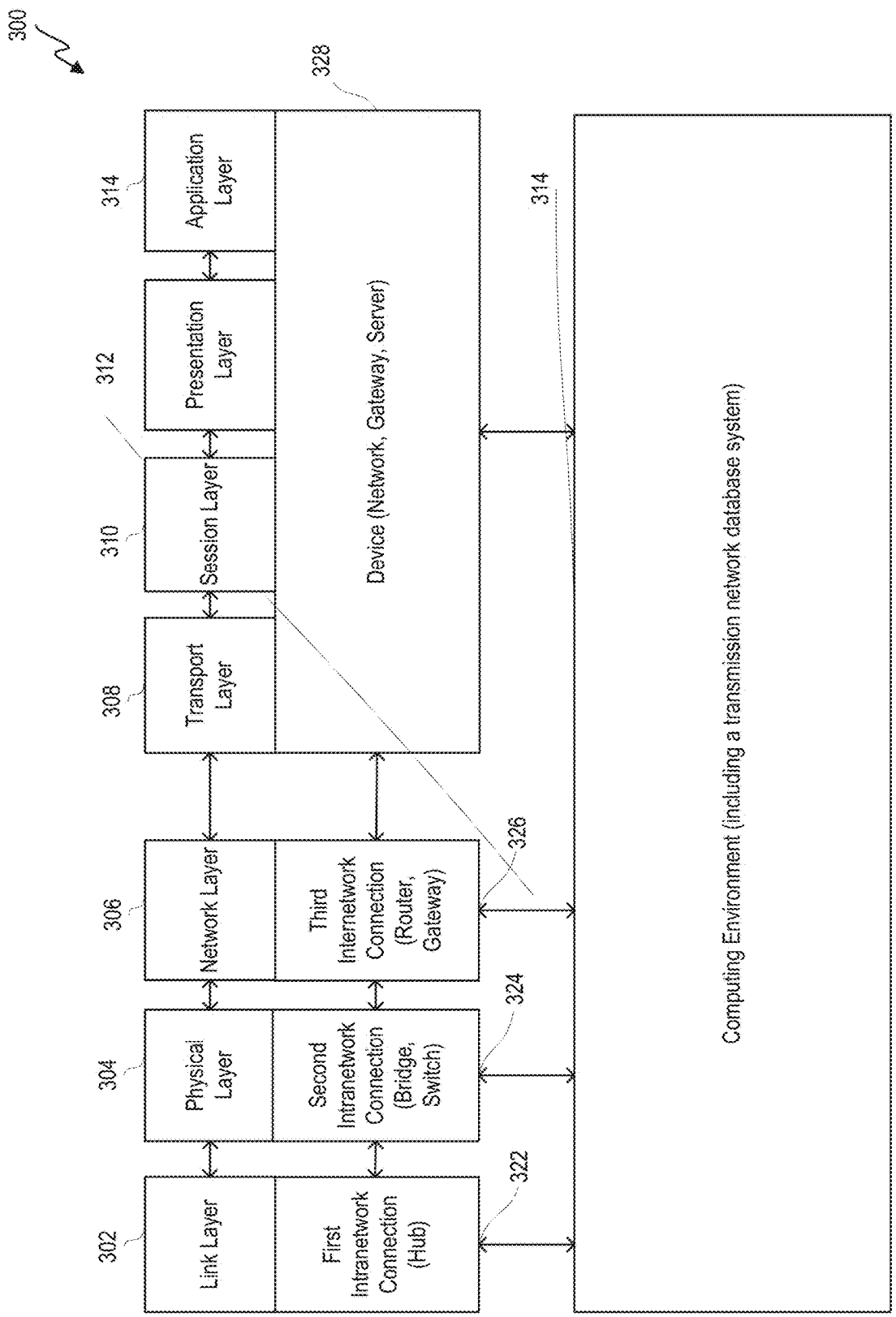
FIG. 3 illustrates a representation of a conceptual model of a communications protocol system, according to some embodiments of the present technology.

FIG. 3 illustrates a representation of a conceptual model of a communications protocol system, according to embodiments of the present technology. More specifically, FIG. 3 identifies operation of a computing environment in an Open Systems Interaction model that corresponds to various connection components. The model 300 shows, for example, how a computing environment, such as computing environment 314 (or computing environment 214 in FIG. 2) may communicate with other devices in its network, and control how communications between the computing environment and other devices are executed and under what conditions.

The model can include layers 302-314. The layers are arranged in a stack. Each layer in the stack serves the layer one level higher than it (except for the application layer, which is the highest layer), and is served by the layer one level below it (except for the physical layer, which is the lowest layer). The physical layer is the lowest layer because it receives and transmits raw bites of data, and is the farthest layer from the user in a communications system. On the other hand, the application layer is the highest layer because it interacts directly with a software application.

As noted, the model includes a physical layer 302. Physical layer 302 represents physical communication, and can define parameters of that physical communication. For example, such physical communication may come in the form of electrical, optical, or electromagnetic signals. Physical layer 302 also defines protocols that may control communications within a data transmission network.

Link layer 304 defines links and mechanisms used to transmit (i.e., move) data across a network. The link layer manages node-to-node communications, such as within a grid computing environment. Link layer 304 can detect and correct errors (e.g., transmission errors in the physical layer 302). Link layer 304 can also include a media access control (MAC) layer and logical link control (LLC) layer.

Network layer 306 defines the protocol for routing within a network. In other words, the network layer coordinates transferring data across nodes in a same network (e.g., such as a grid computing environment). Network layer 306 can also define the processes used to structure local addressing within the network.

Transport layer 308 can manage the transmission of data and the quality of the transmission and/or receipt of that data. Transport layer 308 can provide a protocol for transferring data, such as, for example, a Transmission Control Protocol (TCP). Transport layer 308 can assemble and disassemble data frames for transmission. The transport layer can also detect transmission errors occurring in the layers below it.

Session layer 310 can establish, maintain, and manage communication connections between devices on a network. In other words, the session layer controls the dialogues or nature of communications between network devices on the network. The session layer may also establish checkpointing, adjournment, termination, and restart procedures.

Presentation layer 312 can provide translation for communications between the application and network layers. In other words, this layer may encrypt, decrypt and/or format data based on data types and/or encodings known to be accepted by an application or network layer.

Application layer 314 interacts directly with software applications and end users, and manages communications between them. Application layer 314 can identify destinations, local resource states or availability and/or communication content or formatting using the applications.

Intra-network connection components 322 and 324 are shown to operate in lower levels, such as physical layer 302 and link layer 304, respectively. For example, a hub can operate in the physical layer, a switch can operate in the physical layer, and a router can operate in the network layer. Inter-network connection components 326 and 328 are shown to operate on higher levels, such as layers 306-314. For example, routers can operate in the network layer and network devices can operate in the transport, session, presentation, and application layers.

As noted, a computing environment 314 can interact with and/or operate on, in various embodiments, one, more, all or any of the various layers. For example, computing environment 314 can interact with a hub (e.g., via the link layer) so as to adjust which devices the hub communicates with. The physical layer may be served by the link layer, so it may implement such data from the link layer. For example, the computing environment 314 may control which devices it will receive data from. For example, if the computing environment 314 knows that a certain network device has turned off, broken, or otherwise become unavailable or unreliable, the computing environment 314 may instruct the hub to prevent any data from being transmitted to the computing environment 314 from that network device. Such a process may be beneficial to avoid receiving data that is inaccurate or that has been influenced by an uncontrolled environment. As another example, computing environment 314 can communicate with a bridge, switch, router or gateway and influence which device within the system (e.g., system 200) the component selects as a destination. In some embodiments, computing environment 314 can interact with various layers by exchanging communications with equipment operating on a particular layer by routing or modifying existing communications. In another embodiment, such as in a grid computing environment, a node may determine how data within the environment should be routed (e.g., which node should receive certain data) based on certain parameters or information provided by other layers within the model.

As noted, the computing environment 314 may be a part of a communications grid environment, the communications of which may be implemented as shown in the protocol of FIG. 3. For example, referring back to FIG. 2, one or more of machines 220 and 240 may be part of a communications grid computing environment. A gridded computing environment may be employed in a distributed system with non-interactive workloads where data resides in memory on the machines, or compute nodes. In such an environment, analytic code, instead of a database management system, controls the processing performed by the nodes. Data is co-located by pre-distributing it to the grid nodes, and the analytic code on each node loads the local data into memory. Each node may be assigned a particular task such as a portion of a processing project, or to organize or control other nodes within the grid.

Figure 4:
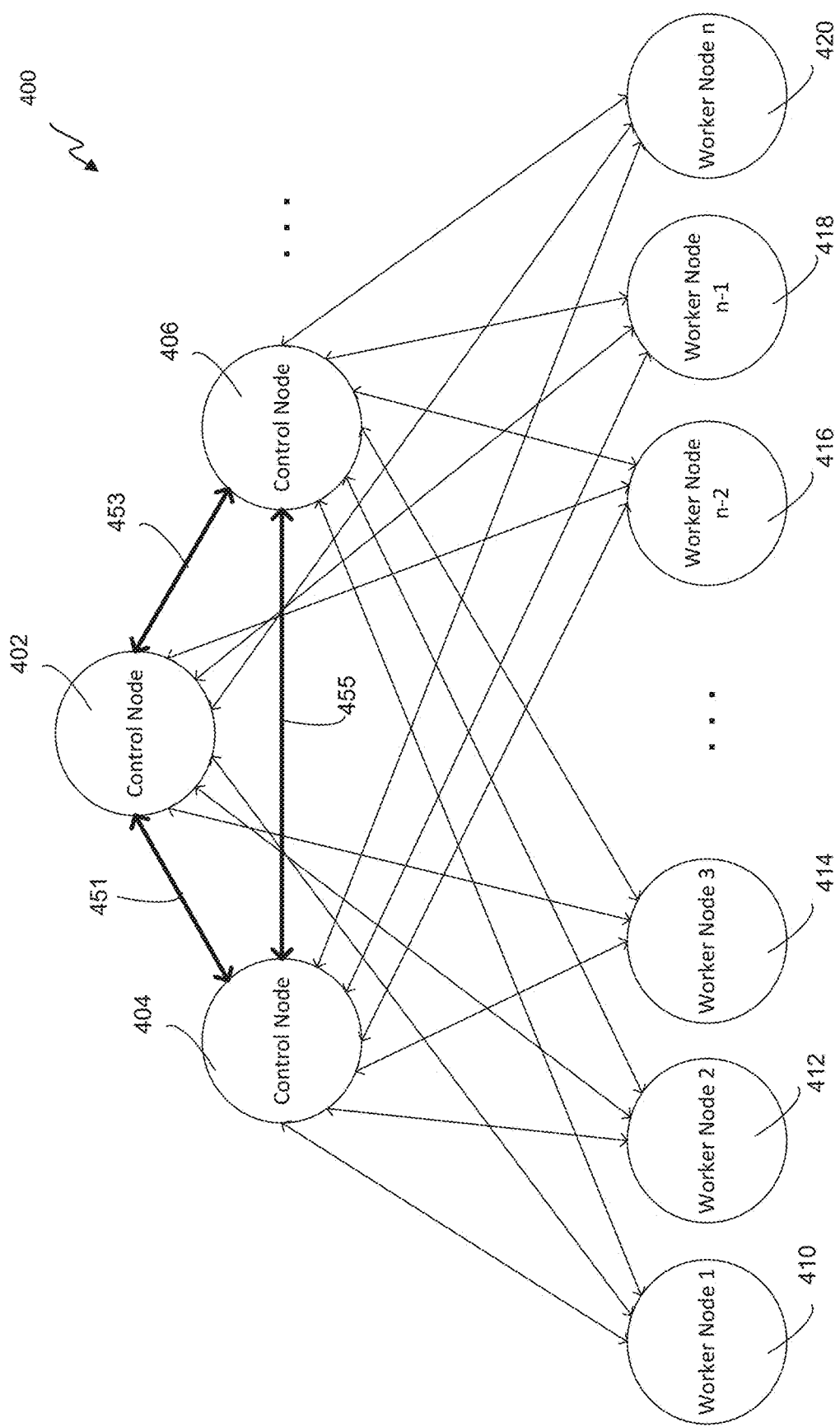
FIG. 4 illustrates a communications grid computing system including a variety of control and worker nodes, according to some embodiments of the present technology.

FIG. 4 illustrates a communications grid computing system 400 including a variety of control and worker nodes, according to embodiments of the present technology. Communications grid computing system 400 includes three control nodes and one or more worker nodes. Communications grid computing system 400 includes control nodes 402, 404, and 406. The control nodes are communicatively connected via communication paths 451, 453, and 455. Therefore, the control nodes may transmit information (e.g., related to the communications grid or notifications), to and receive information from each other. Although communications grid computing system 400 is shown in FIG. 4 as including three control nodes, the communications grid may include more or less than three control nodes.

Communications grid computing system (or just "communications grid") 400 also includes one or more worker nodes. Shown in FIG. 4 are six worker nodes 410-420. Although FIG. 4 shows six worker nodes, a communications grid according to embodiments of the present technology may include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid 400 may be connected (wired or wirelessly, and directly or indirectly) to control nodes 402-406. Therefore, each worker node may receive information from the control nodes (e.g., an instruction to perform work on a project) and may transmit information to the control nodes (e.g., a result from work performed on a project). Furthermore, worker nodes may communicate with each other (either directly or indirectly). For example, worker nodes may transmit data between each other related to a job being performed or an individual task within a job being performed by that worker node. However, in certain embodiments, worker nodes may not, for example, be connected (communicatively or otherwise) to certain other worker nodes. In an embodiment, worker nodes may only be able to communicate with the control node that controls it, and may not be able to communicate with other worker nodes in the communications grid, whether they are other worker nodes controlled by the control node that controls the worker node, or worker nodes that are controlled by other control nodes in the communications grid.

A control node may connect with an external device with which the control node may communicate (e.g., a grid user, such as a server or computer, may connect to a controller of the grid). For example, a server or computer may connect to control nodes and may transmit a project or job to the node. The project may include a data set. The data set may be of any size. Once the control node receives such a project including a large data set, the control node may distribute the data set or projects related to the data set to be performed by worker nodes. Alternatively, for a project including a large data set, the data set may be received or stored by a machine other than a control node (e.g., a Hadoop data node employing Hadoop Distributed File System, or HDFS).

Control nodes may maintain knowledge of the status of the nodes in the grid (i.e., grid status information), accept work requests from clients, subdivide the work across worker nodes, coordinate the worker nodes, among other responsibilities. Worker nodes may accept work requests from a control node and provide the control node with results of the work performed by the worker node. A grid may be started from a single node (e.g., a machine, computer, server, etc.). This first node may be assigned or may start as the primary control node that will control any additional nodes that enter the grid.

When a project is submitted for execution (e.g., by a client or a controller of the grid) it may be assigned to a set of nodes. After the nodes are assigned to a project, a data structure (i.e., a communicator) may be created. The communicator may be used by the project for information to be shared between the project code running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node receives a project, the primary control node may distribute portions of the project to its worker nodes for execution. For example, when a project is initiated on communications grid 400, primary control node 402 controls the work to be performed for the project in order to complete the project as requested or instructed. The primary control node may distribute work to the worker nodes based on various factors, such as which subsets or portions of projects may be completed most efficiently and in the correct amount of time. For example, a worker node may perform analysis on a portion of data that is already local (e.g., stored on) the worker node. The primary control node also coordinates and processes the results of the work performed by each worker node after each worker node executes and completes its job. For example, the primary control node may receive a result from one or more worker nodes, and the control node may organize (e.g., collect and assemble) the results received and compile them to produce a complete result for the project received from the end user.

Any remaining control nodes, such as control nodes 404 and 406, may be assigned as backup control nodes for the project. In an embodiment, backup control nodes may not control any portion of the project. Instead, backup control nodes may serve as a backup for the primary control node and take over as primary control node if the primary control node were to fail. If a communications grid were to include only a single control node, and the control node were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes, including a backup control node, may be beneficial.

To add another node or machine to the grid, the primary control node may open a pair of listening sockets, for example. A socket may be used to accept work requests from clients, and the second socket may be used to accept connections from other grid nodes. The primary control node may be provided with a list of other nodes (e.g., other machines, computers, servers) that will participate in the grid, and the role that each node will fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it will check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. However, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404 and 406 (and, for example, to other control or worker nodes within the communications grid). Such communications may sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes in the grid, unique identifiers of the nodes, or their relationships with the primary control node) and the status of a project (including, for example, the status of each worker node's portion of the project). The snapshot may also include analysis or results received from worker nodes in the communications grid. The backup control nodes may receive and store the backup data received from the primary control node. The backup control nodes may transmit a request for such a snapshot (or other information) from the primary control node, or the primary control node may send such information periodically to the backup control nodes.

As noted, the backup data may allow the backup control node to take over as primary control node if the primary control node fails without requiring the grid to start the project over from scratch. If the primary control node fails, the backup control node that will take over as primary control node may retrieve the most recent version of the snapshot received from the primary control node and use the snapshot to continue the project from the stage of the project indicated by the backup data. This may prevent failure of the project as a whole.

A backup control node may use various methods to determine that the primary control node has failed. In one example of such a method, the primary control node may transmit (e.g., periodically) a communication to the backup control node that indicates that the primary control node is working and has not failed, such as a heartbeat communication. The backup control node may determine that the primary control node has failed if the backup control node has not received a heartbeat communication for a certain predetermined period of time. Alternatively, a backup control node may also receive a communication from the primary control node itself (before it failed) or from a worker node that the primary control node has failed, for example because the primary control node has failed to communicate with the worker node.

Different methods may be performed to determine which backup control node of a set of backup control nodes (e.g., backup control nodes 404 and 406) will take over for failed primary control node 402 and become the new primary control node. For example, the new primary control node may be chosen based on a ranking or "hierarchy" of backup control nodes based on their unique identifiers. In an alternative embodiment, a backup control node may be assigned to be the new primary control node by another device in the communications grid or from an external device (e.g., a system infrastructure or an end user, such as a server or computer, controlling the communications grid). In another alternative embodiment, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative embodiment, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed.

FIG. 5 illustrates a flow chart showing an example process for adjusting a communications grid or a work project in a communications grid after a failure of a node, according to embodiments of the present technology. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
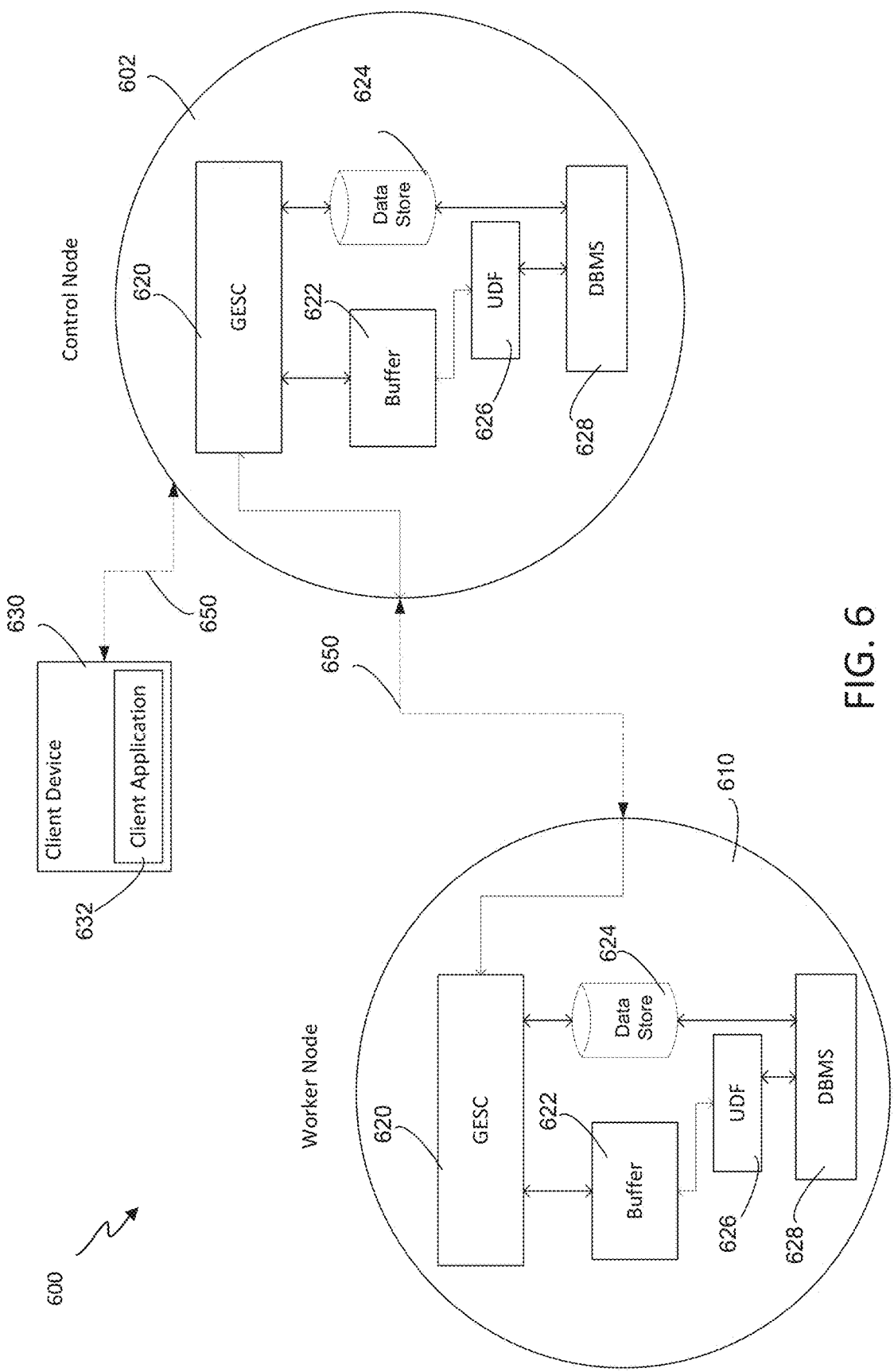
FIG. 6 illustrates a portion of a communications grid computing system including a control node and a worker node, according to some embodiments of the present technology.

FIG. 6 illustrates a portion of a communications grid computing system 600 including a control node and a worker node, according to embodiments of the present technology. Communications grid 600 computing system includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via path 650.

Similar to in FIG. 4, communications grid computing system (or just "communications grid") 600 includes data processing nodes (control node 602 and worker node 610). Nodes 602 and 610 comprise multi-core data processors. Each node 602 and 610 includes a grid-enabled software component (GESC) 620 that executes on the data processor associated with that node and interfaces with buffer memory 622 also associated with that node. Each node 602 and 610 includes a database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However in certain embodiments, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DMBS 628 to transfer data to or receive data from the database stored in the data stores 624 that are managed by the DBMS. For example, UDF 626 can be invoked by the DBMS to provide data to the GESC for processing. The UDF 626 may establish a socket connection (not shown) with the GESC to transfer the data. Alternatively, the UDF 626 can transfer data to the GESC by writing data to shared memory accessible by both the UDF and the GESC.

The GESC 620 at the nodes 602 and 620 may be connected via a network, such as network 108 shown in FIG. 1. Therefore, nodes 602 and 620 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client deice 630. More specifically, control node 602 may communicate with client application 632 hosted by the client device 630 to receive queries and to respond to those queries after processing large amounts of data.

DMBS 628 may control the creation, maintenance, and use of database or data structure (not shown) within a nodes 602 or 610. The database may organize data stored in data stores 624. The DMBS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
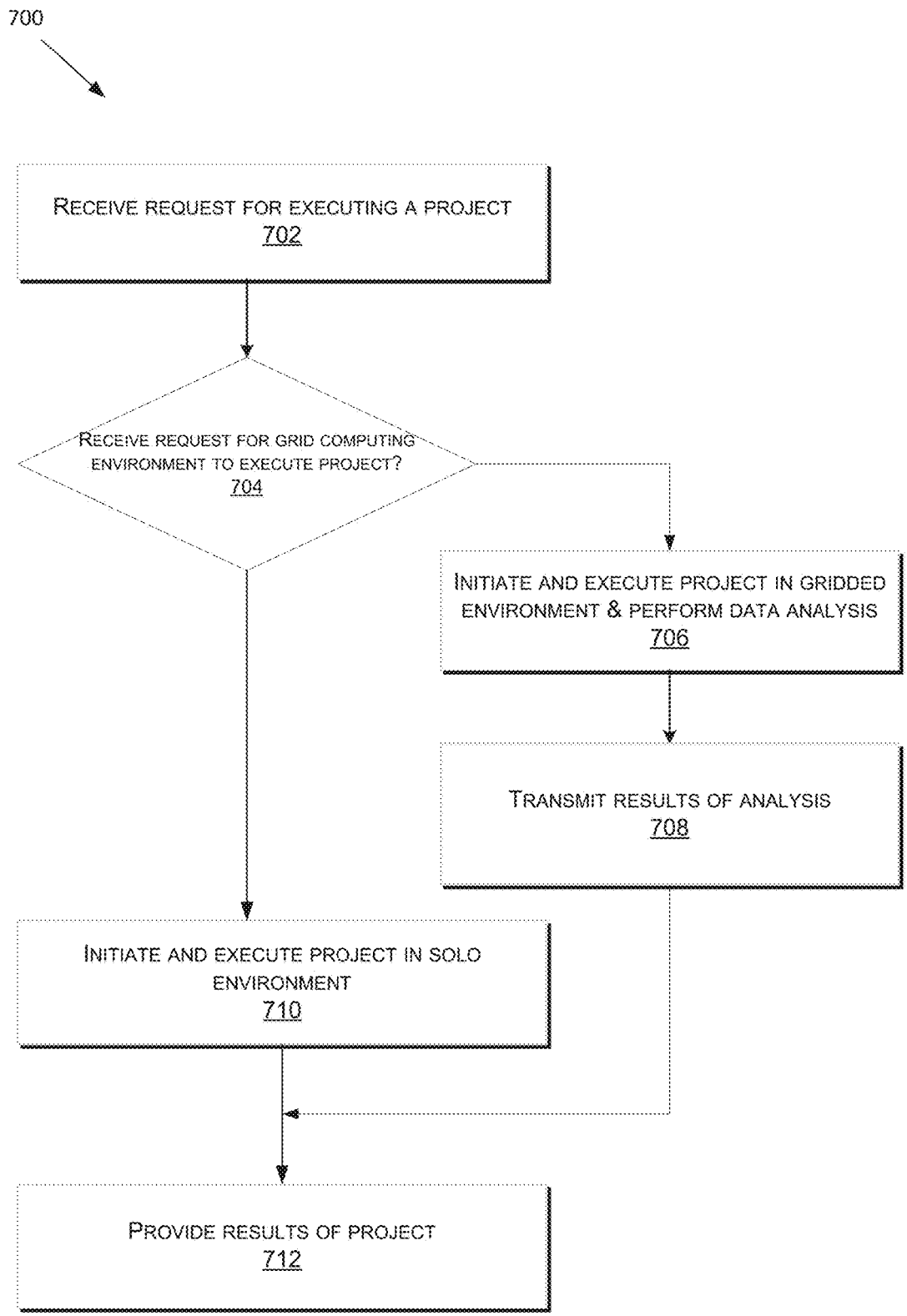
FIG. 7 illustrates a flow chart showing an example process for executing a data analysis or processing project, according to some embodiments of the present technology.

FIG. 7 illustrates a flow chart showing an example method for executing a project within a grid computing system, according to embodiments of the present technology. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 874*a-c*, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

FIG. 8 illustrates a block diagram including components of an Event Stream Processing Engine (ESPE), according to embodiments of the present technology. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative embodiment, for example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

FIG. 9 illustrates a flow chart showing an example process including operations performed by an event stream processing engine, according to some embodiments of the present technology. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. As further understood by a person of skill in the art, various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

FIG. 10 illustrates an ESP system 850 interfacing between publishing device 872 and event subscribing devices 874a-c, according to embodiments of the present technology. ESP system 850 may include ESP device or subsystem 851, event publishing device 872, an event subscribing device A 874a, an event subscribing device B 874b, and an event subscribing device C 874c. Input event streams are output to ESP device 851 by publishing device 872. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscribing device A 874a, event subscribing device B 874b, and event subscribing device C 874c. ESP system 850 may include a greater or a fewer number of event subscribing devices of event subscribing devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 872, to publish event streams into ESPE 800 or an event subscriber, such as event subscribing device A 874a, event subscribing device B 874b, and event subscribing device C 874c, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 872, and event subscription applications instantiated at one or more of event subscribing device A 874a, event subscribing device B 874b, and event subscribing device C 874c.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the event publishing device 872.

ESP subsystem 800 may include a publishing client 852, ESPE 800, a subscribing client A 854, a subscribing client B 856, and a subscribing client C 858. Publishing client 852 may be started by an event publishing application executing at publishing device 872 using the publish/subscribe API. Subscribing client A 854 may be started by an event subscription application A, executing at event subscribing device A 874a using the publish/subscribe API. Subscribing client B 856 may be started by an event subscription application B executing at event subscribing device B 874b using the publish/subscribe API. Subscribing client C 858 may be started by an event subscription application C executing at event subscribing device C 874c using the publish/subscribe API.

An event block object containing one or more event objects is injected into a source window of the one or more source windows 806 from an instance of an event publishing application on event publishing device 872. The event block object may generated, for example, by the event publishing application and may be received by publishing client 852. A unique ID may be maintained as the event block object is passed between the one or more source windows 806 and/or the one or more derived windows 808 of ESPE 800, and to subscribing client A 854, subscribing client B 806, and subscribing client C 808 and to event subscription device A 874a, event subscription device B 874b, and event subscription device C 874c. Publishing client 852 may further generate and include a unique embedded transaction ID in the event block object as the event block object is processed by a continuous query, as well as the unique ID that publishing device 872 assigned to the event block object.

In an operation 912, the event block object is processed through the one or more continuous queries 804. In an operation 914, the processed event block object is output to one or more computing devices of the event subscribing devices 874a-c. For example, subscribing client A 804, subscribing client B 806, and subscribing client C 808 may send the received event block object to event subscription device A 874*a*, event subscription device B 874*b*, and event subscription device C 874*c*, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 872, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some embodiments, big data is processed for an analytics project after the data is received and stored. In other embodiments, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the current disclosure provide technical solutions to technical problems, such as computing problems that arise when an ESP device fails which results in a complete service interruption and potentially significant data loss. The data loss can be catastrophic when the streamed data is supporting mission critical operations such as those in support of an ongoing manufacturing or drilling operation. An embodiment of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, a processor and a computer-readable medium operably coupled to the processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

Figure 11A:
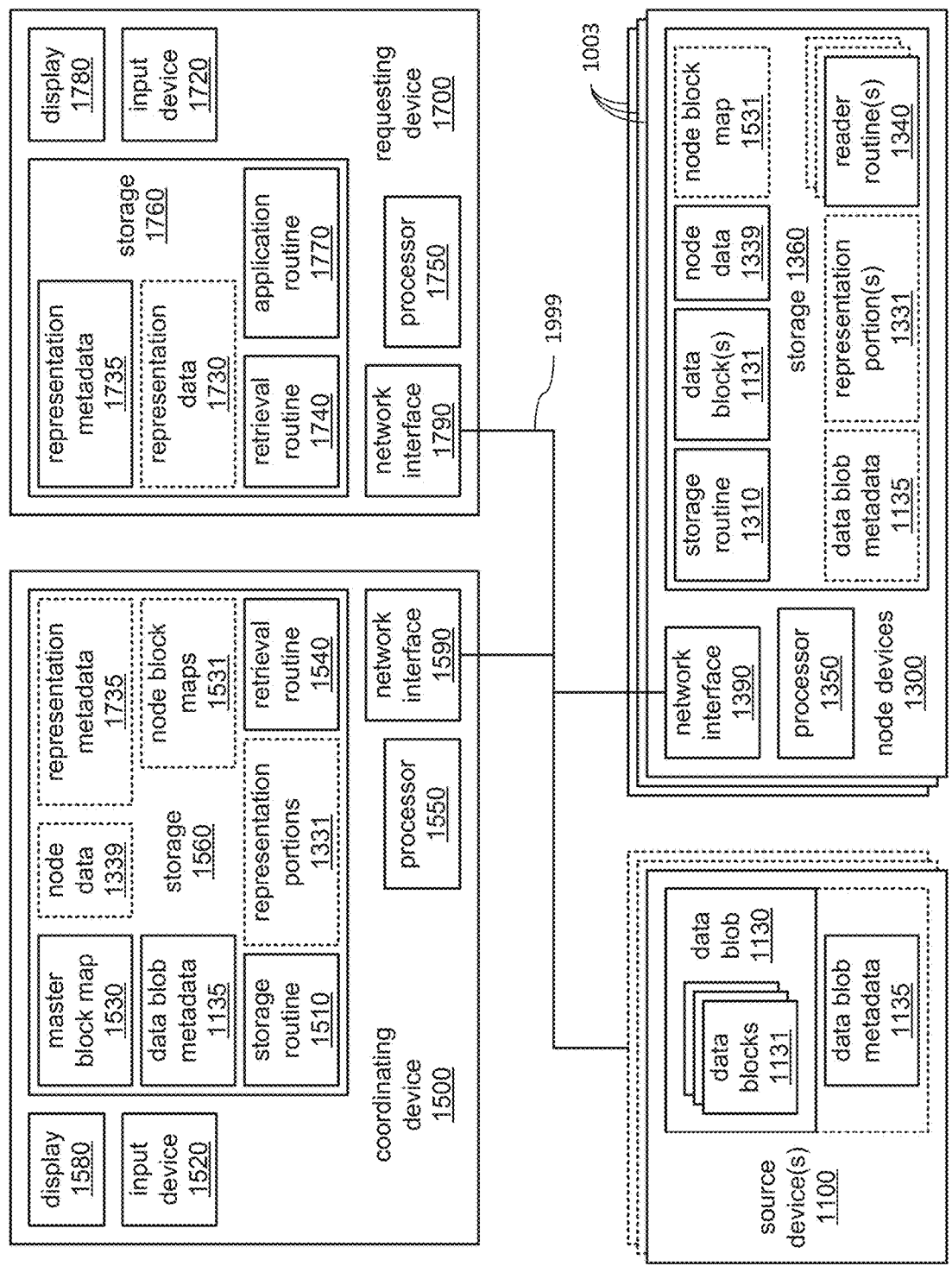
FIGS. 11A and 11B, together, illustrate an example embodiment of a distributed processing system.
Figure 11B:
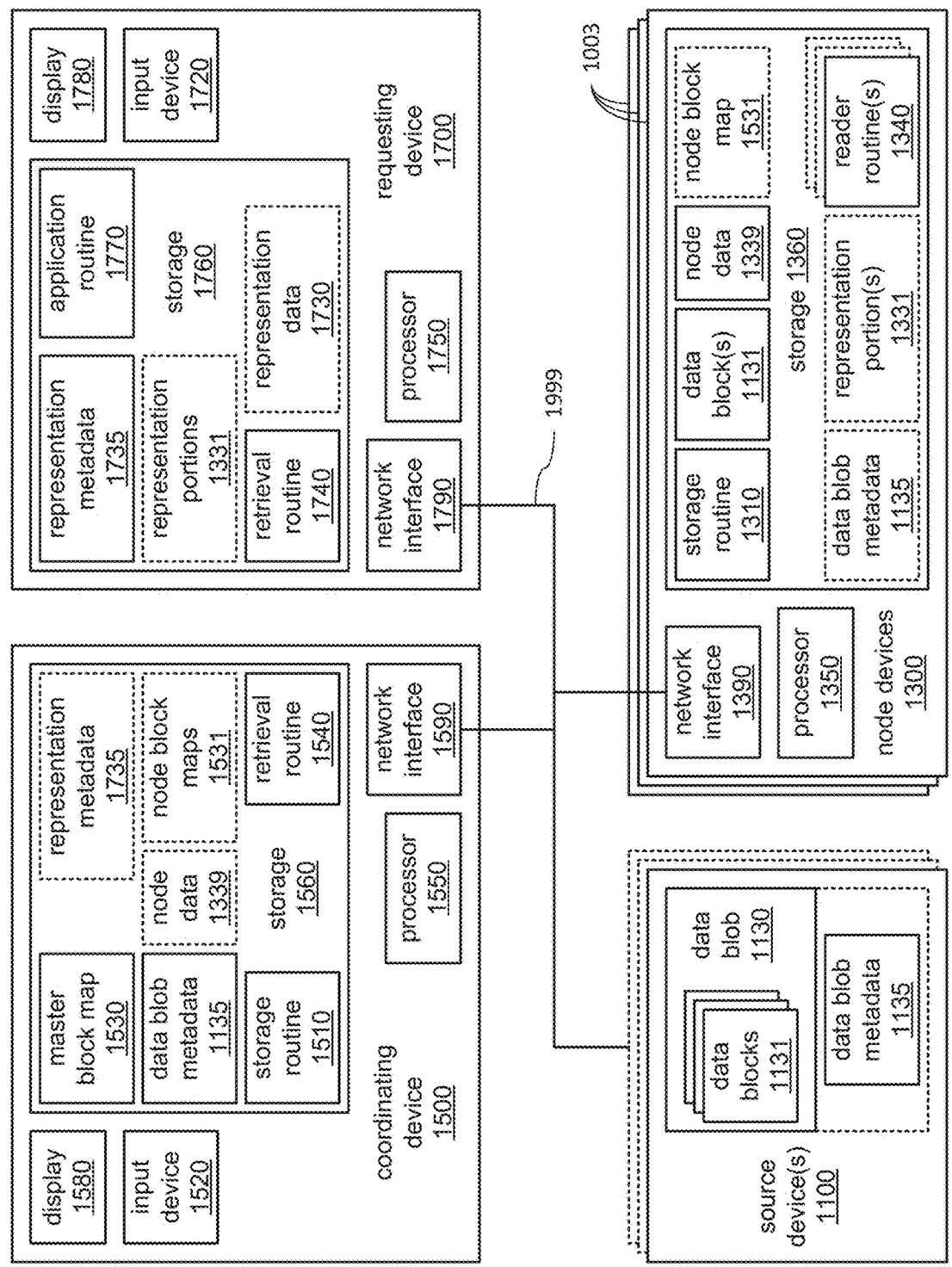

FIG. 11A illustrates a block diagram of an example embodiment of a distributed processing system 1000 incorporating one or more source devices 1100, multiple node devices 1300 that form a node device grid 1003, a coordinating device 1500 and/or a requesting device 1700. FIG. 11B illustrates a block diagram of an alternate example embodiment of the distributed processing system 1000. In embodiments of both FIGS. 11A and 11B, the multiple grid devices 1300 may store data blocks 1131 of a data blob 1130 provided by the one or more source devices 1100 in a distributed manner. The coordinating device 1500 may coordinate such provision and/or distributed storage of the data blocks 1131 through a network 1999. Also in the embodiments of both FIGS. 11A and 11B, the multiple grid devices 1300 may perform one or more transforms, at least partially in parallel, to generate representation portions 1331 to be used in generating a representation data 1730 requested by the requesting device 1700 to provide a 2D representation of at least a subset of the data items of the data blob 1130. The coordinating device 1500 may coordinate the performances of the one or more transforms through the network 1999. In some embodiments, the coordinating device 1500 may additionally perform one or more additional operations to generate the representation data from the representation portions 1331, as depicted in FIG. 11A. In other embodiments, it may be the requesting device 1700 that performs such additional operations, as depicted in FIG. 11B.

Referring to both FIGS. 11A and 11B, as depicted, these devices 1100, 1300, 1500 and 1700 may exchange communications thereamong related to the storage and retrieval of data items of the data blob 1130. Such communications may include the exchange of the data blocks 1131, data blob metadata 1135, representation metadata 1735, node block maps 1531, the representation portions 1131 and/or the representation data 1730. However, one or more of the devices 1100, 1300, 1500 and/or 1700 may also exchange, via the network 1999, other data entirely unrelated to the storage or retrieval of any data item of the data blob 1130. In various embodiments, the network 1999 may be a single network that may extend within a single building or other relatively limited area, a combination of connected networks that may extend a considerable distance, and/or may include the Internet. Thus, the network 1999 may be based on any of a variety (or combination) of communications technologies by which communications may be effected, including without limitation, wired technologies employing electrically and/or optically conductive cabling, and wireless technologies employing infrared, radio frequency (RF) or other forms of wireless transmission.

The data blob 1130 may include any of a wide variety of types of data associated with any of a wide variety of subjects. By way of example, the data blob 1130 may include scientific observation data concerning geological and/or meteorological events, or from sensors employed in laboratory experiments in areas such as particle physics. By way of another example, the data blob 1130 may include indications of activities performed by a random sample of individuals of a population of people in a selected country or municipality, or of a population of a threatened species under study in the wild.

In some embodiments, the one or more source devices 1100 may perform a collection function in which the one or more source devices 1100 receive data items and may assemble the received data items into one or more data sets over a period of time. In such embodiments, such data items may be received by the one or more source devices 1100 via the network 1999 and/or in other ways from one or more other devices (not shown). By way of example, a multitude of remotely located sensor devices (e.g., geological sensors dispersed about a particular geological region, or particle detection sensors disposed at various portions of a particle accelerator) may generate numerous data items that are then provided via the network 1999 to the one or more source devices 1100 where the numerous data items may then be assembled to form one or more data sets. In other embodiments, the one or more source devices 1100 may receive one or more of such data sets from one or more other devices (not shown), such as a grid of other node devices. By way of example, such other devices may perform one or more processing operations that generate data sets (e.g., use a Bayesian analysis to derive a prediction of the behavior of people in a simulation of evacuating a burning building, or to derive a prediction of behavior of structural components of a bridge in response to various wind flows), and may then transmit such data sets as an output to the one or more source devices 1100. Regardless of how the one or more source devices 1100 may receive and/or generate such data sets, the one or more source devices 1100 may employ one or more normalization and/or compression techniques to condense one or more of such data sets to generate the data blob 1130.

In various embodiments, each of the node devices 1300 may incorporate one or more of a processor 1350, a storage 1360 and a network interface 1390 to couple each of the node devices 1300 to the network 1999. The storage 1360 may store at least one of the data blocks 1131 of the data blob 1130, the data blob metadata 1135, a storage routine 1310, at least one of the representation portions 1331, node data 1339, one or more reader routines 1340, and/or a node block map 1531. The storage routine 1310 and/or the one or more reader routines 1340 may each incorporate a sequence of instructions operative on the processor 1350 of each of the node devices 1300 to implement logic to perform various functions, at least partially in parallel with the processors 1350 of others of the node devices 1300.

In various embodiments, the coordinating device 1500 may incorporate one or more of a processor 1550, a storage 1560, an input device 1520, a display 1580, and a network interface 1590 to couple the coordinating device 1500 to the network 1999. The storage 1560 may store the data blob metadata 1135, the representation portions 1331, the node data 1339, a storage routine 1510, the node block maps 1531, a retrieval routine 1540, and/or representation metadata 1735. The storage routine 1510 and/or the control routine 1540 may each incorporate a sequence of instructions operative on the processor 1550 to implement logic to perform various functions.

In various embodiments, the requesting device 1700 incorporates one or more of a processor 1750, a storage 1760, an input device 1720, a display 1780, and a network interface 1790 to couple the requesting device 1700 to the network 1999. The storage 1760 may store one or more of the representation portions 1331, the representation data 1730, the representation metadata 1735, a retrieval routine 1740, and/or an application routine 1770. The retrieval routine 1740 and/or the application routine 1770 may each incorporate a sequence of instructions operative on the processor 1750 to implement logic to perform various functions.

Figure 12:
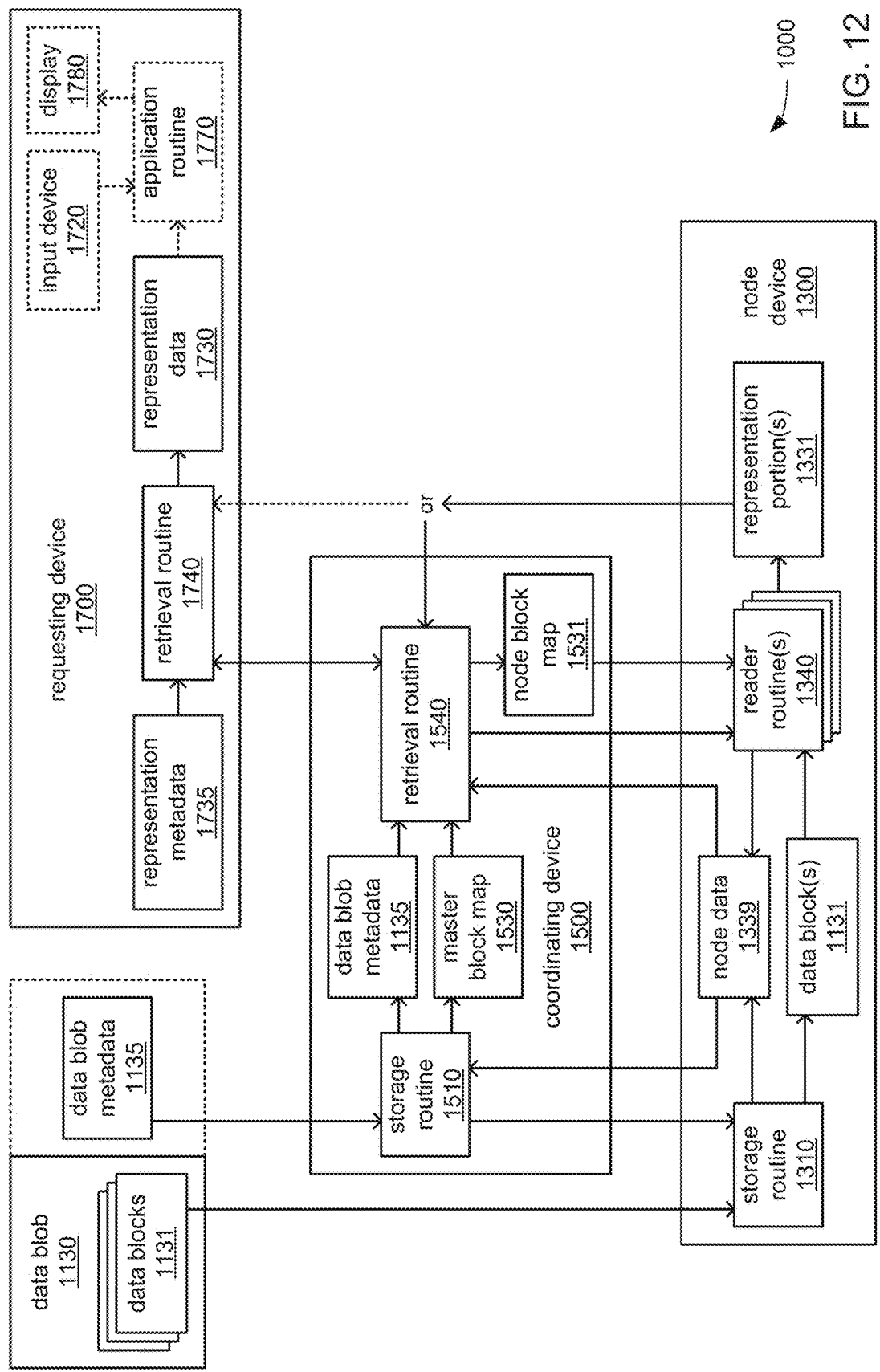
FIG. 12 illustrates an example alternate embodiment of a distributed processing system.

FIG. 12 illustrates an example of storing and retrieving data items of the data blob 1130. More specifically, FIG. 12 illustrates aspects of storing the data blocks 1131 of the data blob 1130 among the multiple node devices 1300, thereby effecting condensed and distributed storage of the one or more data sets that make up the data blob 1130. FIG. 12 also illustrates aspects of the multiple node devices 1300 performing one or more transforms at least partially in parallel to generate the representation portions 1331, and of the coordinating device 1500 and/or the requesting device 1700 performing one or more additional operations to generate the requested representation data 1730 from the representation portions 1331.

Referring to FIG. 12, in addition to FIGS. 11A-B, in executing the storage routine 1310, the processor 1350 of each of the multiple node devices 1300 may be caused to store a corresponding one of the data blocks 1131, at least partially in parallel with the processors 1350 of others of the multiple node devices 1300. In executing the storage routine 1510, the processor 1550 of the coordinating device 1500 may communicate with the one or more source devices 1100 and/or the multiple node devices 1300 to coordinate the exchanges of the data blocks 1131 of the data blob 1130 from the one or more source devices 1100 to the multiple node devices 1300. In so doing, the processor 1550 may be caused to generate the master block map 1530 to include indications of at least what data blocks 1131 were distributed to which ones of the multiple node devices 1300.

The manner in which the data blob 1130 is stored among the multiple node devices 1300 may be at least partially in compliance with the specifications of one or more file systems and/or other data storage protocols, including and not limited to Hadoop®, an open-source framework for storing and analyzing big data in a distributed computing environment promulgated by Apache Software Foundation of Forest Hill, Md., USA. More generally, the data blob 1130 may be stored on and distributed among the multiple node devices 1300 of the node device grid 1003 as one or more data files, and/or as one or more instances of at least one other type of data structure. Such distributed storage of a data blob 1130 may be carried out to provide redundancy in its storage as a protection against data loss arising from a malfunction or other event associated with one or more of the node devices 1300. Alternatively or additionally, in embodiments in which a data blob 1130 is of considerably large size, such distributed storage of the data blob 1130 may be carried out to improve the speed and efficiency with which the data blob 1130 is able to be accessed and/or exchanged with other devices. Indeed, the data blob 1130 may be sufficiently large that there may be no single storage device available that has sufficient storage and/or throughput capacity.

In executing the retrieval routine 1740, the processor 1750 of the requesting device 1700 may be caused to transmit a request to the coordinating device 1500 via the network 1999 for the representation data 1730. In response, in executing the retrieval routine 1540, the processor 1550 of the coordinating device 1500 may be caused to coordinate the generation of the representation portions 1331 through the network 1999. In executing a selected one of the reader routines 1340, the processor 1350 of each of the node devices 1300 may so generate one of the representation portions 1331 from its corresponding one of the data blocks 1131. Each of the processors 1350 may also be caused to transmit its corresponding one of the representation portions 1331 to either the coordinating device 1500 or the requesting device 1700 to enable generation of the requested representation data 1730. Regardless of whether the representation data 1730 is provided to the requesting device 1700 by the coordinating device 1500 or is generated at the requesting device 1700, the processor 1750 may then be caused by execution of the application routine 1770 to use the representation data 1730 as an input to an analysis of the application routine 1770 and/or to present the representation data 1730 on the display 1780.

As recognizable to those skilled in the art, each of the storage routines 1310 and 1510, each of the reader routines 1340, each of the retrieval routines 1540 and 1740, and/or the application routine 1770, including the components of which each may be composed, are selected to be operative on whatever type of processor or processors that are selected to implement applicable ones of the processors 1350, 1550 and/or 1750. In various embodiments, each of these routines may include one or more of an operating system, device drivers and/or application-level routines (e.g., so-called "software suites" provided on disc media, "applets" obtained from a remote server, etc.). Where an operating system is included, the operating system may be any of a variety of available operating systems appropriate for execution by the processors 1350, 1550 and/or 1750. Where one or more device drivers are included, those device drivers may provide support for any of a variety of other components, whether hardware or software components, of each of the node devices 1300, the coordination device 1500 and/or the requesting device 1700.

Figure 13A:
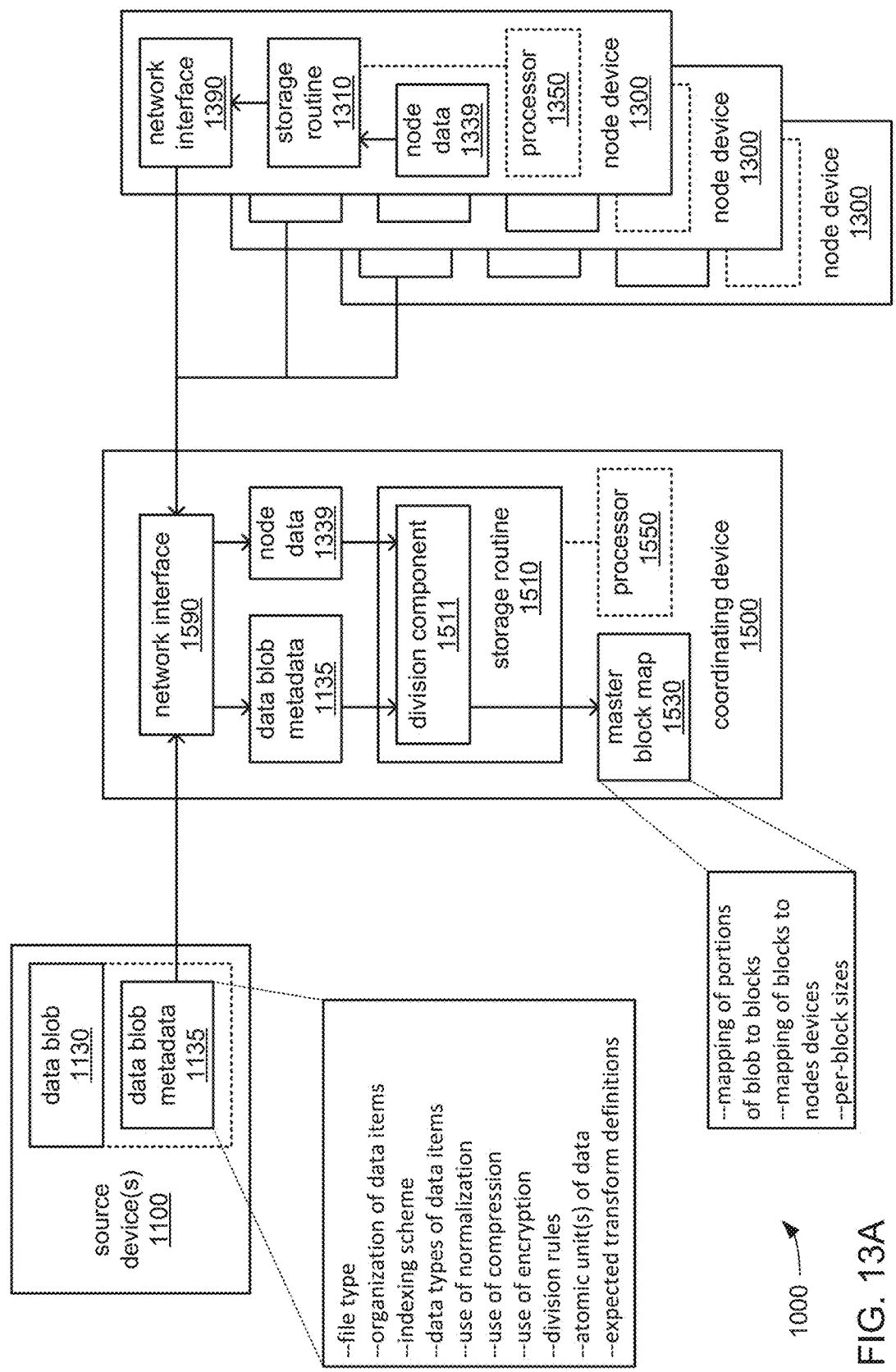
FIGS. 13A and 13B, together, illustrate an example of distributed storage of a data blob.
Figure 13B:
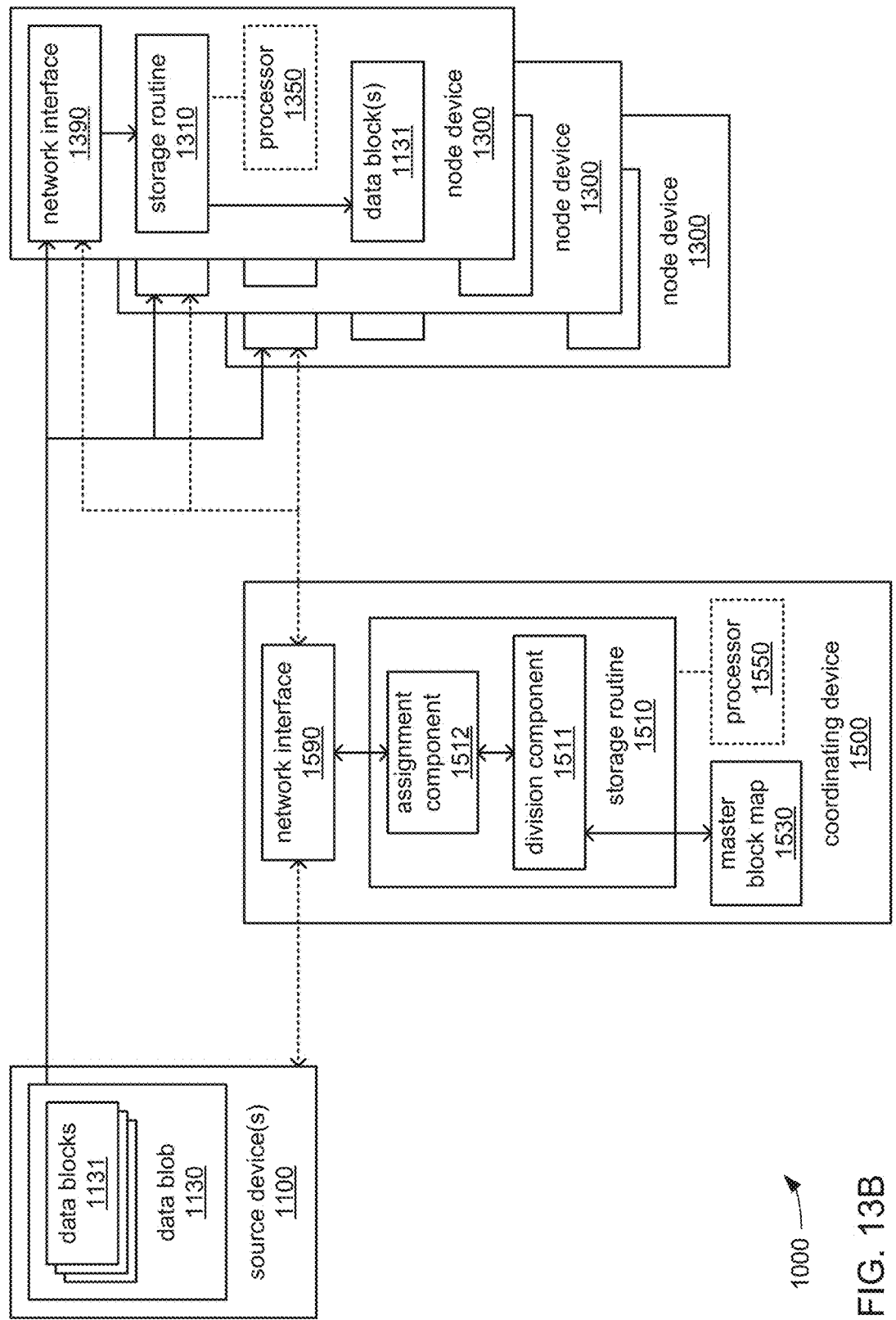

FIGS. 13A-B, together, depict aspects of determining the manner in which the data blob 1130 is to be divided into the data block 1131, assigning the data blocks 1131 to the multiple node devices 1300, and storing the data blocks 1131 within their assigned ones of the multiple node devices 1300 in greater detail. As depicted, the storage routine 1510 executed by the processor 1550 of the coordinating device 1500 may include a division component 1511 to make such determinations and assignments, and/or a transfer component 1512 to coordinate such storage to assigned ones of the multiple node devices 1300.

Turning more specifically to FIG. 13A, in executing the division component 1511, the processor 1550 may be caused to operate the network interface 1590 to enable the provision of the data blob metadata 1135 to the coordinating device 1500 via the network 1999. More specifically, the processor 1550 may operate the network interface 1590 to await receipt of the data blob metadata 1135 at the coordinating device 1500 from the one or more source devices 1100, to request the data blob metadata 1135, and/or to otherwise act to retrieve the data blob metadata 1135. As depicted, in some embodiments, the data blob metadata 1135 may be incorporated into the data blob 1130. Thus, in such embodiments, the provision of the data blob metadata 1135 to the coordinating device 1500 may entail the provision of a portion of the data blob 1130, such as a portion of a file header of the data blob 1130 in embodiments in which the data blob 1130 is stored by the one or more source devices 1100 as one or more data files. In other embodiments, the data blob metadata 1135 may be provided to coordinating device 1500 entirely separately from the data blob 1130.

As depicted, the data blob metadata 1135 may describe various aspects of the data items that make up the data blob and/or the organization of those data items. More specifically, what may be described in the blob metadata 1135 may include, and is not limited to: the file type of the data blob 1130 where the data blob 1130 is accessed and/or stored as a data file; the one or more data structure types of the data blob 1130 by which the data items are organized; the one or more indexing schemes that may be used by the one or more data structure types of the data blob 1130; the data types of the data items; what normalization, compression and/or encryption technique(s) may have been used as approaches to condensing one or more data sets to create the data blob 1130; any rules limiting the manner in which the data blob 1130 may be divided into the data block 1131; what atomic unit(s) of data there may be within the data blob 1130 that are not allowed to be split into across multiple ones of the data blocks 1131; and/or indications of one or more transforms that may be required to be performed with the data blob 1130 (or with the data blocks 1131 thereof) to denormalize, decompress and/or decrypt the data blob 1130 (or one or more of the data blocks 1131 thereof) to reverse the condensing performed to generate the data blob 1130.

The processor 1550 may also be caused to operate the network interface 1590 to enable the provision of instances the node data 1339 to the coordinating device 1500. In some embodiments, each of the multiple node devices 1300 may recurringly transmit an instance of the node data 1339 to the coordinating device 1500 via the network 1999 on a recurring basis (e.g., at a recurring interval) to recurringly update the coordinating device concerning the status of each of the multiple node devices 1300. In such embodiments, the processor 1550 may operate the network interface 1590 to await receipt of such recurring transmissions. Additionally, the fact of the occurrence of such transmissions of instances of the node data 1339 may be used as a type of "heartbeat" signal that provides confirmation of an ongoing minimum degree of functionality of each node device 1300 that continues to make such transmissions. Alternatively or additionally, the processor 1550 of the coordinating device may operate the network interface 1590 to recurringly transmit requests to each of the multiple node devices 1300 for an instance of the node data 1339 from each, and/or may otherwise act to retrieve instances of the node data 1339.

Each instance of the node data 1339 may include indications of the processing, storage and/or data transfer resources incorporated into a corresponding one of the node devices 1300, and/or indications of the degree to which each of such resources are currently already being utilized. Such indications may also include versions and/or revision levels of hardware and/or software components associated with such resources. Alternatively or additionally, each instance of the node data 1339 may include a log of operations recently completed by and/or currently underway within a corresponding one of the node devices 1300. Such logs may also include indications of errors that may have occurred in the performance of various operations (e.g., instances of failed transmission, reception, storage and/or retrieval of data, etc.), and/or indications of outcomes of attempts to resolve such errors.

In some embodiments, upon receipt of the data blob metadata 1135, the processor 1550 of the coordinating device 1500 may be caused by the division component 1511 to use the most recently received instances of the node data 1339 from each of the node devices 1300 to determine how many of the node devices 1330 of the node device grid 1003 are currently available, and with sufficient available resources, to be used to store at least one data block 1131 of the data blob 1130. By way of example, in determining such a quantity, the processor 1550 may refrain from including ones of the node devices 1300 for which instances of the node data 1339 indicate relatively high utilization of at least storage resources such that there is likely too little storage capacity currently available to store one of the data blocks 1131, and/or for which instances of the node data 1339 indicate a relatively frequent occurrence of instances of failure in exchanging and/or storing data.

The processor 1550 may also be caused to use the data blob metadata 1135 to determine the manner in which to divide the data blob 1130 into multiple ones of the data blocks 1131. By way of example, although the processor 1550 may be caused, as a default policy, to divide large data structures into a quantity of relatively equal-sized portions that matches the quantity of node devices 1300 determined to be currently available and with sufficient resources to achieve a relatively balanced load across the node devices 1300. However, the processor 1550 may be caused to vary from such a default policy to at least the extent required to adhere to any rules included in the data blob metadata 1135 that limit the manner in which the data blob 1130 may be divided into the data blocks 1131. In some embodiments, it may be that the data blob 1130 was generated from one or more data sets made up of partitions of data items in which data items within each partition are interrelated to a degree creating dependencies thereamong such that an analysis of a portion of a partitions requires access to the entirety of that partition. In such embodiments, the data blob metadata 1135 may include one or more rules that specify one or more portions of the data blob 1130 that cannot be split across multiple ones of the data blocks 1131. Alternatively or additionally, at least a portion of the data blob 1130 may include one or more data structures made up of data items and/or rows of data items that the data blob metadata 1135 indicates must be treated as atomic units to the extent of not being split across multiple ones of the data blocks 1131.

As the processor 1550 determines the manner in which the data blob 1130 is to be divided into the data blocks 1131, as well as the quantity of data blocks 1131, the processor 1550 may be caused by the division component to store indications of these determinations as part of the master block map 1530. As depicted, the master block map 1530 may be so generated to include indications of how various portions of the data blob 1130 (e.g., how various partitions, other data structures, rows within data structures, etc.) are divided among the data blocks 1131, and/or indications of the size of each of the data blocks 1131.

Turning more specifically to FIG. 13B, with the manner in which the data blob 1130 is to be divided into the data blocks 1131, as well as the quantity of the data blocks 1131, having been determined, the processor 1550 may be caused by its execution of the assignment component 1512 to assign each of the data blocks 1131 to one of the node devices 1300 that have been determined to be currently available. More precisely, the processor 1550 may be caused to use the indications of such determinations stored within the master block map 1530 to assign each of the data blocks 1131 to one of the available node devices 1300 that has been determined to have sufficient storage and/or other resources to store the one or more data blocks 1131 assigned to it. As such assignments are determined by the processor 1550, the processor 1550 may also store indications of the assignments as part of the master block map 1530.

With such assignments determined, the processor 1550 may be caused to transmit instructions to the one or more source devices 1100, and/or to the multiple node devices 1300 to which the data blocks 1131 have been assigned, to cause the provision of each of the data blocks 1131 to its assigned one of the multiple node devices 1300. More specifically, in some embodiments, the processor 1550 may be caused to operate the network interface 1590 to transmit indications of the manner in which the data blob 1130 is to be divided into the data blocks 1131 to the one or more source devices 1100 to cause the one or more source devices 1100 to generate the data blocks from the data blob 1130. The processor 1550 may also be caused to transmit to the one or more source devices 1100 indications of which of the multiple node devices 1300 is to be provided with each of the data blocks 1131. As the one or more source devices 1100 then transmit the data blocks 1131 to the multiple node devices 1300 via the network 1999, the processor 1550 may receive indications from the one or more source devices 1100 and/or the multiple node devices 1300 of the progress of those transmissions.

Figure 14A:
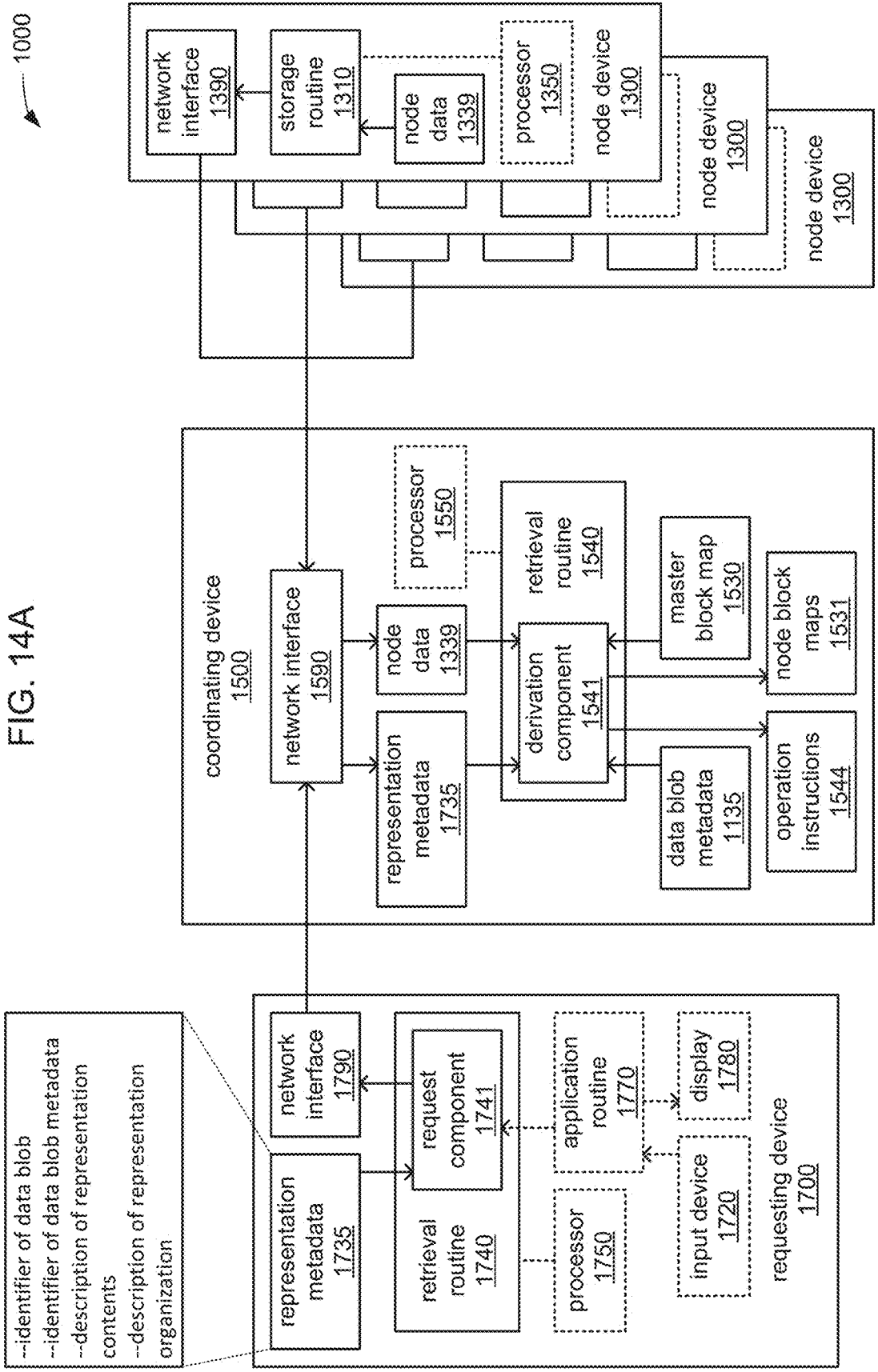
FIGS. 14A and 14B, together, illustrate an example of distributed analysis of a request for a representation of data items of a data blob.
Figure 14B:
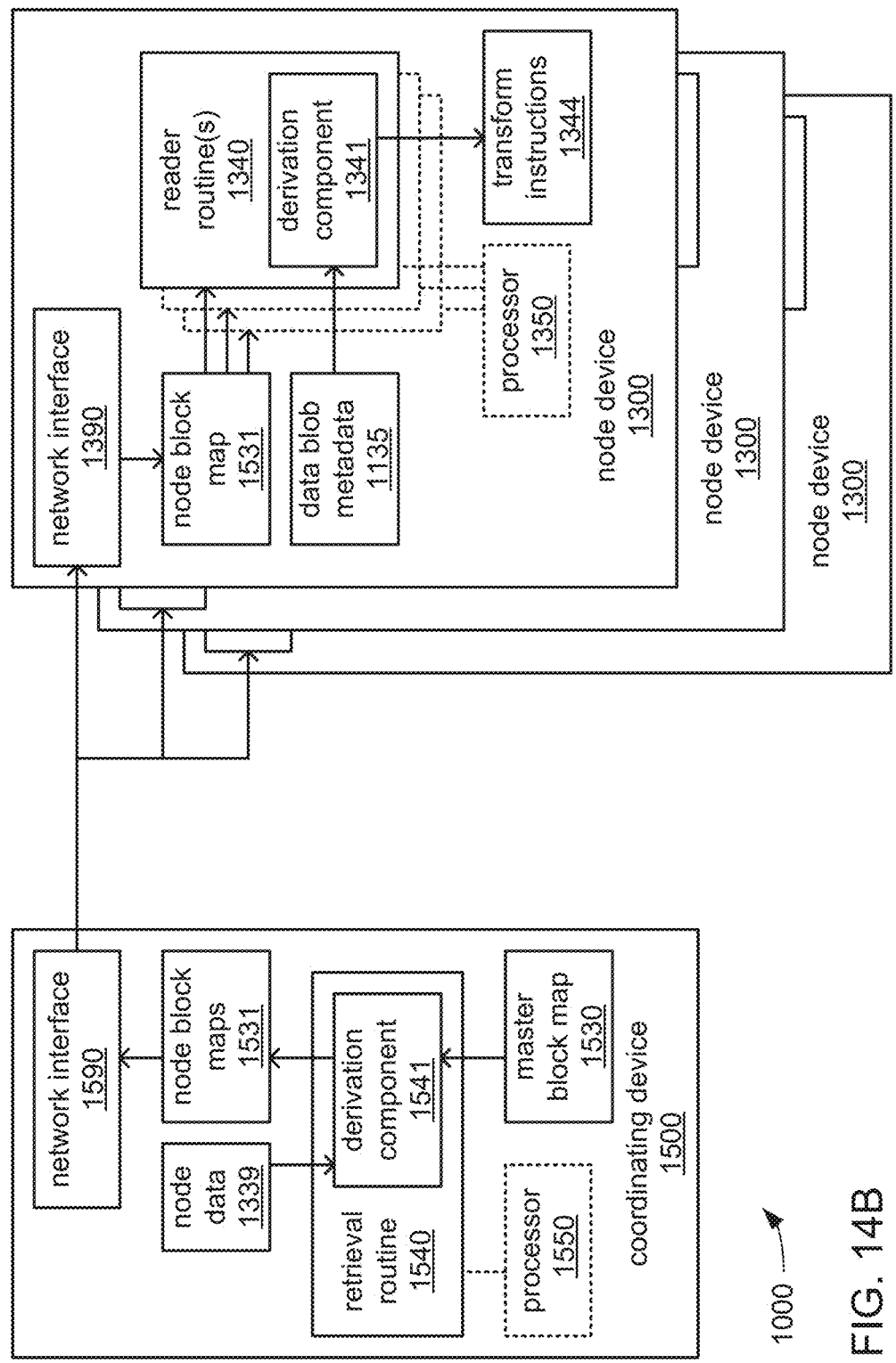

FIGS. 14A-B, together, depict aspects of receiving and analyzing a request from the requesting device 1700 for a representation of data items of the data blob 1130, and of preparing to provide the requested representation in greater detail. As depicted, the retrieval routine 1740 executed by the processor 1750 of the requesting device 1700 may include a request component 1741 to make such a request. Also, the retrieval routine 1540 executed by the processor 1550 of the coordinating device 1500 may include a derivation component 1541, to derive at least one or more node block maps 1531 for use in coordinating the at least partially parallel generation of representation portions 1331 by a subset of the node devices 1300. Further, each of the reader routines 1340, of which one may be selected for execution by the processor 1350 of each of the node devices 1300, may include a derivation component 1341 to derive such transforms, at least partially in parallel with the processors 1350 of others of the node devices 1300.

Turning more specifically to FIG. 14A, the coordinating device 1500 may be provided with one or more instances of the representation metadata 1735 that may each correspond to a different representation of at least some of the data items of the data blob 1130 that may be requested at a later time. As will be familiar to those skilled in the art, despite increasing use of complex data structures in which data items may be organized into arrays of numerous dimensions, tree structures (e.g., binary trees), network structures, etc, many analysis routines and/or other analytical tools require data input to be organized as simpler two-dimensional data structures, such as tables or other forms of 2D array. The provision of one or more instances of the representation metadata 1735 may be done as part of a "registration" process in which the coordinating device 1500 is prepared to respond to requests for representations of data items of the data blob 1130 that may include such 2D data structures generated specifically for use as an input to an analysis.

Each instance of the representation metadata 1735 may include various pieces of information required to derive and/or perform one or more transforms and/or other operations with one or more of the data blocks of a data blob to retrieve and use the data items therein to generate the corresponding representation. More specifically, and as depicted, each instance of the representation metadata 1735 may include, and is not limited to including, an identifier of the particular data blob from which the particular representation is to be generated and/or of the data blob metadata that describes various aspects of the particular data blob (e.g., the data blob 1130 and/or the data blob metadata 1135), a description of the contents of the representation and/or of the data items of the data blob from which the contents are to be generated, and/or a description of the manner in which the contents of the representation are to be organized (e.g., a description of the rows and/or columns of a 2D representation).

In some embodiments, and as depicted, the processor 1750 of the requesting device 1700 may be caused by its execution of the request component 1741 to operate the network interface 1790 to transmit such instance(s) of the representation metadata 1735 to the coordinating device 1500 via the network 1999 for storage in preparation for a future request for a corresponding representation that may originate from the requesting device 1700. In other embodiments, such instance(s) of the representation metadata 1735 may be provided to the coordinating device 1500 by the one or more source devices 1100 along with the data blob metadata 1135.

Following the provision of one or more instances of the representation metadata 1735 to the coordinating device, the processor 1750 of the requesting device 1700 may be caused by the request component to operate the network interface 1790 to transmit a request to the coordinating device 1500 for a particular representation that corresponds to one of those instances. In some embodiments, the request may identify the particular representation by referring to an identifier of the instance of the representation metadata 1735 that corresponds to the particular representation.

Upon receiving the request, the processor 1550 of the coordinating device 1500 may be caused by its execution of the derivation component 1541 to use a combination of the data blob metadata 1135, the master block map 1530 and/or the instance of the representation metadata 1735 specified in the request to determine which data blocks 1131 of the data blob 1130 include the data items needed to generate the requested representation. Based on such determinations, the processor 1550 may then generate one or more of the node block maps 1531 to be provided to a subset of the node devices 1300 storing the subset of the data blocks 1131 that include the needed data items.

Each of the one or more node block maps 1531 may include various pieces of information required to derive and/or perform one or more transforms with at least one of the data blocks 1131 to retrieve and use data items therein to generate a corresponding one of the representation portions 1331 that is to be combined with others to create the representation data 1330 that provides the requested representation. By way of example, each of the node block maps 1531 may include, and is not limited to including, indications of what data items and/or sets of data items are to be retrieved from a particular data block 1131 and/or an identifier of the particular data block 1131, one or more values to be derived from particular ones and/or sets of the retrieved data items, and/or an indication of a selection of a particular reader routine 1340 to be used by a node device 1300 in so doing.

In some embodiments, as part of determining which data blocks 1131 include the needed data items, the processor 1550 may be caused to determine whether there is proper authorization to use some or all of the needed data items to provide the requested representation. More specifically, the processor 1550 may be caused to compare an indication of the entity originating the request (e.g., a particular person and/or authorization credentials associated with a particular person, a particular device and/or authorization credentials embedded within or otherwise associated with a particular device, a particular software routine and/or authorization credentials embedded within or otherwise associated with a particular software routine, and/or a particular organization of people) to indications of persons, devices, software routines and/or organizations authorized to be given access to some or all of the data items (and/or indications of the credentials thereof), in order to determine whether access to at least some of the data items needed to provide the requested representation should be granted. In some embodiments, such indications may be stored as a table or other data structure (not shown) within the coordinating device 1500 where the processor 1550 may be caused to maintain such information with updates as authorizations granted to various entities change over time. Alternatively or additionally, the processor 1550 may retrieve such information from one or more other devices via the network 1999. Where the requesting person, device, software routine executed within a device and/or organization is authorized to have access to less than all of the needed data items, then the processor 1550 may be caused to generate only ones of the one or more node block maps 1531 needed to make use of the data items to which access is authorized, and this may result in a less than complete form of the requested representation being generated (e.g., where a portion of the requested representation is filled with null values). Where the requesting person, device, software routine executed within a device and/or organization is not authorized to have access to any of the needed data items, then the processor 1550 may operate the network interface 1590 to transmit an error indication that may include an indication of denial of access to the requesting device 1700.

In embodiments in which redundant copies of the data blocks 1131 are stored among multiple ones of the node devices 1300, the processor 1550 may be additionally caused to use instances of the node data 1339 that may be recurringly transmitted by each of the node devices 1300 to determine which node device 1300 that stores each of the data blocks 1131 that include some of the needed data items is to be included in the subset of node devices 1300 to which one of the node block maps 1531 will be provided. More specifically, where two or more of the node devices 1300 store copies of the same one of the data blocks 1131 that includes some of the data items needed to generate the requested representation, the processor 1550 may be caused to use the instances of the node data 1339 transmitted to the coordinating device 1500 by each to select one of those node devices 1300 that currently has the processing and/or other resources needed to perform the one or more transforms that may be required to generate one of the representation portions 1331.

Turning to FIG. 14B, with the node blocks maps 1531 generated and/or with the subset of node devices 1300 selected, the processor 1550 of the coordinating device 1500 may be caused to operate the network interface 1590 to transmit the node block maps 1531 to the subset of node devices 1300. In embodiments in which any of the subset of node devices 1300 have not already been provided with the data blob metadata 1135, the processor 1550 may be caused to additionally transmit the data blob metadata 1135 thereto.

As depicted, and as previously discussed, each of the node devices 1300 may store multiple reader routines 1340. Each of the reader routines 1340 may include executable instructions to perform a different transform and/or a different combination of transforms to retrieve and/or use data items of one of the data blocks 1131 to generate a corresponding one of the representation portions 1331. Upon receiving one of the node block maps 1531, the processor 1350 of each one of the subset of node devices 1300 may use an indication of a selection of a one of the reader routines 1340 in that one of the node block maps 1531 to select and begin execution of the indicated one of the reader routines 1340.

In so executing the selected reader routine 1340, the processor 1350 of each one of the subset of node devices 1300 may be caused by its execution of the derivation component 1341 to use a combination of the data blob metadata 1135 and received node block map 1531 to determine the one or more specific transforms that are to be performed (using the selected reader routine 1340) to retrieve and use data items of a data block 1131 stored by the node device 1300 to generate a corresponding one of the representation portions 1331. More specifically, the processor 1350 may determine the one or more transforms to be performed with each needed data item and/or each set of needed data items to retrieve and/or derive data values as part of generating the corresponding representation portion 1331. In some particular embodiments, each of the reader routines 1340 may include a reader class definition, and execution of the derivation component 1341 by the processor 1350 may cause the instantiation of a reader instance based on the class definition that the processor 1350 may then be caused to execute instructions of the instantiated reader to derive and/or perform the one or more transforms. The processor 1350 may be caused to store indications of the transforms to be performed with each such data item and/or set of data items as transform instructions 1344 to be used in controlling execution of the selected instance of the derivation component 1341 in performing the transforms.

The one or more transforms may include any of a variety and/or combination of forms of denormalization, decompression and/or decryption to reverse the normalization, compression and/or encryption, respectively, that were employed to combine and/or condense one or more data sets to generate the data blob 1130. Thus, the one or more transforms may include performing any of a variety of actions to realign data values to byte, word, doubleword, quadword, and/or still larger boundaries. Also, the one or more transforms may include one or more conversions between one or more data structures employed within the data blob and one or more data structures employed in one of the representation portions 1331. By way of example, to fill entries in a 2D array structure of one of the representation portions 1331, entries and/or nodes of a tree structure, a network structure, linked list, array of numerous axes, or other more complex data structure within the data bob 1130 may need to be traversed to retrieve the needed data items. Further, the one or more transforms may include any of a variety and/or combination of arithmetic, logical, statistical, data normalization and/or other operations by which data items within one of the data blocks 1131 may be used to generate and/or otherwise provide values for inclusion within one of the representation portions 1331. For example, such transforms may include calculations to take averages, mean values, sample values, aggregate values, etc. of data items. Also for example, such transforms may include data normalization operations to change bit widths and/or other formatting of data items retrieved from one of the data blocks 1131, either prior to inclusion within a corresponding one of the representation portions 1331 or prior to the use of those data items in the performance of a calculation. In embodiments in which a 2D data structure (e.g., a table or 2D array) having a row-and-column organization is to be included in a representation portion 1331, such transforms may include a calculation by which the values in one or more of the columns are used as input to calculating the values of one or more others of the columns.

In some embodiments, the processor 1350 of each node device 1300 of the subset of node devices 1300 may be caused to determine whether there is proper authorization to use some or all of the data items indicated as needed in the received node block map 1531 to generate a representation portion from a corresponding data block 1131. More specifically, the processor 1350 may be caused to compare an indication received from the coordinating device 1500 (e.g., within the node block map 1531) of the entity originating the request (e.g., a particular person and/or authorization credentials associated with a particular person, a particular device and/or authorization credentials embedded within or otherwise associated with a particular device, a particular software routine and/or authorization credentials embedded within or otherwise associated with a particular software routine, and/or a particular organization of people) to indications of persons, devices, software routines and/or organizations authorized to be given access to some or all of the data items (and/or indications of the credentials thereof), in order to determine whether access to at least some of the data items of a data block 1131 that are needed to generate a representation portion should be granted. In some embodiments, such indications may be stored as a table or other data structure (not shown) within the node device 1300 where the processor 1350 may be caused to maintain such information with updates as authorizations granted to various entities change over time. Alternatively or additionally, the processor 1350 may be caused to retrieve such information from the coordinating device 1500 and/or another device via the network 1999. Where the requesting person, device, software routine executed within a device and/or organization is authorized to have access to less than all of the needed data items, then the processor 1350 may be caused to generate the at least one row of a representation portion 1331 with less than all entries therein occupied with values derived from a corresponding data block 1131, and/or with null values where values based on some of the data items would otherwise be present. This may result in a less than complete form of the requested representation being generated when the representation portions 1331 needed to generate the representation data 1730 are used to do so (e.g., a portion of the requested representation may be filled with null values). Where the requesting person, device, software routine executed within a device and/or organization is not authorized to have access to any of the needed data items, then the processor 1350 may operate the network interface 1390 to transmit an error indication that may include an indication of denial of access to the coordinating device 1500.

Returning briefly to FIG. 14A, in some embodiments, a similar derivation of operations to perform may also occur within the coordinating device 1500. More specifically, in further executing the derivation component 1541, the processor 1550 of the coordinating device 1500 may be caused to use a combination of the node block maps 1530 and/or the instance of the representation metadata 1735 specified in the request to determine the one or more specific operations that are to be performed with the representation portions 1331 to be generated by the subset of node devices 1300 to complete the generation of the representation data 1330. More specifically, the processor 1550 may determine the one or more operations to be performed with the values within each of the representation portions 1331 as part of generating the representation data 1330 that is to be transmitted onward to the requesting device 1700 to provide the requesting device 1700 with the requested representation. The processor 1550 may be caused to store indications of the transforms to be performed with each of the representation portions 1331 as operation instructions 1544 to be used in performing those operations upon receipt of the representation portions 1331.

In some embodiments, the one or more operations to be performed by the processor 1550 may be less complex than the one or more transforms performed by the processors 1350 of the subset of node devices 1300. It may be expected that the one or more transforms performed at least partially in parallel among the subset of node devices 1300 will address any need to perform any form of denormalization, decompression and/or decryption needed to retrieve data items from within the subset of data blocks 1131. Thus, in some situations, the one or more operations performed at the coordinating device 1500 may be limited to combining portions of a single 2D data structure that are provided by each of the representation portions 1331 to form the complete single 2D data structure within the representation data 1330. However, in other situations, considerably more complex operations may be performed.

More specifically, the one or more operations may include one or more conversions between one or more data structures employed within the representation portions 1331 and one or more data structures employed in the representation data 1330 as part of combining the representation portions 1331 to generate the representation data 1330, and thereby provide the representation requested by the requesting device 1700. By way of example, to fill entries in a 2D array structure of the representation data 1330, entries of various different 2D array structures of one or more of the representation portions 1331 may need to be accessed. Further, the one or more operations may include any of a variety and/or combination of arithmetic, logical, statistical, data normalization and/or other operations by which values conveyed to the coordinating device in the representation portions 1331 may be used to generate and/or otherwise provide values for inclusion within the representation data 1330. For example, like the transforms performed at the subset of node devices 1330, the one or more operations performed at the coordinating device may include calculations to take averages, mean values, sample values, aggregate values, etc. of data items. In embodiments in which a 2D data structure (e.g., a table or 2D array) having a row-and-column organization is to be included in the representation data 1330, the one or more operations may include a calculation by which the values in one or more of the columns are used as input to calculating the values of one or more others of the columns.

Figure 15A:
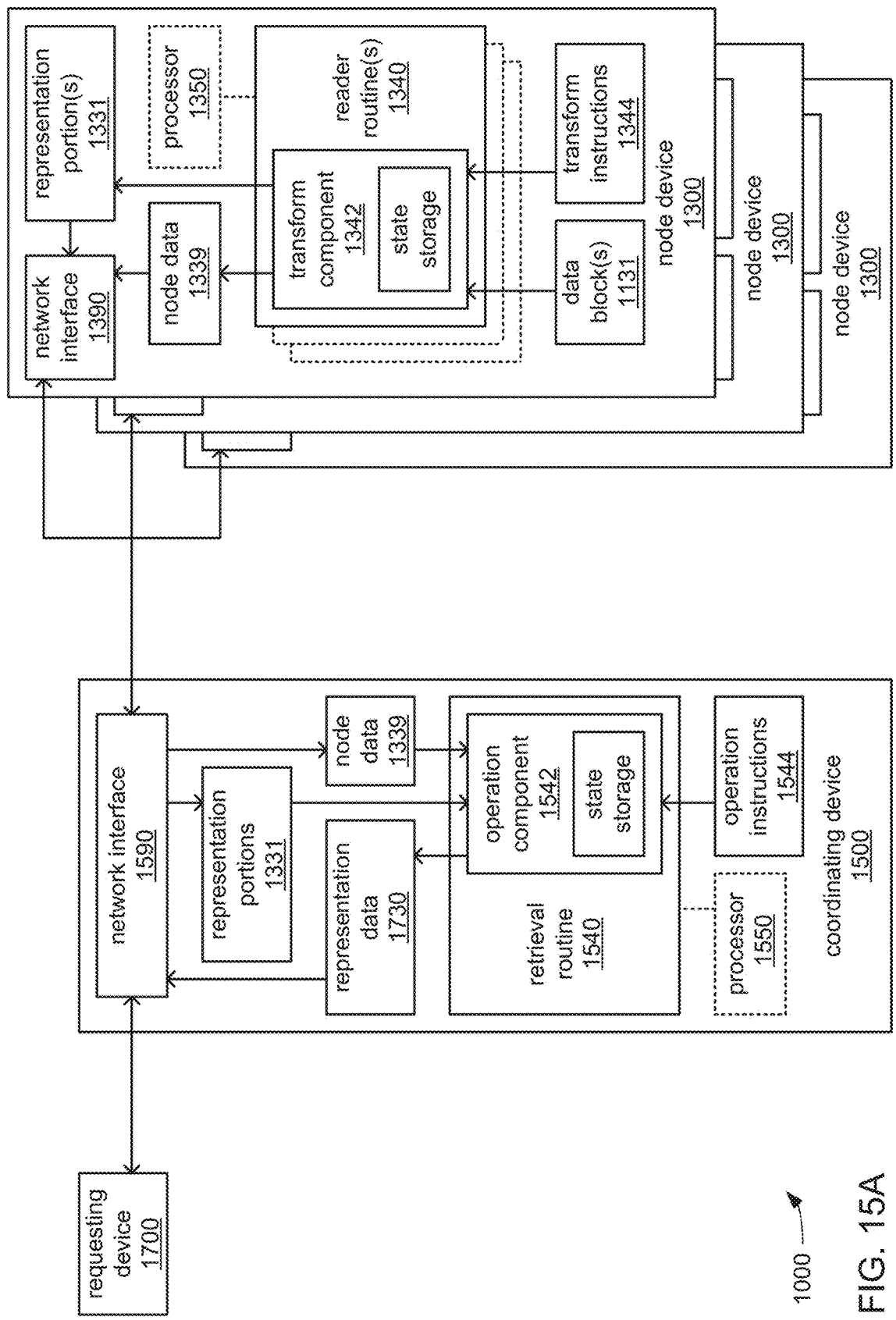
FIGS. 15A and 15B, together, illustrate an example of distributed generation of representation data providing a requested representation of data items of a data blob.
Figure 15B:
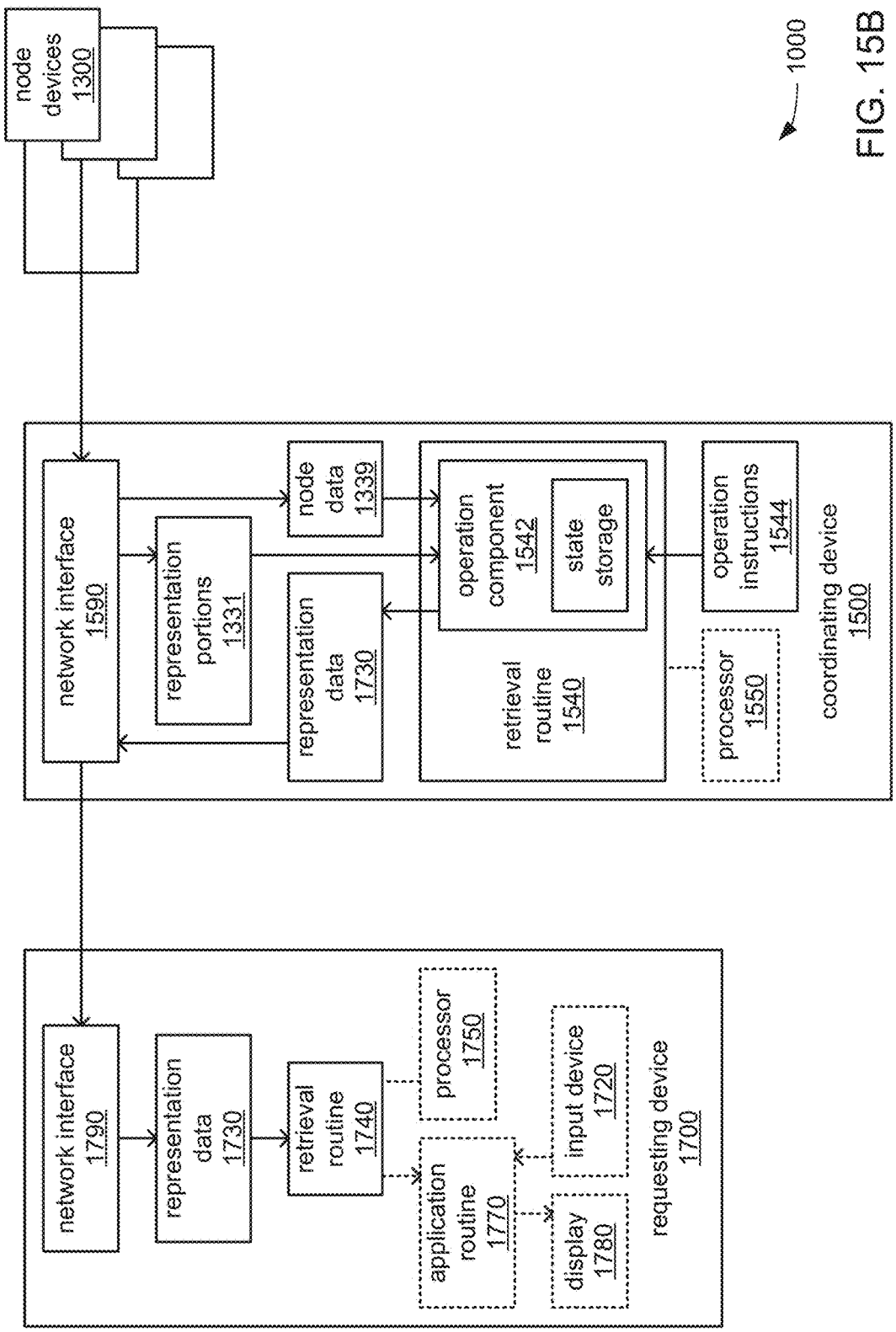

FIGS. 15A-B, together, depict aspects of performing one or more transforms to generate representation portions 1331 from corresponding ones of the data blocks 1131, at least partially in parallel, and performing one or more further operations to generate the representation data 1330 from the representation portions 1331 in greater detail. As depicted, each of the reader routines 1340, of which one may be selected for execution by the processor 1350 of each of the node devices 1300, may include a transform component 1342 to perform such transforms, at least partially in parallel with the processors 1350 of others of the node devices 1300. Also, the retrieval routine 1540 executed by the processor 1550 of the coordinating device 1500 may include an operation component 1542 to perform such further operations.

Turning more specifically to FIG. 15A, with the one or more transforms to be performed by each one of the subset of the node devices 1300 having been derived, and with indications thereof having been stored within the transform instructions 1344, the processor 1350 may be caused to perform the one or more transforms. More specifically, the processor 1350 of each one of the subset of the node devices 1300 may be caused to execute the earlier selected one of the reader routines 1340, and thereby be caused to execute the transform component 1342 of the selected one of the reader routines 1340. As a result, the processor 1350 may be caused to perform the one or more transforms indicated in the transform instructions 1344 with a data block 1131 stored by the node device 1300 to generate a corresponding one of the representation portions 1331. The processor 1350 of each one of the subset of the node devices 1300 may then be caused to operate its network interface 1390 to transmit its corresponding one of the representation portions 1331 to the coordinating device 1500.

The processor 1550 of the coordinating device 1500 may be caused to operate the network interface 1590 to monitor the progress of generating the representation portions 1331 by the subset of the node devices 1300 through the network 1999. If an indication of failure in the generation of one of the representation portions 1331 is received from one of the subset of the node devices 1300, then the processor 1550 may be caused to use instances of the node data 1339 received from others of the node devices 1300 that may store a copy of the same data block(s) 1131 need to generate the failed representation portion 1331 to select one of those others of the node devices 1300 to do so.

Turning more specifically to FIG. 15B, upon receiving the representation portions 1331 transmitted to the coordinating device 1500 by the subset of the node devices 1300, the processor 1550 may be caused by its execution of the operation component 1542 to perform the one or more operations indicated in the operation instructions 1544 with the representation portions 1331 to generate the representation data 1730. The processor 1550 may then be caused to operate the network interface 1590 to transmit the representation data 1730 to the requesting device 1700.

In some embodiments, each node device 1300 of the subset of node devices 1300 that were selected by the processor 1550 of the coordinating device 1500 to generate one of the representation portions 1331 may refrain from transmitting its corresponding one of the representation portions 1331 until its corresponding one of the representation portions 1331 is complete. In such embodiments, the node block maps 1531 transmitted to each one of the subset of node devices 1300 may include or otherwise be accompanied by a command from the coordinating device to each provide the entirety of their corresponding ones of the representation portions 1331.

However, in other embodiments in which the representation portions 1331 are each to be generated to have a 2D data structure with rows and columns, each one of the subset of node devices 1300 may be caused to provide individual rows of their respective ones of the representation portions 1331 one row at a time. In such embodiments, the subset of node devices 1300 may be caused to do so in response to commands to provide a row at a time being recurringly transmitted by the coordinating device 1500. In such other embodiments, the processors 1350 of the subset of node devices 1300 may each be caused to fully generate and temporarily store its corresponding one of the representation portions 1331, and then transmit a row at a time in response to the receipt of each command to transmit another row thereof to the coordinating device. Alternatively, in such other embodiments, the processors 1350 of the subset of node devices 1300 may generate each row of its corresponding one of the representation portions 1331 on demand in response to the receipt of each command to transmit another row. In support of such demand-based generation of rows of the representation portions 1331, the processor 1350 of each one of the subset of node devices 1300 may, as each row is generated, store indications of the current state of performance of the one or more transforms to enable that state to be reestablished as a starting point in resuming the performance of the one or more transforms in response to the next reception of a command to transmit another row.

FIG. 16 depicts aspects of an alternate embodiment of performing one or more transforms to generate representation portions 1331, and performing one or more further operations to generate the representation data 1330. A significant difference therebetween is that, in FIG. 16, the subset of node devices 1300 in which the representation portions 1331 are transmitted via the network 1999 directly to the requesting device 1700, instead of to the coordinating device 1500, as depicted in FIGS. 15A-B. In FIG. 16, the coordinating device 1500 may still receive indications of progress in the generation of the representation portions 1331 by the by subset of node devices 1300, and may still reassign the generation of one or more of the representation portions 1331 to one or more other node devices 1300 in response to indications of failure, as was discussed in reference to FIGS. 15A-B. Thus, as depicted in FIG. 16, it may be the processor 1750 of the requesting device 1700 that is caused by execution of a transform component 1742 of the retrieval routine 1740 to perform one or more operations to generate the representation data 1730 from the representation portions 1331 within the requesting device 1700.

Figure 17A:
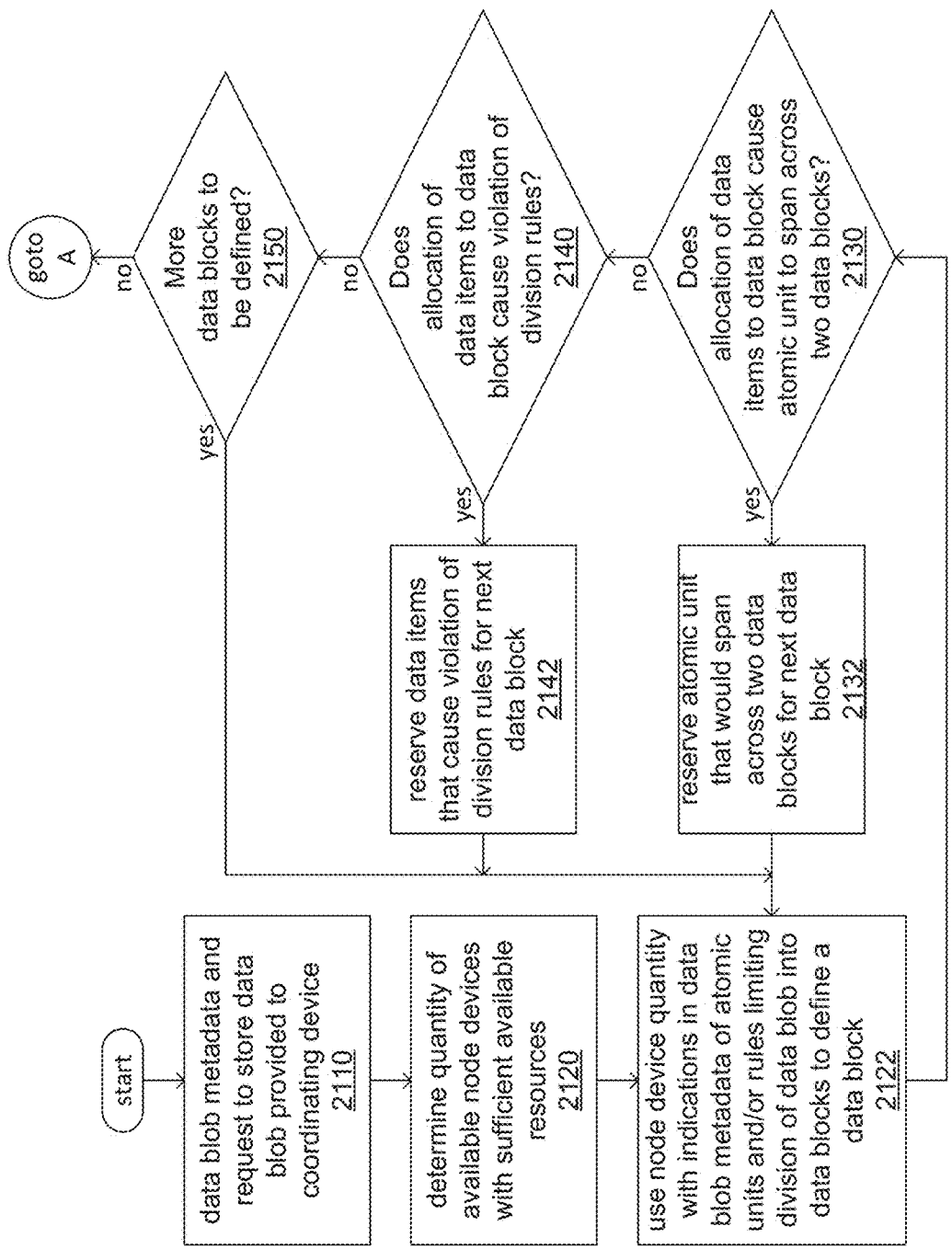
FIGS. 17A and 17B, together, illustrate an example embodiment of a logic flow of distributed storage of data blocks of a data blob.
Figure 17B:
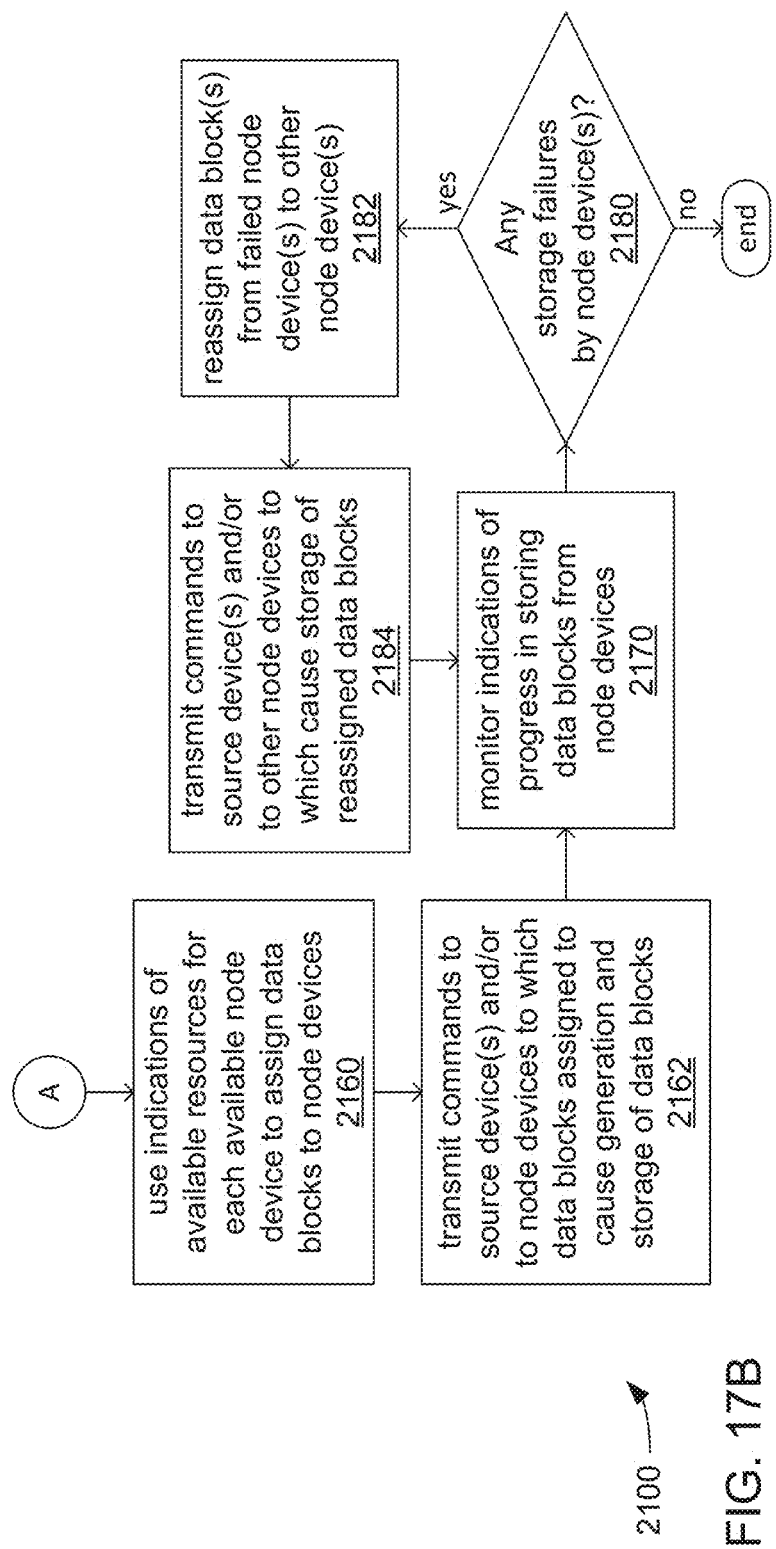

FIGS. 17A and 17B, together, illustrate an example embodiment of a logic flow 2100. The logic flow 2100 may be representative of some or all of the operations executed by one or more embodiments described herein. More specifically, the logic flow 2100 may illustrate operations performed by the processor 1550 in executing the storage routine 1510, and/or performed by other component(s) of the coordinating device 1500.

At 2110, a processor of a coordinating device of a distributed processing system (e.g., the processor 1550 of the coordinating device 1500 of the distributed processing system 1000, or the processor 1350 of one of the node devices 1300 that additionally serves as the coordinating device) may receive and/or retrieve data blob metadata descriptive of a data blob (e.g., the data blob metadata 1135 of the data blob 1130). Along with the data blob metadata, the processor may also receive a request to store the data blob among multiple node devices of a node device grid (e.g., the node devices 1300 of the node device grid 1003).

At 2120, the processor may determine the quantity of node devices of the node device grid that are available, and with sufficient available processing, storage, network interface and/or other resources for use in storing a data block of the data blob (e.g., one of the data blocks 1131). As has been discussed, the processor 1550 of the coordinating device 1500 may make such a determination by analyzing instances of the node data 1339 indicative of the current status of each of the node devices 1300, and which may be recurringly transmitted by each of the node devices 1300 to the coordinating device as a form of "heartbeat" signal.

At 2122, the processor may use a combination of at least the determined quantity of available node devices and indications in the data blob metadata of any rules limiting division of the data blob into data blocks to define a data block. As previously discussed, such rules may include a requirement that one or more varieties of atomic units of data items set forth in the data blob metadata cannot be caused to span across multiple data blocks. Alternatively or additionally, the data block metadata may set forth indications of there being one or more partitions of data items defined within the data blob that are not to be caused to span across multiple data blocks. As earlier described, data items within a partition may have dependencies on each other to such a degree that the performance of one or more analyses of a subset of the data items within a partition cannot be performed without access to the rest of the data items within that partition.

At 2130, the processor may check whether the allocation of data items into the data block just defined causes an atomic unit of data items to span across two or more data blocks. If so, then at 2132, the processor may alter the definition of the data block just defined to reserve that atomic unit of data items for the next data block to be defined, before proceeding to define the next data block at 2122.

However, if at 2130, the allocation of data items into the data block just defined does not cause such a spanning of two or more data blocks, then at 2140, the processor may check whether the allocation of data items into the data block just defined causes a violation of one of another rule limiting the manner in which the data blob is able to be divided into data blocks (e.g., such as a rule against dividing one or more defined partitions of data items). If so, then at 2142, the processor may alter the definition of the data block just defined to reserve data items that were allocated to the newly defined data block for the next data block to be defined, as needed to avoid violating the one or more rules. The processor may then proceed to define the next data block at 2122.

However, if at 2140, the allocation of data items into the data block just defined does not cause a violation of one or more other rules limiting the division of the data blob into data blocks, then at 2150, the processor may check whether there are more data blocks still to be defined. If so, then the processor may return to defining another data block at 2122.

However, if at 2150, there are no more data blocks to be defined, then at 2160, the processor may use indications of what processing, storage, network bandwidth and/or other resources are available for each of the available nodes to assign each of the data blocks to one of the available node devices. By way of example, where there are differing quantities of storage space available within each of the available node devices, and where the data blocks are of different sizes, the processor may assign each data block to one of the available node devices based on matching sizes of data blocks to amounts of available storage space.

At 2162, the processor may transmit commands to one or more source devices that may currently store the data blob (e.g., the one or more source devices 1100) to generate the data blocks defined by the processor from the data blob. Alternatively or additionally, the processor may transmit commands to each of the available node devices to which the processor has assigned at least one data block to store the data block(s) transmitted to each by the one or more source devices.

At 2170, the processor may monitor indications received from the node devices of progress in the storing of the data blocks. If, at 2180, there is any indication of failure in the storage of one or more of the data blocks by one or more of the node devices assigned to store one or more data blocks, then at 2182, the processor may reassign the storage of the one or more data blocks for which there was a failure in storage to one or more others of the available node devices. The processor may then, at 2184, transmit commands to the one or more available node devices to which the one or more failed data blocks were reassigned to store the one or more failed data blocks that were reassigned thereto.

Figure 18:
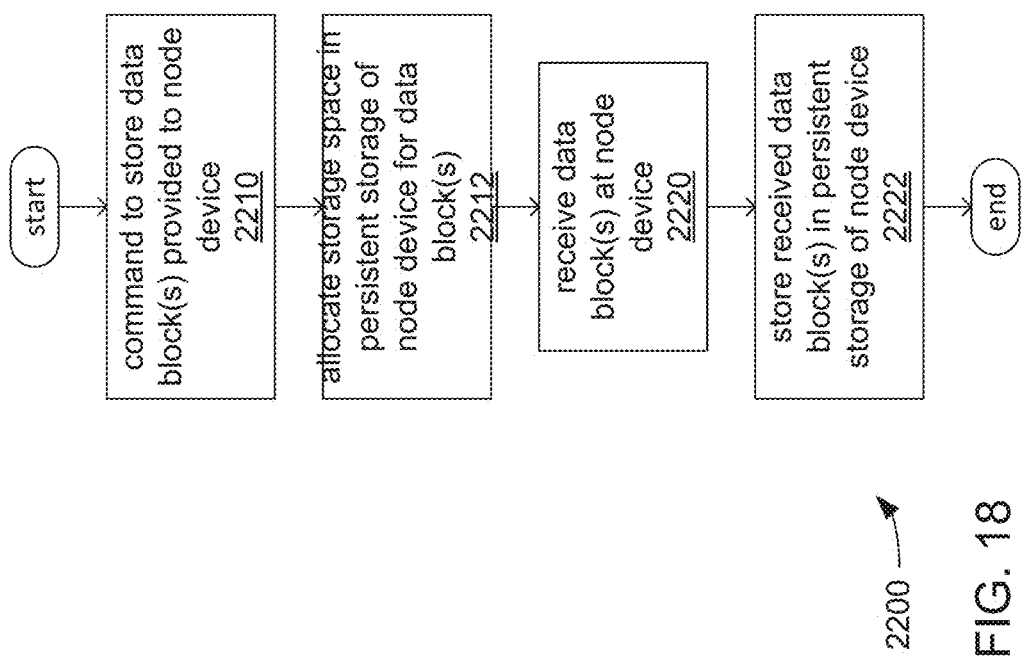
FIG. 18 illustrates another example embodiment of a logic flow of distributed storage of data blocks of a data blob.

FIG. 18 illustrates an example embodiment of a logic flow 2200. The logic flow 2200 may be representative of some or all of the operations executed by one or more embodiments described herein. More specifically, the logic flow 2200 may illustrate operations performed by the processor 1350 in executing the storage routine 1310, and/or performed by other component(s) of one of the node devices 1300.

At 2210, a processor of a node device of a node device grid of a distributed processing system (e.g., the processor 1350 of one of the node devices 1300 of the node device grid 1003 of the distributed processing system 1000) may receive a command to store one or more data blocks of a data blob (e.g., one or more of the data blocks 1131 of the data blob 1130). In response, at 2212, the processor may allocate space within persistent storage of the node device to store the one or more data blocks.

At 2220, the processor may receive the one or more data blocks via a network from one or more source devices (e.g., via the network 1999 from the one or more source devices 1100). At 2222, the processor may store the one or more received data blocks within the persistent storage.

Figure 19:
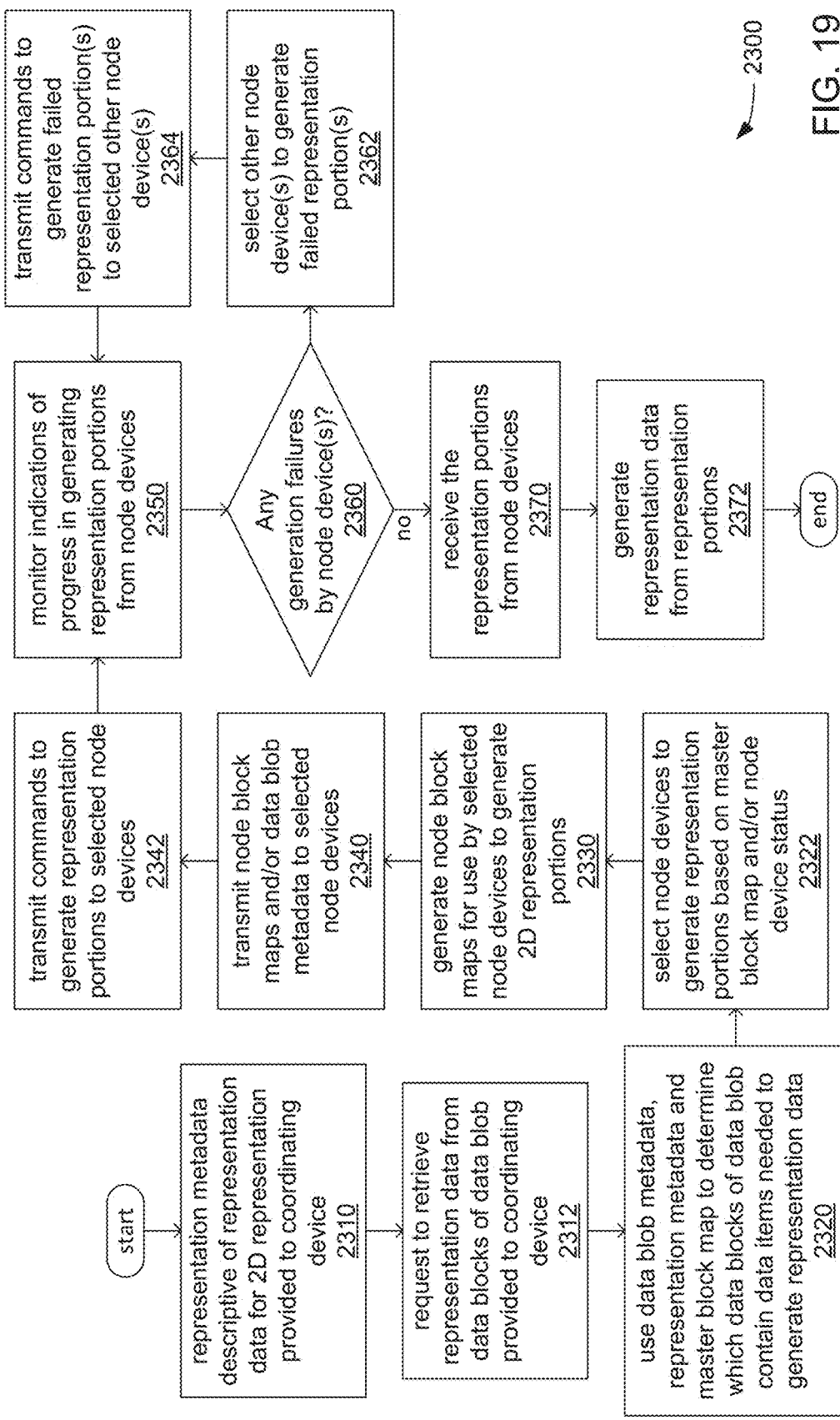
FIG. 19 illustrates an example embodiment of a logic flow of distributed generation of a representation of data items of a data blob.

FIG. 19 illustrates an example embodiment of a logic flow 2300. The logic flow 2300 may be representative of some or all of the operations executed by one or more embodiments described herein. More specifically, the logic flow 2300 may illustrate operations performed by the processor 1550 in executing the retrieval routine 1540, and/or performed by other component(s) of the coordinating device 1500.

At 2310, a processor of a coordinating device of a distributed processing system (e.g., the processor 1550 of the coordinating device 1500 of the distributed processing system 1000, or the processor 1350 of one of the node devices 1300 that additionally serves as the coordinating device) may receive and/or retrieve representation metadata descriptive of representation metadata for a 2D representation of data items of a data blob (e.g., an instance of the representation metadata 1735 descriptive of an instance of the representation data 1730 generated from the data blob 1130). At 2312, along with the representation metadata, the processor may also receive a request to retrieve representation data that provides the type of 2D representation described in the representation metadata from data blocks of a data blob that have been stored in a distributed manner among multiple node devices of a node device grid (e.g., the node devices 1300 of the node device grid 1003).

At 2320, the processor may determine which ones of the data blocks contain the data items needed to generate the requested 2D representation. To do so, the processor may use a combination of the representation metadata, data blob metadata descriptive of at least the organization of data items within the data blob (e.g., the data blob metadata 1135), and/or a master block map descriptive of at least the manner in which the data blob was divided into data blocks among the node devices (e.g., the master block map 1530). At 2322, the processor may select which ones of the available node devices that store the required ones of the data blocks to use in generating representation portions (e.g., the node portions 1331), where the representation data providing the requested 2D representation will be generated from the representation portions. To do so, processor may use the indications of which data blocks are required, along with the master block map and recurringly received node data indicating the current availability of each node device and/or its resources. As previously discussed, in some embodiments, multiple copies of each of the data blocks of the data blob may be stored by multiple ones of the node devices such that there may be multiple node devices that may be used to generate a representation portion from each of the required data blocks.

At 2330, the processor may generate a node block map for each of the selected one of the node devices (e.g., the node block maps 1531), and may then transmit each of the node block maps to its corresponding one of the selected node devices at 2340. In so doing, the processor may also transmit a copy of the data blob metadata to each of the selected node devices, if the data blob metadata has not already been transmitted thereto. At 2342, the processor may transmit commands to the selected node devices to generate the representation portions.

At 2350, the processor may monitor indications received from the selected node devices of progress in generating the representation portions. If, at 2360, there is any indication of failure in the generation of one or more of the representation portions by one or more of the selected node devices, then at 2362, the processor may reassign the generation of the one or more representation portions for which there was a failure in generation to one or more others of the available node devices that store one or more of the data blocks required to generate the failed representation portions. The processor may then, at 2364, transmit commands to the one or more available node devices to which the generation of one or more representation portions were reassigned to proceed with so generating the one or more failed representation portions assigned thereto. The processor may then return to monitoring the progress of the generation of the representation portions at 2350.

However, if at 2360, there is no indication of failure in generating the representation portions, then the processor may receive the completed representation portions at 2370. At 2372, the processor may then generate the representation data that provides the requested 2D representation from the representation portions.

FIG. 20 illustrates an example embodiment of a logic flow 2400. The logic flow 2400 may be representative of some or all of the operations executed by one or more embodiments described herein. More specifically, the logic flow 2400 may illustrate operations performed by the processor 1350 in executing one of the instances of the reader routine 1340, and/or performed by other component(s) of one of the node devices 1300.

At 2410, a processor of a node device of a node device grid of a distributed processing system (e.g., the processor 1350 of one of the node devices 1300 of the node device grid 1003 of the distributed processing system 1000) may receive data blob metadata descriptive of a data blob (e.g., the data blob metadata 1135 of the data blob 1130). The processor may also receive a node block map descriptive of at least the contents of one or more data blocks of the data blob (e.g., one or more of the data blocks 1131) that are stored by the node device. As has been discussed, at least the node block map may be received from a coordinating device of the distributed processing system 1000 (e.g., the coordinating device 1500). At 2412, along with the data blob metadata, the processor may also receive a request to generate one or more representation portions (e.g., one or more of the representation portions 1331) from the one or more data blocks that are stored by the node device.

At 2420, the processor may use the received node block map to select one of multiple reader routines stored by the node device (e.g., one of multiple reader routines 1340) to use in generating the one or more representation portions. As has been discussed, each of the multiple reader routines may be somewhat specialized to perform a different transform or a different combination of transforms to generate a representation portion. Thus, an indication in a node block map of a selection of a particular one of the reader routines may serve as a indication of which one or more transforms are to be performed by the node device. At 2422, the processor may use a combination of the node block map, the data blob metadata, and the selected reader routine to derive one or more specific transforms to be performed with one or more specific data items and/or one or more sets of data items within the stored data block(s) to generate the one or more representation portions.

At 2430, the processor may determine whether the received command was to generate and provide the entirety of each of the one or more representation portions. If so, then the processor may perform the one or more derived transforms at 2432 to generate the entirety of each of the one or more representation portions from the one or more data blocks stored by the node device. The processor may then transmit the entirety of each of the one or more generated representation portions to the coordinating device at 2434.

However, if at 2430, the command was only to generate and provide a specified quantity of rows of each of the one or more representation portions, then the processor may perform the one or more derived transforms at 2440 to generate the specified quantity of rows of each of the one or more representation portions. The processor may then transmit the generated quantity of rows of each of the one or more representation portions to the coordinating device at 2442, and may store indications of the current state of performance of the one or more transforms at 2444 to enable the reestablishment of that state in response to a later request to generate more of the rows.

At 2450, the processor may check whether all of the rows have been generated and transmitted. If not, then at 2452, the processor may await a command to generate a specified quantity of more rows of each of the one or more representation portions. At 2454, the processor may receive such a command from the coordinating device. At 2456, the processor may retrieve the indications of the current state of performance of the transforms in preparation for generating the specified quantity of more rows, and may perform the one or more transforms again at 2440 to do so.

In various embodiments, each of the processors 1150, 1350, 1550 and 1750 may include any of a wide variety of commercially available processors. Further, one or more of these processors may include multiple processors, a multi-threaded processor, a multi-core processor (whether the multiple cores coexist on the same or separate dies), and/or a multi-processor architecture of some other variety by which multiple physically separate processors are linked.

However, in a specific embodiment, the processor 1550 of the coordinating device 1500 may be selected to efficiently perform the analysis of multiple instances of the metadata 1510 and/or the observation data 1511 in generating the annotated metadata 1512. Alternatively or additionally, the processor 1350 of each of the node devices 1300 may be selected to efficiently perform analyses of and/or tasks with corresponding ones of the data set portions 1310 at least partially in parallel. By way of example, the processor 1350 and/or 1550 may incorporate a single-instruction multiple-data (SIMD) architecture, may incorporate multiple processing pipelines, and/or may incorporate the ability to support multiple simultaneous threads of execution per processing pipeline. Alternatively or additionally by way of example, the processor 1350 of at least one of the node devices 1300 may incorporate multi-threaded capabilities and/or multiple processor cores to enable parallel performances of the functions of both the coordinating device 1500 and a node device 1300 in embodiments of the distributed processing system 1000 that, like the embodiment depicted in FIG. 12, do not include a separate and distinct coordinating device 1500.

In various embodiments, each of the control routines 1140, 1340, 1540 and 1740, including the components of which each is composed, may be selected to be operative on whatever type of processor or processors that are selected to implement applicable ones of the processors 1150, 1350, 1550 and/or 1750 within corresponding ones of the devices 1100, 1300, 1500 and/or 1700. In various embodiments, each of these routines may include one or more of an operating system, device drivers and/or application-level routines (e.g., so-called "software suites" provided on disc media, "applets" obtained from a remote server, etc.). Where an operating system is included, the operating system may be any of a variety of available operating systems appropriate for the processors 1150, 1350, 1550 and/or 1750. Where one or more device drivers are included, those device drivers may provide support for any of a variety of other components, whether hardware or software components, of the devices 1100, 1300, 1500 and/or 1700.

In various embodiments, each of the storages 1160, 1360, 1560 and 1760 may be based on any of a wide variety of information storage technologies, including volatile technologies requiring the uninterrupted provision of electric power to retain data, and/or persistent storage technologies that do not require such uninterrupted provision of electric power to retain data, including technologies entailing the use of machine-readable storage media that may or may not be removable. Thus, each of these storages may include any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, persistent storage class memory, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may include multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller).

However, in a specific embodiment, the storage 1360 of one or more of the node devices 1300 that stores one or more of the data set portions 1310 may be implemented with a redundant array of independent discs (RAID) of a RAID level selected to provide fault tolerance to prevent loss of one or more of these datasets and/or to provide increased speed in accessing one or more of these datasets.

In various embodiments, each of the input devices 1520 and 1720 may each be any of a variety of types of input device that may each employ any of a wide variety of input detection and/or reception technologies. Examples of such input devices include, and are not limited to, microphones, remote controls, stylus pens, card readers, finger print readers, virtual reality interaction gloves, graphical input tablets, joysticks, keyboards, retina scanners, the touch input components of touch screens, trackballs, environmental sensors, and/or either cameras or camera arrays to monitor movement of persons to accept commands and/or data provided by those persons via gestures and/or facial expressions. In various embodiments, each of the displays 1580 and 1780 may each be any of a variety of types of display device that may each employ any of a wide variety of visual presentation technologies. Examples of such a display device includes, and is not limited to, a cathode-ray tube (CRT), an electroluminescent (EL) panel, a liquid crystal display (LCD), a gas plasma display, etc. In some embodiments, the display 1580 of the coordinating device 1500 and/or the display 1780 of the viewing device 1700 may be a touch-screen display such that the input device 1520 may be incorporated into the display 1580 and/or the input device 1720 may be incorporated into the display 1780. In such embodiments, the input device 1520 and/or the input device 1720 may be a touch-sensitive component of the display 1580 and/or the display 1780, respectively.

In various embodiments, the network interfaces 1190, 1390, 1590 and 1790 may employ any of a wide variety of communications technologies enabling these devices to be coupled to other devices as has been described. Each of these interfaces includes circuitry providing at least some of the requisite functionality to enable such coupling. However, each of these interfaces may also be at least partially implemented with sequences of instructions executed by corresponding ones of the processors (e.g., to implement a protocol stack or other features). Where electrically and/or optically conductive cabling is employed, these interfaces may employ timings and/or protocols conforming to any of a variety of industry standards, including without limitation, RS-232C, RS-422, USB, Ethernet (IEEE-802.3) or IEEE-1394. Where the use of wireless transmissions is entailed, these interfaces may employ timings and/or protocols conforming to any of a variety of industry standards, including without limitation, IEEE 802.11a, 802.11ad, 802.11ah, 802.11ax, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1×RTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc.

However, in a specific embodiment, the network interface 1390 of one or more of the node devices 1300 that stores one or more of the data set portions 1310 may be implemented with multiple copper-based or fiber-optic based network interface ports to provide redundant and/or parallel pathways in exchanging one or more of the data set portions 1310 with the one or more storage devices 1100.

In various embodiments, the division of processing and/or storage resources among the coordinating device 1500 and/or the node devices 1300, and/or the API architectures supporting communications among the coordinating device 1500 and/or the node devices 1300, may be configured to and/or selected to conform to any of a variety of standards for distributed processing, including without limitation, IEEE P2413, AllJoyn, IoTivity, etc. By way of example, a subset of API and/or other architectural features of one or more of such standards may be employed to implement the relatively minimal degree of coordination described herein to provide greater efficiency in parallelizing processing of data, while minimizing exchanges of coordinating information that may lead to undesired instances of serialization among processes. However, it should be noted that the parallelization of storage, retrieval and/or processing of the data set portions 1310 of the selected data set 1113 are not dependent on, nor constrained by, existing API architectures and/or supporting communications protocols. More broadly, there is nothing in the manner in which the selected data set 1113 may be organized in storage, transmission and/or distribution via the network 1999 that is bound to existing API architectures or protocols.

Some systems may use Hadoop®, an open-source framework for storing and analyzing big data in a distributed computing environment. Some systems may use cloud computing, which can enable ubiquitous, convenient, on-demand network access to a shared pool of configurable computing resources (e.g., networks, servers, storage, applications and services) that can be rapidly provisioned and released with minimal management effort or service provider interaction. Some grid systems may be implemented as a multi-node Hadoop® cluster, as understood by a person of skill in the art. Apache™ Hadoop® is an open-source software framework for distributed computing.

The invention claimed is:
1. An apparatus comprising a processor and a storage to store instructions that, when executed by the processor, cause the processor to perform operations comprising:
  store, at a node device of a grid of node devices, a data block of a plurality of data blocks of a data blob, wherein:
    the plurality of data blocks of the data blob are distributed among the grid of node devices to be stored by the grid of node devices;
    the data blob comprises multiple data items; and
    each data block of the plurality of data blocks comprises a subset of the multiple data items;
  receive, at the node device, data blob metadata that comprises an indication of organization of the multiple data items within the data blob;
  receive, at the node device, a command that originates from a requesting device to generate at least one row of a representation portion of a plurality of representation portions from the data block, wherein:
  a representation data that provides a two-dimensional (2D) representation of data items of the data blob is to be assembled from the plurality of representation portions;
  the plurality of representation portions is to be generated from a subset of data blocks of the plurality of data blocks by a subset of node devices of the grid of node devices that store the subset of data blocks; and
  the subset of node devices comprises the node device;
use the data blob metadata and a node block map of a plurality of node block maps to derive one or more transforms to be performed at the node device with the data block to generate the at least one row of the representation portion, wherein:
  the plurality of node block maps is provided to the subset of node devices to generate the plurality of representation portions from the subset of data blocks; and
  the node block map comprises an indication of which data items of the data block are required to generate the representation portion, what data values are to be generated from the required data items, and an organization of the generated data values within the representation portion;
perform, at the node device, the one or more transforms with the data block to generate the at least one row of the representation portion;
transmit, from the node device to a coordinating device of the grid of node devices, node data comprising an indication of availability of at least storage resources of the node device to enable the coordinating device to coordinate provision of the plurality of data blocks by at least one source device to the grid of node devices, and to coordinate storage of the plurality of data blocks by the grid of node devices;
receive, at the node device, a command to store the data block from the coordinating device;
receive, at the node device, the data block from the at least one source device;
receive, at the node device, the command to generate at least one row of the representation portion from the coordinating device; and
transmit, from the node device, the at least one row of the representation portion to the coordinating device to enable generation, at the coordinating device, of at least one row of the representation data from at least one row of each representation portion of the plurality of representation portions.

2. The apparatus of claim 1, wherein the processor is caused to perform operations comprising:
store, at the node device, multiple reader routines, wherein each reader routine comprises other instructions executable by the processor to perform a different type of transform from others of the multiple reader routines;
select one of the multiple reader routines to use in deriving and performing the one or more transforms based on the node block map; and
use the selected reader routine to derive and perform the one or more transforms with the data block to generate the at least one row of the representation portion.

3. The apparatus of claim 1, wherein the processor is caused to perform operations comprising:
receive, at the node device, at least a portion of the representation data from the coordinating device;
receive, at the node device, a command from the coordinating device to store the portion of the representation data; and
store, at the node device, the received portion of the representation data.

4. The apparatus of claim 1, wherein the processor is caused to perform operations comprising:
use the node bock map and an identifier of the requesting device or an entity associated with the requesting device to determine whether the requesting device or the entity is authorized to access data items of the data block that are required to generate the at least one row of the representation portion; and
in response to a determination that either the requesting device or the entity is not authorized to access a portion of the data items of the data block that are required to generate the at least one row of the representation portion, refrain from using the portion of the data items to generate the at least one row of the representation portion.

5. The apparatus of claim 1, wherein the processor is caused to perform operations comprising use representation metadata comprising an indication of features of the representation data and the data blob metadata to derive at least one operation to perform with at least one row of at least one representation portion of the plurality of representation portions to generate the at least one row of the representation data.

6. The apparatus of claim 1, wherein a transform of the one or more transforms is selected from a group consisting of aggregation of data items of the data blob, averaging of data items of the data blob, sorting data items of the data blob, calculating a value of at least one column of the at least one row from a value of at least one other column of the at least one row, decompressing data items of the data blob, and decrypting data items of the data blob.

7. An apparatus comprising a processor and a storage to store instructions that, when executed by the processor, cause the processor to perform operations comprising:
store, at a node device of a grid of node devices, a data block of a plurality of data blocks of a data blob, wherein:
  the plurality of data blocks of the data blob are distributed among the grid of node devices to be stored by the grid of node devices;
  the data blob comprises multiple data items; and
  each data block of the plurality of data blocks comprises a subset of the multiple data items;
receive, at the node device, data blob metadata that comprises an indication of organization of the multiple data items within the data blob;
receive, at the node device, a command that originates from a requesting device to generate at least one row of a representation portion of a plurality of representation portions from the data block, wherein:
  a representation data that provides a two-dimensional (2D) representation of data items of the data blob is to be assembled from the plurality of representation portions;
  the plurality of representation portions is to be generated from a subset of data blocks of the plurality of data blocks by a subset of node devices of the grid of node devices that store the subset of data blocks; and
  the subset of node devices comprises the node device;
use the data blob metadata and a node block map of a plurality of node block maps to derive one or more transforms to be performed at the node device with the data block to generate the at least one row of the representation portion, wherein:

the plurality of node block maps is provided to the subset of node devices to generate the plurality of representation portions from the subset of data blocks; and the node block map comprises an indication of which data items of the data block are required to generate the representation portion, what data values are to be generated from the required data items, and an organization of the generated data values within the representation portion;

perform, at the node device, the one or more transforms with the data block to generate the at least one row of the representation portion;

transmit, from the node device to a coordinating device of the grid of node devices, node data comprising an indication of availability of at least storage resources of the node device to enable the coordinating device to coordinate provision of the plurality of data blocks by at least one source device to the grid of node devices, and to coordinate storage of the plurality of data blocks by the grid of node devices;

receive, at the node device, a command to store the data block from the coordinating device;

receive, at the node device, the data block from the at least one source device;

receive, at the node device, another command to generate at least one more row of the representation portion from the data block;

retrieve first state data indicative of a state of the node device after the performance of the one or more transforms to generate the at least one row of the representation portion;

use the first state data to prepare the node device for another performance of the one or more transforms with the data block to generate the at least one more row of the representation portion;

store, at the node device, second state data indicative of a state of the node device after the another performance of the one or more transforms to generate the at least one more row of the representation portion; and transmit, from the node device, the at least one more row of the representation portion to the coordinating device to enable generation, at the coordinating device, of at least one more row of the representation data from at least one more row of each representation portion of the plurality of representation portions.

8. The apparatus of claim 7, wherein the processor is caused to perform operations comprising:

store, at the node device, multiple reader routines, wherein each reader routine comprises other instructions executable by the processor to perform a different type of transform from others of the multiple reader routines;

select one of the multiple reader routines to use in deriving and performing the one or more transforms based on the node block map; and use the selected reader routine to derive and perform the one or more transforms with the data block to generate the at least one row of the representation portion.

9. The apparatus of claim 7, wherein the processor is caused to perform operations comprising:

use the node bock map and an identifier of the requesting device or an entity associated with the requesting device to determine whether the requesting device or the entity is authorized to access data items of the data block that are required to generate the at least one row of the representation portion; and in response to a determination that either the requesting device or the entity is not authorized to access a portion of the data items of the data block that are required to generate the at least one row of the representation portion, refrain from using the portion of the data items to generate the at least one row of the representation portion.

10. The apparatus of claim 7, wherein the processor is caused to perform operations comprising use representation metadata comprising an indication of features of the representation data and the data blob metadata to derive at least one operation to perform with at least one row of at least one representation portion of the plurality of representation portions to generate the at least one row of the representation data.

11. A computer-program product tangibly embodied in a non-transitory machine-readable storage medium, the computer-program product including instructions operable to cause a processor to perform operations comprising:

store, at a node device of a grid of node devices, a data block of a plurality of data blocks of a data blob, wherein:

the plurality of data blocks of the data blob are distributed among the grid of node devices to be stored by the grid of node devices;

the data blob comprises multiple data items; and each data block of the plurality of data blocks comprises a subset of the multiple data items;

receive, at the node device, data blob metadata that comprises an indication of organization of the multiple data items within the data blob;

receive, at the node device, a command that originates from a requesting device to generate at least one row of a representation portion of a plurality of representation portions from the data block, wherein:

a representation data that provides a two-dimensional (2D) representation of data items of the data blob is to be assembled from the plurality of representation portions;

the plurality of representation portions is to be generated from a subset of data blocks of the plurality of data blocks by a subset of node devices of the grid of node devices that store the subset of data blocks; and the subset of node devices comprises the node device;

use the data blob metadata and a node block map of a plurality of node block maps to derive one or more transforms to be performed at the node device with the data block to generate the at least one row of the representation portion, wherein:

the plurality of node block maps is provided to the subset of node devices to generate the plurality of representation portions from the subset of data blocks; and the node block map comprises an indication of which data items of the data block are required to generate the representation portion, what data values are to be generated from the required data items, and an organization of the generated data values within the representation portion;

perform, at the node device, the one or more transforms with the data block to generate the at least one row of the representation portion;

transmit, from the node device to a coordinating device of the grid of node devices, node data comprising an indication of availability of at least storage resources of the node device to enable the coordinating device to coordinate provision of the plurality of data blocks by at least one source device to the grid of node devices, and to coordinate storage of the plurality of data blocks by the grid of node devices;

receive, at the node device, a command to store the data block from the coordinating device;

receive, at the node device, the data block from the at least one source device;

receive, at the node device, the command to generate at least one row of the representation portion from the coordinating device; and transmit, from the node device, the at least one row of the representation portion to the coordinating device to enable generation, at the coordinating device, of at least one row of the representation data from at least one row of each representation portion of the plurality of representation portions.

12. The computer-program product of claim 11, wherein the processor is caused to perform operations comprising:

store, at the node device, multiple reader routines, wherein each reader routine comprises other instructions executable by the processor to perform a different type of transform from others of the multiple reader routines;

select one of the multiple reader routines to use in deriving and performing the one or more transforms based on the node block map; and use the selected reader routine to derive and perform the one or more transforms with the data block to generate the at least one row of the representation portion.

13. The computer-program product of claim 11, wherein the processor is caused to perform operations comprising:

receive, at the node device, at least a portion of the representation data from the coordinating device;

receive, at the node device, a command from the coordinating device to store the portion of the representation data; and store, at the node device, the received portion of the representation data.

14. The computer-program product of claim 11, wherein the processor is caused to perform operations comprising:

use the node bock map and an identifier of the requesting device or a entity associated with the requesting device to determine whether the requesting device or the entity is authorized to access data items of the data block that are required to generate the at least one row of the representation portion; and in response to a determination that either the requesting device or the entity is not authorized to access a portion of the data items of the data block that are required to generate the at least one row of the representation portion, refrain from using the portion of the data items to generate the at least one row of the representation portion.

15. The computer-program product of claim 11, wherein the processor is caused to perform operations comprising use representation metadata comprising an indication of features of the representation data and the data blob metadata to derive at least one operation to perform with at least one row of at least one representation portion of the plurality of representation portions to generate the at least one row of the representation data.

16. The computer-program product of claim 15, wherein the at least one operation is selected from a group consisting of aggregation of values of the at least one representation portion, averaging of data items of the at least one representation portion, sorting data items of the at least one representation portion, calculating a value of at least one column of the at least one row from a value of at least one other column of the at least one row, and transmitting the at least one row of the representation data to the grid of node devices for storage.

17. A computer-program product tangibly embodied in a non-transitory machine-readable storage medium, the computer-program product including instructions operable to cause a processor to perform operations comprising:

store, at a node device of a grid of node devices, a data block of a plurality of data blocks of a data blob, wherein:

the plurality of data blocks of the data blob are distributed among the grid of node devices to be stored by the grid of node devices;

the data blob comprises multiple data items; and each data block of the plurality of data blocks comprises a subset of the multiple data items;

receive, at the node device, data blob metadata that comprises an indication of organization of the multiple data items within the data blob;

receive, at the node device, a command that originates from a requesting device to generate at least one row of a representation portion of a plurality of representation portions from the data block, wherein:

a representation data that provides a two-dimensional (2D) representation of data items of the data blob is to be assembled from the plurality of representation portions;

the plurality of representation portions is to be generated from a subset of data blocks of the plurality of data blocks by a subset of node devices of the grid of node devices that store the subset of data blocks; and the subset of node devices comprises the node device;

use the data blob metadata and a node block map of a plurality of node block maps to derive one or more transforms to be performed at the node device with the data block to generate the at least one row of the representation portion, wherein:

the plurality of node block maps is provided to the subset of node devices to generate the plurality of representation portions from the subset of data blocks; and the node block map comprises an indication of which data items of the data block are required to generate the representation portion, what data values are to be generated from the required data items, and an organization of the generated data values within the representation portion;

perform, at the node device, the one or more transforms with the data block to generate the at least one row of the representation portion;

transmit, from the node device to a coordinating device of the grid of node devices, node data comprising an indication of availability of at least storage resources of the node device to enable the coordinating device to coordinate provision of the plurality of data blocks by at least one source device to the grid of node devices, and to coordinate storage of the plurality of data blocks by the grid of node devices;

receive, at the node device, a command to store the data block from the coordinating device;

receive, at the node device, the data block from the at least one source device;

receive, at the node device, another command to generate at least one more row of the representation portion from the data block;

retrieve first state data indicative of a state of the node device after the performance of the one or more transforms to generate the at least one row of the representation portion;

use the first state data to prepare the node device for another performance of the one or more transforms with the data block to generate the at least one more row of the representation portion;

store, at the node device, second state data indicative of a state of the node device after the another performance of the one or more transforms to generate the at least one more row of the representation portion; and transmit, from the node device, the at least one more row of the representation portion to the coordinating device to enable generation, at the coordinating device, of at least one more row of the representation data from at least one more row of each representation portion of the plurality of representation portions.

18. The computer-program product of claim 17, wherein the processor is caused to perform operations comprising:

store, at the node device, multiple reader routines, wherein each reader routine comprises other instructions executable by the processor to perform a different type of transform from others of the multiple reader routines;

select one of the multiple reader routines to use in deriving and performing the one or more transforms based on the node block map; and use the selected reader routine to derive and perform the one or more transforms with the data block to generate the at least one row of the representation portion.

19. The computer-program product of claim 17, wherein the processor is caused to perform operations comprising:

use the node bock map and an identifier of the requesting device or a entity associated with the requesting device to determine whether the requesting device or the entity is authorized to access data items of the data block that are required to generate the at least one row of the representation portion; and in response to a determination that either the requesting device or the entity is not authorized to access a portion of the data items of the data block that are required to generate the at least one row of the representation portion, refrain from using the portion of the data items to generate the at least one row of the representation portion.

20. The computer-program product of claim 17, wherein the processor is caused to perform operations comprising use representation metadata comprising an indication of features of the representation data and the data blob metadata to derive at least one operation to perform with at least one row of at least one representation portion of the plurality of representation portions to generate the at least one row of the representation data.

21. A computer-implemented method comprising:

storing, at a node device of a grid of node devices, a data block of a plurality of data blocks of a data blob, wherein:

the plurality of data blocks of the data blob are distributed among the grid of node devices to be stored by the grid of node devices;

the data blob comprises multiple data items; and each data block of the plurality of data blocks comprises a subset of the multiple data items;

receiving, at the node device, data blob metadata that comprises an indication of organization of the multiple data items within the data blob;

receiving, at the node device, a command that originates from a requesting device to generate at least one row of a representation portion of a plurality of representation portions from the data block, wherein:

a representation data that provides a two-dimensional (2D) representation of data items of the data blob is to be assembled from the plurality of representation portions;

the plurality of representation portions is to be generated from a subset of data blocks of the plurality of data blocks by a subset of node devices of the grid of node devices that store the subset of data blocks; and the subset of node devices comprises the node device;

using the data blob metadata and a node block map of a plurality of node block maps to derive one or more transforms to be performed at the node device with the data block to generate the at least one row of the representation portion, wherein:

the plurality of node block maps is provided to the subset of node devices to generate the plurality of representation portions from the subset of data blocks; and the node block map comprises an indication of which data items of the data block are required to generate the representation portion, what data values are to be generated from the required data items, and an organization of the generated data values within the representation portion;

performing, at the node device, the one or more transforms with the data block to generate the at least one row of the representation portion;

transmitting, from the node device to a coordinating device of the grid of node devices, node data comprising an indication of availability of at least storage resources of the node device to enable the coordinating device to coordinate provision of the plurality of data blocks by at least one source device to the grid of node devices, and to coordinate storage of the plurality of data blocks by the grid of node devices;

receiving, at the node device, a command to store the data block from the coordinating device;

receiving, at the node device, the data block from the at least one source device;

receiving, at the node device, the command to generate at least one row of the representation portion from the coordinating device; and transmitting, from the node device, the at least one row of the representation portion to the coordinating device to enable generation, at the coordinating device, of at least one row of the representation data from at least one row of each representation portion of the plurality of representation portions.

22. The computer-implemented method of claim 21, comprising:

storing, at the node device, multiple reader routines, wherein each reader routine comprises other instructions executable by a processor of the node device to perform a different type of transform from others of the multiple reader routines;

selecting one of the multiple reader routines to use in deriving and performing the one or more transforms based on the node block map; and using the selected reader routine to derive and perform the one or more transforms with the data block to generate the at least one row of the representation portion.

23. The computer-implemented method of claim 21, comprising:
receiving, at the node device, at least a portion of the representation data from the coordinating device;
receiving, at the node device, a command from the coordinating device to store the portion of the representation data; and
storing, at the node device, the received portion of the representation data.

24. The computer-implemented method of claim 21, comprising:
using the node bock map and an identifier of the requesting device or a entity associated with the requesting device to determine whether the requesting device or the entity is authorized to access data items of the data block that are required to generate the at least one row of the representation portion; and
in response to a determination that either the requesting device or the entity is not authorized to access a portion of the data items of the data block that are required to generate the at least one row of the representation portion, refraining from using the portion of the data items to generate the at least one row of the representation portion.

25. The computer-implemented method of claim 21, comprising using representation metadata comprising an indication of features of the representation data and the data blob metadata to derive at least one operation to perform with at least one row of at least one representation portion of the plurality of representation portions to generate the at least one row of the representation data.

26. The computer-implemented method of claim 21, wherein:
the data blob comprises a hypercube that employs an indexing scheme of at least 3 dimensions; and
the data blob does not comprise the 2D representation of data provided by the representation data as a slice of the hypercube.

27. A computer-implemented method comprising:
storing, at a node device of a grid of node devices, a data block of a plurality of data blocks of a data blob, wherein:
the plurality of data blocks of the data blob are distributed among the grid of node devices to be stored by the grid of node devices;
the data blob comprises multiple data items; and
each data block of the plurality of data blocks comprises a subset of the multiple data items;
receiving, at the node device, data blob metadata that comprises an indication of organization of the multiple data items within the data blob;
receiving, at the node device, a command that originates from a requesting device to generate at least one row of a representation portion of a plurality of representation portions from the data block, wherein:
a representation data that provides a two-dimensional (2D) representation of data items of the data blob is to be assembled from the plurality of representation portions;
the plurality of representation portions is to be generated from a subset of data blocks of the plurality of data blocks by a subset of node devices of the grid of node devices that store the subset of data blocks; and
the subset of node devices comprises the node device;
using the data blob metadata and a node block map of a plurality of node block maps to derive one or more transforms to be performed at the node device with the data block to generate the at least one row of the representation portion, wherein:
the plurality of node block maps is provided to the subset of node devices to generate the plurality of representation portions from the subset of data blocks; and
the node block map comprises an indication of which data items of the data block are required to generate the representation portion, what data values are to be generated from the required data items, and an organization of the generated data values within the representation portion;
performing, at the node device, the one or more transforms with the data block to generate the at least one row of the representation portion;
transmitting, from the node device to a coordinating device of the grid of node devices, node data comprising an indication of availability of at least storage resources of the node device to enable the coordinating device to coordinate provision of the plurality of data blocks by at least one source device to the grid of node devices, and to coordinate storage of the plurality of data blocks by the grid of node devices;
receiving, at the node device, a command to store the data block from the coordinating device;
receiving, at the node device, the data block from the at least one source device;
receiving, at the node device, another command to generate at least one more row of the representation portion from the data block;
retrieving first state data indicative of a state of the node device after the performance of the one or more transforms to generate the at least one row of the representation portion;
using the first state data to prepare the node device for another performance of the one or more transforms with the data block to generate the at least one more row of the representation portion;
storing, at the node device, second state data indicative of a state of the node device after the another performance of the one or more transforms to generate the at least one more row of the representation portion; and
transmitting, from the node device, the at least one more row of the representation portion to the coordinating device to enable generation, at the coordinating device, of at least one more row of the representation data from at least one more row of each representation portion of the plurality of representation portions.

28. The computer-implemented method of claim 27, comprising:
storing, at the node device, multiple reader routines, wherein each reader routine comprises other instructions executable by a processor of the node device to perform a different type of transform from others of the multiple reader routines;
selecting one of the multiple reader routines to use in deriving and performing the one or more transforms based on the node block map; and
using the selected reader routine to derive and perform the one or more transforms with the data block to generate the at least one row of the representation portion.

29. The computer-implemented method of claim 27, comprising:

using the node bock map and an identifier of the requesting device or a entity associated with the requesting device to determine whether the requesting device or the entity is authorized to access data items of the data block that are required to generate the at least one row of the representation portion; and in response to a determination that either the requesting device or the entity is not authorized to access a portion of the data items of the data block that are required to generate the at least one row of the representation portion, refraining from using the portion of the data items to generate the at least one row of the representation portion.

30. The computer-implemented method of claim 27, comprising using representation metadata comprising an indication of features of the representation data and the data blob metadata to derive at least one operation to perform with at least one row of at least one representation portion of the plurality of representation portions to generate the at least one row of the representation data.

* * * * *